US012755903B2

(12) United States Patent
Kobayashi et al.

(10) Patent No.: US 12,755,903 B2
(45) Date of Patent: Oct. 6, 2026

(54) CAPACITOR HAVING A SUPPORT PART JOINED TO A CAPACITANCE FORMING PART

(71) Applicant: Murata Manufacturing Co., Ltd., Nagaokakyo (JP)

(72) Inventors: Haruki Kobayashi, Nagaokakyo (JP); Akio Masunari, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 106 days.

(21) Appl. No.: 18/680,365

(22) Filed: May 31, 2024

(65) Prior Publication Data

US 2024/0321517 A1 Sep. 26, 2024

Related U.S. Application Data

(63) Continuation of application No. PCT/JP2022/031059, filed on Aug. 17, 2022.

(30) Foreign Application Priority Data

Jan. 31, 2022 (JP) ................................ 2022-013113

(51) Int. Cl.
*H01G 4/228* (2006.01)
*H01G 4/30* (2006.01)

(52) U.S. Cl.
CPC ............... *H01G 4/228* (2013.01); *H01G 4/30* (2013.01)

(58) Field of Classification Search
None
See application file for complete search history.

(56) References Cited

U.S. PATENT DOCUMENTS 10,535,473 B2 1/2020 Fujii et al.
2003/0223177 A1* 12/2003 Higashi ................. H01G 4/228 257/E27.048

(Continued)

FOREIGN PATENT DOCUMENTS

WO 2018/092722 A1 5/2018
WO 2021/193616 A1 9/2021

OTHER PUBLICATIONS

International Search Report received for PCT Patent Application No. PCT/JP2022/031059, mailed on Nov. 8, 2022, 2 pages (English Translation only).

(Continued)

*Primary Examiner* — Eric W Thomas
(74) *Attorney, Agent, or Firm* — ArentFox Schiff LLP

(57) ABSTRACT

A capacitor that includes: an insulating substrate having a first main surface and a second main surface opposite to the first main surface; a capacitance forming part facing the first main surface, the capacitance forming part comprising a conductive metal porous body, a dielectric film covering a surface of the metal porous body, and a conductive film covering the dielectric film; a first external connection line connected to the conductive metal porous body; a second external connection line connected to the conductive film; and a support part in the insulating substrate, the support part supporting the capacitance forming part and protruding from the first main surface toward the capacitance forming part, and surrounded by and joined to the capacitance forming part.

16 Claims, 37 Drawing Sheets

(56) References Cited

U.S. PATENT DOCUMENTS

| | | | | |
|---|---|---|---|---|
| 2009/0154066 | A1* | 6/2009 | Choi | H01G 9/15<br>29/25.03 |
| 2018/0277306 | A1 | 9/2018 | Lee et al. | |
| 2019/0080849 | A1* | 3/2019 | Fujii | H05K 1/162 |
| 2019/0267188 | A1 | 8/2019 | Fujii et al. | |
| 2022/0359121 | A1 | 11/2022 | Masunari et al. | |
| 2023/0215645 | A9 | 7/2023 | Akio et al. | |

OTHER PUBLICATIONS

International Search Report received for PCT Patent Application No. PCT/JP2022/031061, mailed on Nov. 1, 2022, 2 pages (English Translation only).

* cited by examiner

CAPACITOR HAVING A SUPPORT PART JOINED TO A CAPACITANCE FORMING PART

CROSS REFERENCE TO RELATED APPLICATIONS

The present application is a continuation of International application No. PCT/JP2022/031059, filed Aug. 17, 2022, which claims priority to Japanese Patent Application No. 2022-013113, filed Jan. 31, 2022, the entire contents of each of which are incorporated herein by reference.

TECHNICAL FIELD

The present invention relates to a capacitor including a capacitance forming part including a metal porous body, a dielectric film, and a conductive film.

BACKGROUND ART

For example, US 2018/0277306 A (Patent Document 1) discloses a capacitor including a capacitance forming part provided by a metal porous body, a dielectric film covering the surface of the metal porous body, and a conductive film covering the dielectric film. In the capacitor, the metal porous body is made of a sintered body of metal grains, and the dielectric layer and the conductive film are both formed by an atomic layer deposition (ALD) method.

SUMMARY OF THE INVENTION

The capacitor disclosed in Patent Document 1 has, however, a configuration in which an insulating substrate and the capacitance forming part are joined to each other over a relatively large area, and thus, the capacitor itself is warped by stress generated due to the difference in thermal expansion coefficient between the insulating substrate and the capacitance forming part in the manufacturing process involving heat treatment, which may cause the problem of hindering stable mounting of the capacitor.

In addition, in the case of the capacitor disclosed in Patent Document 1, stress is generated due to the difference in thermal expansion coefficient between the insulating substrate and the capacitance forming part by the influence of heat applied from the outside or heat generated inside also after mounting, and accordingly, the capacitor itself is warped, which may cause, for example, the problem of causing damage to the joint between the insulating substrate and the capacitance forming part.

Accordingly, the present invention has been made to solve the problem mentioned above, and an object of the present invention is to achieve improved mounting stability and improved reliability after mounting in a capacitor including a capacitance forming part including a metal porous body, a dielectric film, and a conductive film.

A capacitor according to the present invention includes: an insulating substrate having a first main surface and a second main surface opposite to the first main surface; a capacitance forming part facing the first main surface, the capacitance forming part comprising a conductive metal porous body, a dielectric film covering a surface of the metal porous body, and a conductive film covering the dielectric film; a first external connection line connected to the conductive metal porous body; a second external connection line connected to the conductive film; and a support part in the insulating substrate, the support part supporting the capacitance forming part and protruding from the first main surface toward the capacitance forming part, and surrounded by and joined to the capacitance forming part.

In the capacitor according to the present invention, the support part may be a support conductor that forms part of the first external connection line, and in this case, the support conductor is preferably connected to the metal porous body.

In the capacitor according to the present invention, the first external connection line may include a first via conductor penetrating the insulating substrate so as to reach the second main surface from the first main surface. In the case, the support conductor may extend in the normal direction of the first main surface, and in this case, as viewed in the normal direction of the first main surface, the support conductor may be overlapped with at least a part of the first via conductor.

In the capacitor according to the present invention, the capacitance forming part may include a first capacitance forming part and a second capacitance forming part stacked apart from each other in the normal direction of the first main surface, and in this case, the metal porous body of the first capacitance forming part and the metal porous body of the second capacitance forming part are preferably connected by the support conductor.

In the capacitor according to the present invention, the second external connection line may include a columnar conductor protruding from the first main surface toward the capacitance forming part and surrounded by the capacitance forming part, and a second via conductor penetrating the insulating substrate from the first main surface so as to reach the second main surface. In this case, the conductive film and the second via conductor may be connected with at least the columnar conductor interposed therebetween, and the columnar conductor may extend in the normal direction of the first main surface. In addition, in this case, as viewed in the normal direction of the first main surface, the columnar conductor may be overlapped with at least a part of the second via conductor.

In the capacitor according to the present invention, the capacitance forming part may include a first capacitance forming part and a second capacitance forming part stacked apart from each other in the normal direction of the first main surface. In this case, the metal porous body of the first capacitance forming part and the metal porous body of the second capacitance forming part are preferably connected by the support conductor, and in this case, the conductive film of the first capacitance forming part and the conductive film of the second capacitance forming part are preferably connected with at least the columnar conductor interposed therebetween.

The capacitor according to the present invention may further include a sealing part on the first main surface, sealing the capacitance forming part, and defining an outer surface opposite to the insulating substrate as viewed from the capacitance forming part. In this case, the support conductor may be exposed at the outer surface by penetrating the capacitance forming part and the sealing part, and the columnar conductor may be exposed at the outer surface by penetrating the capacitance forming part and the sealing part.

In the capacitor according to the present invention, the first via conductor and the second via conductor are preferably both in a region where the capacitance forming part is disposed as viewed in the normal direction of the first main surface.

In the capacitor according to the present invention, pluralities of the first via conductors and the support conductors may be provided, and pluralities of the second via conductors and the columnar conductors may be provided.

In the capacitor according to the present invention, the pluralities of the first via conductors and the pluralities of the second via conductors are arranged in an array as viewed in the normal direction of the first main surface, and at least one set of adjacent via conductors among the pluralities of the first via conductors and the pluralities of the second via conductors that are a shortest distance from each other differ in polarity from each other.

In the capacitor according to the present invention, the first external connection line may include a first via conductor penetrating the insulating substrate so as to reach the second main surface from the first main surface. In this case, the support conductor may extend in the normal direction of the first main surface, and in this case, as viewed in the normal direction of the first main surface, the support conductor does not have to be overlapped with the first via conductor.

In the capacitor according to the present invention, the capacitance forming part may include a first capacitance forming part and a second capacitance forming part stacked apart from each other in the normal direction of the first main surface, and in this case, the metal porous body of the first capacitance forming part and the metal porous body of the second capacitance forming part are preferably connected by the support conductor.

In the capacitor according to the present invention, the support conductor preferably includes the same material as at least a part of the material included in the metal porous body.

According to the present invention, the mounting stability and the reliability after mounting are improved in the capacitor including the capacitance forming part including the metal porous body, the dielectric film, and the conductive film.

DETAILED DESCRIPTION OF THE INVENTION

Figure 1:
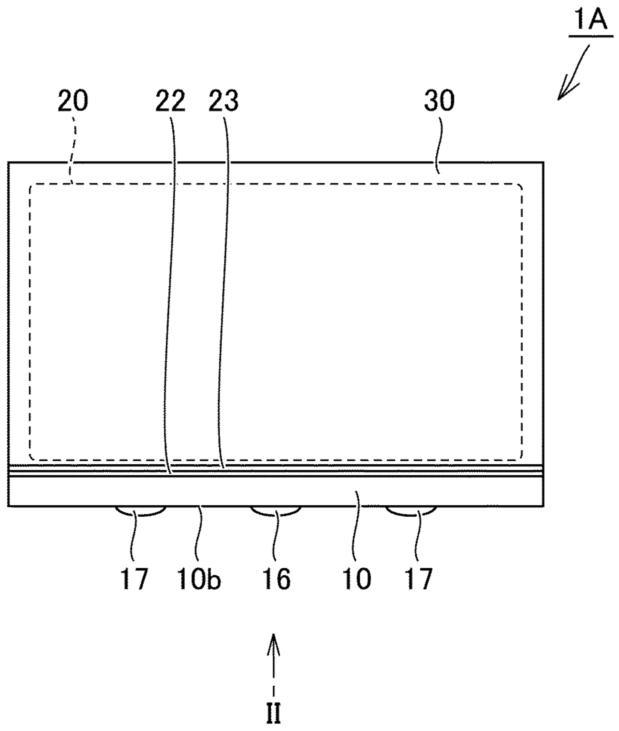
FIG. 1 is a schematic front view of a capacitor according to a first embodiment.

Hereinafter, embodiments of the present invention will be described in detail with reference to the drawings. It is to be noted that in the following embodiments, the same or common parts are denoted by the same reference numerals in the drawings, and description thereof will not be repeated. In addition, while the terms of "positive electrode" and "negative electrode" are used in the following embodiments for convenience of description, the electric polarities of capacitors according to the following embodiments are not to be considered uniquely determined by these terms, and the electric polarities are determined appropriately depending on the use environments of the capacitors.

First Embodiment

Figure 2:
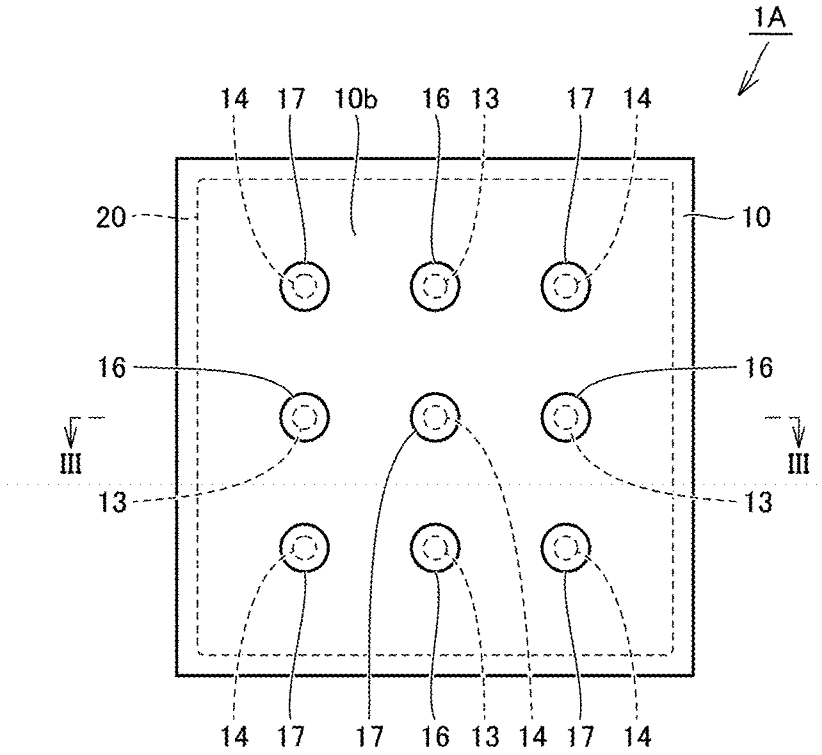
FIG. 2 is a schematic bottom view of the capacitor illustrated in FIG. 1.
Figure 3:
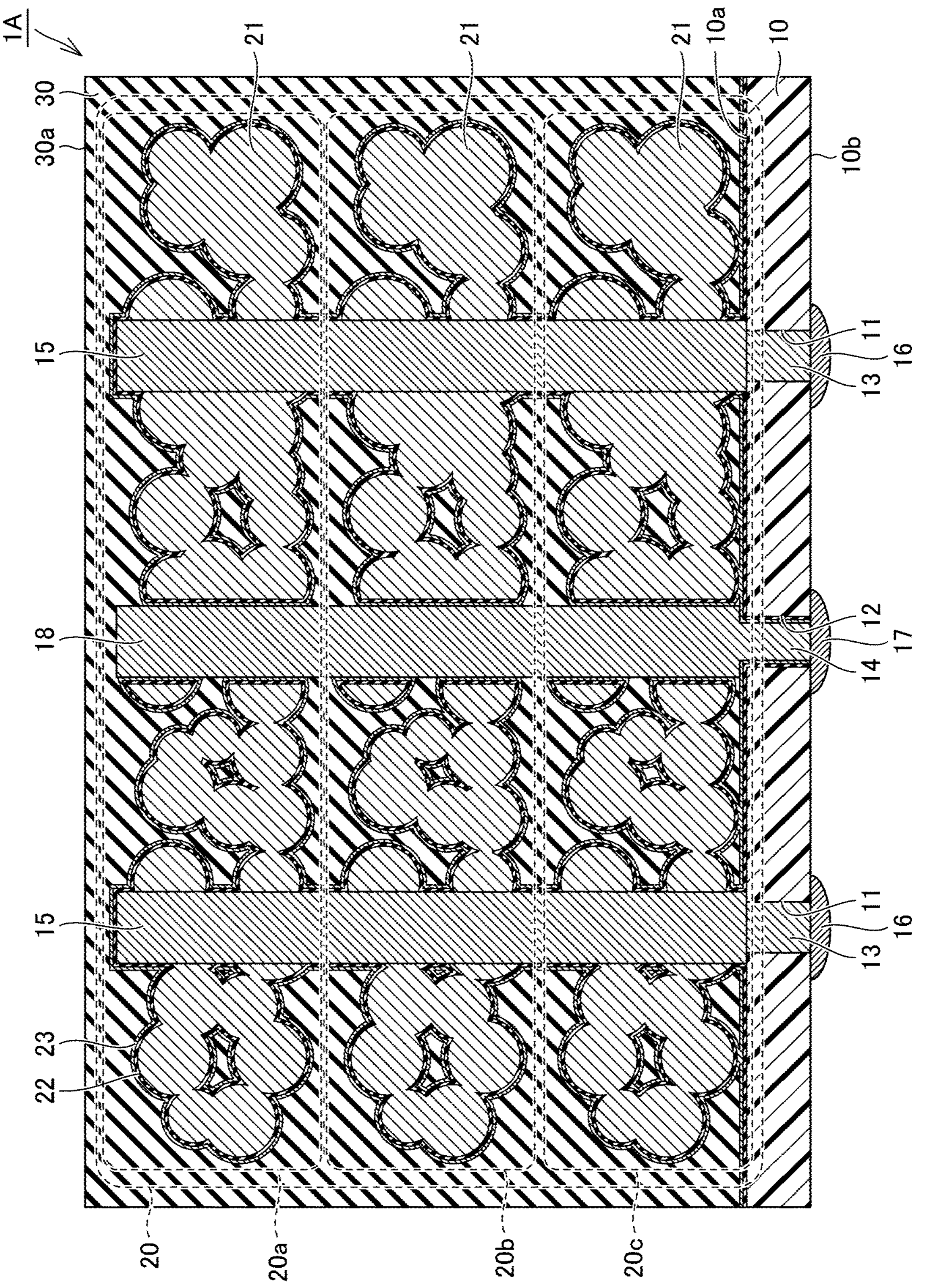
FIG. 3 is a schematic sectional view of the capacitor illustrated in FIG. 1.
Figure 4:
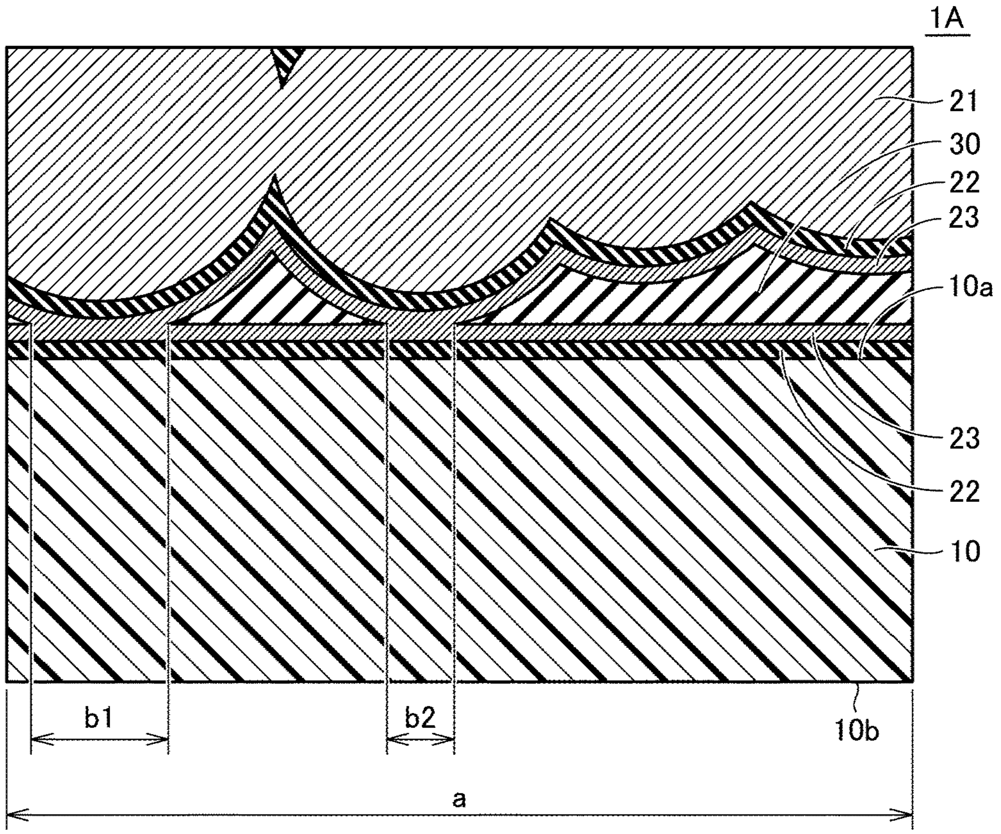
FIG. 4 is an enlarged schematic sectional view of the vicinity of a first main surface of an insulating substrate illustrated in FIG. 3.
Figure 5:
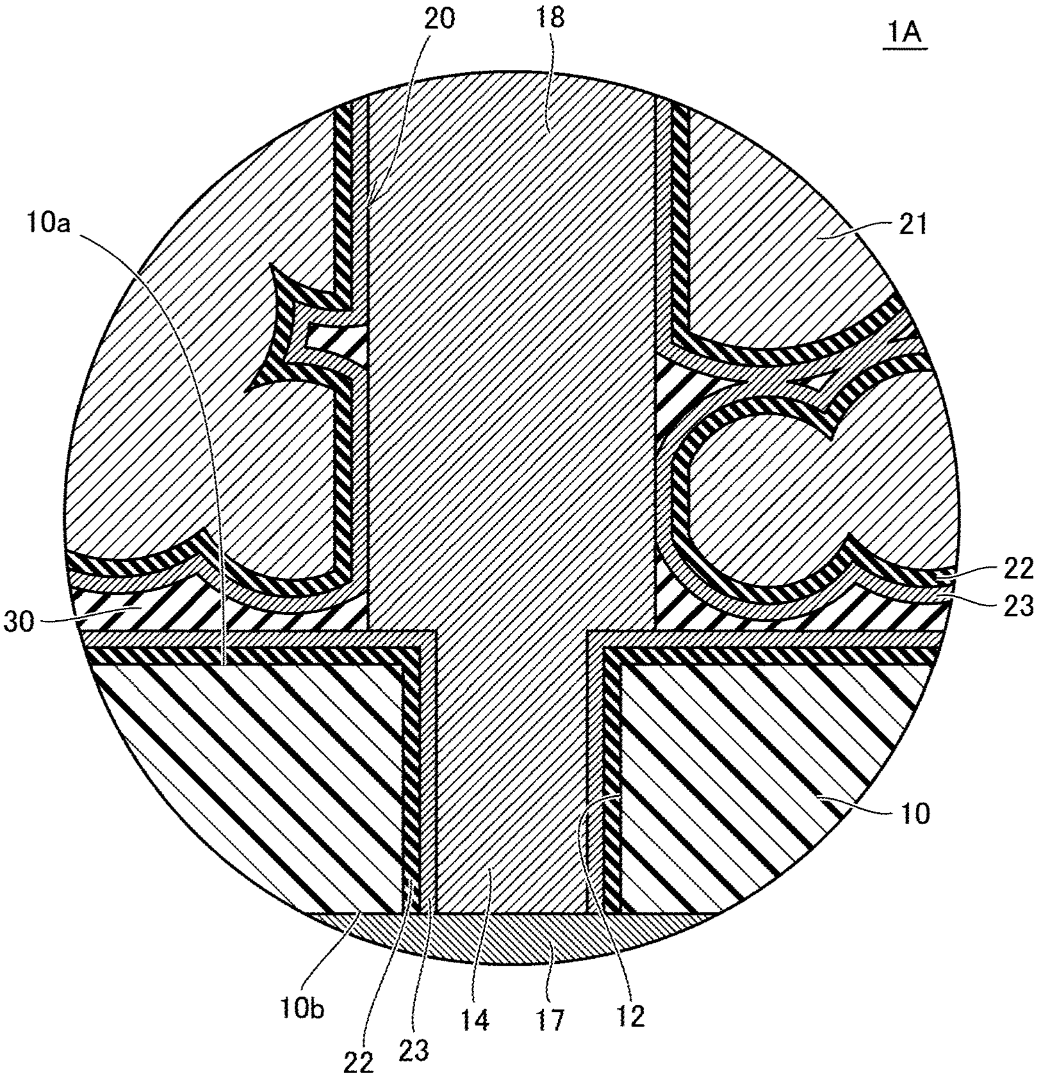
FIG. 5 is an enlarged schematic sectional view of the vicinity of a second via conductor illustrated in FIG. 3.
Figure 6:
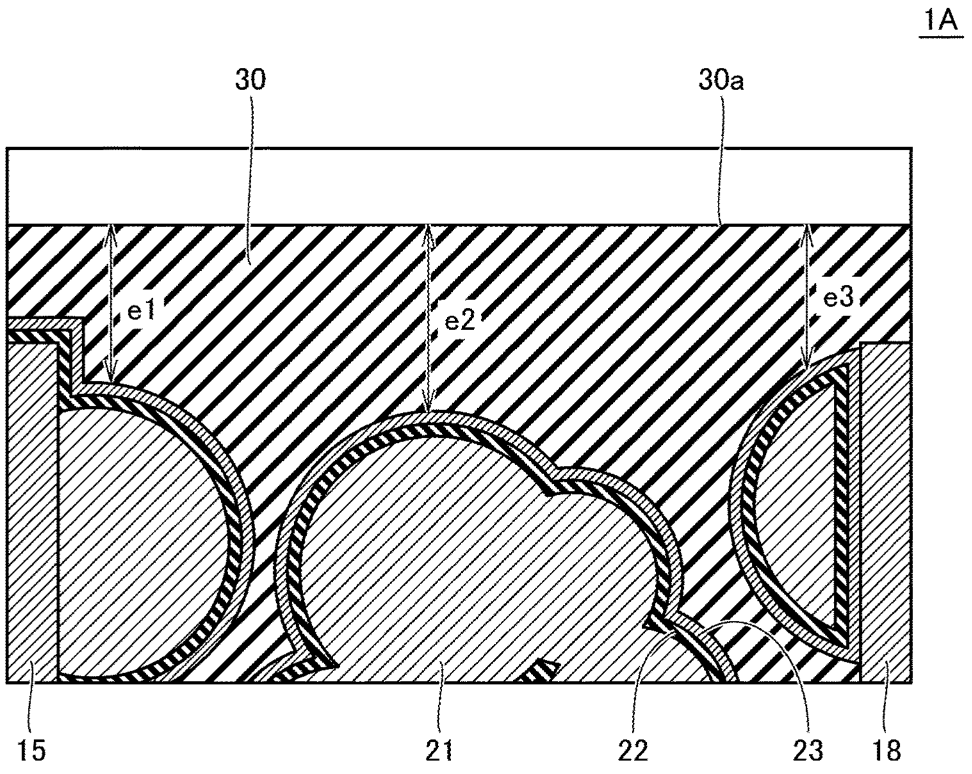
FIG. 6 is an enlarged schematic sectional view of a part of a sealing part illustrated in FIG. 3.

FIG. 1 is a schematic front view of a capacitor according to a first embodiment, and FIG. 2 is a schematic bottom view of the capacitor viewed from the direction of an arrow II illustrated in FIG. 1. FIG. 3 is a schematic sectional view of the capacitor along a line III-III illustrated in FIG. 2, and FIG. 4 is an enlarged schematic sectional view of the vicinity of a first main surface of an insulating substrate illustrated in FIG. 3. In addition, FIG. 5 is an enlarged schematic sectional view of the vicinity of a second via conductor illustrated in FIG. 3, and FIG. 6 is an enlarged schematic sectional view of a part of a sealing part illustrated in FIG. 3. First, a configuration of a capacitor 1A according to the present embodiment will be described with reference to FIGS. 1 to 6.

As illustrated in FIGS. 1 to 3, the capacitor 1A has a flat and substantially rectangular parallelepiped outer shape, and is a so-called surface mount electronic component with a bottom surface configured as a mounting surface for a wiring board or the like. The capacitor 1A mainly includes an insulating substrate 10, a capacitance forming part 20, and a sealing part 30. In this regard, the capacitance forming part 20 is provided to face the insulating substrate 10. The capacitance forming part 20 is sealed by the insulating substrate 10 and the sealing part 30 provided on the insulating substrate 10 to be located inside the capacitor 1A.

In addition, the insulating substrate 10 is provided with a first via conductor 13, a second via conductor 14, a support conductor 15, a first bump 16, a second bump 17, and a columnar conductor 18. The first via conductor 13, the second via conductor 14, the support conductor 15, the first bump 16, the second bump 17, and the columnar conductor 18 constitute a pair of external connection lines as extended lines for electrically connecting the capacitance forming part 20 located inside the capacitor 1A to an external circuit. The pair of external connection lines includes a first external connection line as a positive electrode and a second external connection line as a negative electrode.

As illustrated in FIGS. 1 to 5, the insulating substrate 10 is made of a flat plate-like member having a first main surface 10*a* and a second main surface 10*b* located on the side opposite to the first main surface 10*a*. As the insulating substrate 10, a substrate that has an electrical insulation property is preferably used, and a substrate containing an inorganic material as a main component can be suitably used. More specifically, as the insulating substrate 10, for example, a substrate containing, as a main material, any of Si, $Al_2O_3$, $ZrO_2$, BN, $Si_3N_4$, AlN, MgO, $Mg_2SiO_4$, $BaTiO_3$, $SrTiO_3$, and $CaTiO_3$ can be used.

The thickness and size of the insulating substrate 10 are not particularly limited, but it is preferable to use, for example, an alumina substrate that has a rectangular shape of 5 μm to 50 μm in thickness and of 500 μm to 2000 μm on a side in plan view.

The insulating substrate 10 is provided with a plurality of first through-holes 11, and each of the plurality of first through-holes 11 penetrates the insulating substrate 10 so as to reach the second main surface 10*b* from the first main surface 10*a*. Each of the plurality of first through-holes 11 is filled with the first via conductor 13 (see FIG. 3). Each of the plurality of first via conductors 13 has, for example, a substantially columnar shape.

The insulating substrate 10 is provided with a plurality of second through-holes 12, and each of the plurality of second through-holes 12 penetrates the insulating substrate 10 so as to reach the second main surface 10*b* from the first main surface 10*a*. Each of the plurality of second through-holes 12 is filled with the second via conductor 14 (see FIG. 3). Each of the plurality of second via conductors 14 has, for example, a substantially columnar shape.

Each of the plurality of first via conductors 13 constitutes a part of the first external connection line described above. Each of the plurality of second via conductors 14 constitutes a part of the second external connection line described above. More specifically, the plurality of first via conductors 13 and the plurality of second via conductors 14 respectively constitute the first external connection line and second external connection line that differ in polarity.

In this regard, according to the present embodiment, as viewed in the normal direction of the first main surface 10*a* of the insulating substrate 10, the first via conductors 13 and the second via conductors 14 are all provided in a region where the capacitance forming part 20 is disposed (that is, a region indicated by a broken line in FIG. 2).

In addition, according to the present embodiment, four first via conductors 13 and five second via conductors 14 are provided in the insulating substrate 10, and thus the nine via conductors in total penetrate the insulating substrate 10. The nine via conductors are arranged in an array in a layout of three rows and three columns. In this regard, one of the via conductors differs in polarity from the via conductors adjacent thereto at the shortest distance. It is to be noted that the number and arrangement of the first via conductors 13 and second via conductors 14 are not particularly limited thereto.

The first via conductors 13 and the second via conductors 14 can be made of various wiring materials, and are preferably made of a metal material that has a particularly high electrical conductivity. The materials of the first via conductors 13 and second via conductors 14 can be, for example, a metal material containing, as a main material, any of Ni, Ag, Cu, Au, Pt, Mo, and W, and is preferably Cu. In this regard, the materials of the first via conductors 13 and second via conductors 14 can be appropriately changed depending on the environment for mounting the capacitor 1A according to the present embodiment, and the material of the first via conductors 13 are not necessarily the same as the material of the second via conductors 14. According to the present embodiment, the first via conductors 13 and second via conductors 14 made of Ni are used.

Further, the second via conductors 14 may be formed together with the columnar conductor 18, which will be described later, by a thick film forming method such as electrolytic plating or a screen printing method. In this case, the material of the second via conductors 14 is the same as the material of the columnar conductor 18, which will be described later.

The axial lengths and the sizes of the first via conductors 13 and second via conductor 14 are not to be considered particularly limited, and are appropriately set depending on the thickness and the size of the insulating substrate 10. In this regard, the axial lengths of the first via conductors 13 and the second via conductors 14 are preferably, for example, 5 μm to 50 μm, and the diameters thereof are preferably, for example, 15 μm to 150 μm.

As illustrated in FIG. 3, the insulating substrate 10 is provided with a plurality of substantially columnar support conductors 15 protruding from the first main surface 10*a* toward the capacitance forming part 20 and surrounded by the capacitance forming part 20. Each of the plurality of support conductors 15 configured as described above is joined to the capacitance forming part 20 to function as a support part that supports the capacitance forming part 20. More specifically, providing the plurality of support conductors 15 as support parts will allow the insulating substrate 10 to be kept from being warped by the stress generated in the steps of manufacturing the capacitor 1A, and this matter will be described later.

In addition, each of the plurality of support conductors 15 extends in the normal direction of the first main surface 10*a*, and is arranged to overlap each of the plurality of first via conductors 13 as viewed in the normal direction. Thus, the support conductors 15 are connected to the first via conductors 13.

In this regard, each of the plurality of support conductors 15 is preferably disposed so as to be substantially coaxial with each of the plurality of first via conductors 13. In addition, for the plurality of support conductors 15, the section for each thereof, orthogonal to the normal direction of the first main surface 10*a*, is preferably configured to be larger than the section of the corresponding first via conductor 13. For that reason, the diameter of each of the plurality of support conductors 15 is preferably, for example, 15 μm to 100 μm.

With such a configuration, if each of the plurality of support conductors 15 is not disposed perfectly coaxially with each of the plurality of first via conductors 13 due to the shifted position at which each of the plurality of support conductors 15 is formed, each of the plurality of support conductors 15 can be arranged to overlap with a part of each of the plurality of first via conductors 13, as viewed in the normal direction of the first main surface 10*a*. Thus, the foregoing allows each of the plurality of support conductors 15 to be reliably connected to each of the plurality of first via conductors 13.

The axial length of the support conductor 15 is not to be considered particularly limited, and is appropriately set depending on the thickness of the capacitance forming part 20, but preferably has an axial length enough to penetrate the capacitance forming part 20 in the thickness direction. Further, as will be described later, when the capacitance forming part 20 includes a plurality of capacitance forming parts stacked apart from each other in the normal direction of the first main surface 10*a*, it is necessary to have an axial length enough to be joined to at least a part of a layer (that is, a first capacitance forming part 20*a* in FIG. 3) located farthest from the first main surface 10*a*. For example, the lower limit of the axial length of the plurality of support conductors 15 is 15 μm, and the upper limit thereof is preferably a length obtained by subtracting 20 μm from the thickness of the capacitor 1A.

The support conductors 15 preferably include the same material as at least a part of the material included in a metal porous body 21, which will be described later. The material of the support conductors 15 can be a metal material containing, for example, any of Ni, Mo, W, Al, Ti, Ta, Nb, Cu, Pt, Au, and Ag as a main material. In addition, the support conductors 15 may be made of an alloy material containing, as main components, two or more selected from these metal materials. According to the present embodiment, the support conductors 15 made of Ni are used.

It is to be noted that the outer shape of the support conductor 15 in plan view is not to be considered limited to a substantially circular shape, and may be, for example, a substantially elliptical shape or the like. In addition, the support conductor 15 may extend in a direction considerably tapered with respect to the normal direction of the first main surface 10*a*.

The insulating substrate 10 is further provided with a plurality of substantially columnar conductors 18 protruding from the first main surface 10*a* toward the capacitance forming part 20 and surrounded by the capacitance forming part 20. Each of the plurality of columnar conductors 18 extends in the normal direction of the first main surface 10*a*, and is arranged to overlap with each of the plurality of second via conductors 14, as viewed in the normal direction of the first main surface 10*a*. Thus, the columnar conductors 18 are, at the end thereof on the side with the insulating substrate 10, connected to the second via conductor 14.

In this regard, each of the plurality of columnar conductors 18 is preferably disposed so as to be substantially coaxial with each of the plurality of second via conductors 14. In addition, for the plurality of columnar conductors 18, the section for each thereof, orthogonal to the normal direction of the first main surface 10*a*, is preferably configured to be larger than the section of the corresponding second via conductor 14. For that reason, the diameter of each of the plurality of columnar conductors 18 is preferably, for example, 15 μm to 150 μm.

With such a configuration, if each of the plurality of columnar conductors 18 is not disposed perfectly coaxially with each of the plurality of second via conductors 14 due to the shifted position at which each of the plurality of columnar conductors 18 is formed, each of the plurality of columnar conductors 18 can be arranged to overlap with a part of each of the plurality of second via conductors 14, as viewed in the normal direction of the first main surface 10*a*. Thus, the foregoing allows each of the plurality of columnar conductors 18 to be reliably connected to each of the plurality of second via conductors 14.

The axial length of the columnar conductor 18 is not to be considered particularly limited, and is appropriately set depending on the thickness of the capacitance forming part 20, but preferably has an axial length enough to penetrate the capacitance forming part 20 in the thickness direction. Further, as will be described later, when the capacitance forming part 20 includes a plurality of capacitance forming parts stacked apart from each other in the normal direction of the first main surface 10*a*, it is necessary to have an axial length enough to be joined to at least a part of a layer (that is, a first capacitance forming part 20*a* in FIG. 3) located farthest from the first main surface 10*a*. For example, the lower limit of the axial length of the plurality of columnar conductors 18 is 15 μm, and the upper limit thereof is preferably a length obtained by subtracting 20 μm from the thickness of the capacitor 1A.

The columnar conductors 18 preferably include the same material as at least a part of the material included in the metal porous body 21, which will be described later. The material of the columnar conductors 18 can be a metal material containing, for example, any of Ni, Mo, W, Al, Ti, Ta, Nb, Cu, Pt, Au, and Ag as a main material. In addition, the columnar conductors 18 may be made of an alloy material containing, as main components, two or more selected from these metal materials.

Further, the columnar conductors 18 may be formed together with the second via conductors 14 by a thick film forming method such as electrolytic plating or a screen printing method. In that case, the material of the material of the columnar conductor 18 is the same as the second via conductors 14. According to the present embodiment, the second via conductors 14 and columnar conductor 18 made of Ni are both formed by electrolytic plating.

It is to be noted that the outer shape of the columnar conductor 18 in plan view is not to be considered limited to a substantially circular shape, and may be, for example, a substantially elliptical shape or the like. In addition, the columnar conductor 18 may extend in a direction considerably tapered with respect to the normal direction of the first main surface 10*a*.

Each of the plurality of support conductors 15 described above constitutes a part of the first external connection line described above, and each of the plurality of columnar conductors 18 constitute a part of the second external connection line described above. More specifically, the plurality of support conductors 15 and the plurality of columnar conductors 18 respectively constitute the first external connection line and second external connection line that differ in polarity.

As illustrated in FIGS. 1 to 3, a plurality of first bumps 16 are provided on the second main surface 10*b* of the insulating substrate 10 so as to cover the plurality of first via conductors 13. The plurality of first bumps 16 serve as joining materials for mounting the capacitor 1A as a surface mount electronic component on a wiring board or the like and electrically connecting the capacitance forming part 20 of the capacitor 1A to an external circuit, and are provided to protrude from the second main surface 10*b* of the insulating substrate 10. The shape of each of the plurality of first bumps 16 is substantially hemispherical.

A plurality of the second bumps 17 are provided on the second main surface 10*b* of the insulating substrate 10 so as to cover the plurality of second via conductors 14. The plurality of second bumps 17 serve as joining materials for mounting the capacitor 1A as a surface mount electronic component on a wiring board or the like and electrically connecting the capacitance forming part 20 of the capacitor 1A to an external circuit, and are provided to protrude from the second main surface 10*b* of the insulating substrate 10. The shape of each of the plurality of second bumps 17 is substantially hemispherical.

Each of the plurality of first bumps 16 constitutes a part of the first external connection line described above. Each of the plurality of second bumps 17 constitutes a part of the second external connection line described above. More specifically, the plurality of first bumps 16 and the plurality of second bumps 17 respectively constitute the first external connection line and the second external connection line that differ in polarity.

The first bumps 16 and the second bumps 17 can be made of various wiring materials, and are preferably made of a metal material that as a particularly high electrical conductivity. The material of the first bumps 16 and the material of the second bumps 17 can be, for example, a metal material containing, as a main material, any of Ni, Ag, Cu, Au, and Sn. According to the present embodiment, the first bumps 16 and the second bumps 17 made of Au are used.

The sizes of the first bumps 16 and second bumps 17 are not to be considered particularly limited, and are appropriately set depending on the sizes of the first via conductors 13 and second via conductors 14.

As described above, the first external connection line as a positive electrode of the pair of external connection lines is composed of the first via conductors 13, the support conductors 15, and the first bumps 16, whereas the second external connection line as a negative electrode of the pair of external connection lines is composed of the second via conductors 14, the columnar conductors 18, and the second bumps 17.

As illustrated in FIG. 3, the capacitance forming part 20 is provided so as to face the insulating substrate 10, and includes the metal porous body 21 with a plurality of fine pores therein, the dielectric film 22 covering the surface of the metal porous body 21, and the conductive film 23 further covering the surface of the dielectric film 22.

It is to be noted that while the capacitance forming part 20 is provided so as to face the insulating substrate 10, the capacitance forming part 20 is not substantially directly joined to the insulating substrate 10, or if directly joined, is only slightly joined thereto. In this regard, the state in which the capacitance forming part 20 is only slightly joined to the insulating substrate 10 means a state in which a part of the capacitance forming part 20 is joined to the insulating substrate 10 at a predetermined ratio or less. More specifically, the state in which the capacitance forming part 20 is only slightly joined to the insulating substrate 10 means that, as illustrated in FIG. 4, when an arbitrary region on the first main surface 10*a* of the insulating substrate 10 is viewed in a section orthogonal to the extending direction of the first main surface 10*a* of the insulating substrate 10, the sum (that is, the line segment length b1+b2 in the example illustrated in FIG. 4) of line segment lengths parallel to the first main surface 10*a*, of a part where the metal porous body 21 is joined directly to the insulating substrate 10 or indirectly thereto with the dielectric film 22 or the conductive film 23 interposed therebetween in the arbitrary region, is 30% or less of the total line segment length (that is, the line segment length a in the example illustrated in FIG. 4) of the first main surface in the arbitrary region.

In addition, as illustrated in FIG. 3, the capacitance forming part 20 includes a plurality of capacitance forming parts stacked apart from each other in the normal direction of the first main surface 10*a*. It is to be noted that the number of layers of the capacitance forming parts stacked is not to be considered particularly limited, and is appropriately set depending on a desired capacitance. The capacitance forming part 20 according to the present embodiment is composed of three layers, and the three layers will be referred to as a first capacitance forming part 20*a*, a second capacitance forming part 20*b*, and a third capacitance forming part 20*c* in order from a layer located farthest from the first main surface 10*a* for convenience of description.

At least a part of the plurality of fine pores provided inside the metal porous body 21 is not closed by the metal porous body itself, and preferably, most or all of the plurality of fine pores provided inside the metal porous body are not closed by the metal porous body itself. Such a metal porous body is made of, for example, a sintered body of metal grains.

The metal porous body 21 is located so as to surround the support conductors 15 on a part of the insulating substrate 10 excluding an edge of the first main surface 10*a*. The metal porous body 21 configured as described above is subjected to firing together with the support conductors 15 including the same material as at least a part of the material included in the metal porous body 21 in the step of forming the metal porous body.

Thus, the metal porous body 21 will be joined to the support conductors 15. More specifically, in the capacitor 1A according to the present embodiment, the metal porous body 21 of the first capacitance forming part 20*a*, the metal porous body 21 of the second capacitance forming part 20*b*, and the metal porous body 21 of the third capacitance forming part 20*c* will be connected by the support conductor 15. Therefore, the above-described first external connection line as a positive electrode is connected to the capacitance forming part 20 with the support conductors 15 interposed therebetween.

The metal porous body 21 can be made of various conductive metal materials, and is preferably made of a metal material containing, as a main material, any of Ni, Mo, W, Al, Ti, Ta, Nb, Cu, Pt, Au, and Ag. In addition, the metal porous body 21 may be made of an alloy material containing, as main components, two or more selected from these metal materials. According to the present embodiment, the metal porous body 21 made of Ni is used.

The thickness and size of the metal porous body 21 are not to be considered particularly limited, and in particular, the size is appropriately set depending on the size of the insulating substrate 10.

In this regard, as described above, the metal porous body 21 is preferably made of a sintered body of metal grains. In that case, metal grains that have various shapes such as a spherical shape, an elliptical spherical shape, a flat shape, a plate shape, and a needle shape can be used. In addition, the grain sizes of the metal grains are not to be considered particularly limited, but the average grain size thereof is preferably 600 nm or less, more preferably 20 nm to 500 nm.

The dielectric film 22 covers the surface of the metal porous body 21 as described above. More specifically, the dielectric film 22 covers not only the surface of the metal porous body 21 of a part located on the outermost side of the capacitance forming part 20, but also the surface defined by the above-described fine pores that are not closed by the metal porous body itself, of the surface of the metal porous body 21 of a part located inside the capacitance forming part 20. In addition, the dielectric film 22 also covers the surfaces of the support conductors 15.

The dielectric film 22 can be made of various insulating materials, and can be made of, for example, a metal oxide such as $AlO_x$, $SiO_x$, $HfO_x$, $TiO_x$, $TaO_x$, $ZrO_x$, $SiAlO_x$, $HfAlO_x$, $ZrAlO_x$, $AlTiO_x$, $SrTiO_x$, $HfSiO_x$, $ZrSiO_x$, $TiZrO_x$, $TiZrO_x$, $TiZrWO_x$, $SrTiO_x$, $BaTiO_x$, $PbTiO_x$, $BaSrTiO_x$, and $BaCaTiO_x$, a metal nitride such as $AlN_x$, $SiN_x$, and $AlScN_x$, and a metal oxynitride such as $AlO_xN_y$, $SiO_xN_y$, $HfO_xN_y$, and $SiC_xO_yN_z$. Among the materials, the dielectric film 22 is preferably made of any of $AlO_x$ (for example, $Al_2O_3$), $SiO_x$ (for example, $SiO_2$), $HfO_x$, $TiO_x$, $SiAlO_x$, $HfAlO_x$, $ZrAlO_x$, $HfSiO_x$, and $ZrSiO_x$. It is to be noted that the chemical formulas mentioned above are merely intended to represent the constitutions of the materials, and are not intended to limit the composition. More specifically, x, y, and z attached to O and N may be any value larger than 0, and the abundance ratios of the respective elements including the metal elements are arbitrary. In addition, the dielectric film 22 may be made of a laminated film including a plurality of dielectric layers that differ in material. According to the present embodiment, the dielectric film 22 made of AlSiO nm is used.

The dielectric film 22 can be preferably formed by a gas phase method, for example, a vacuum deposition method, a chemical vapor deposition (CVD: Chemical Vapor Deposition) method, a sputtering method, an atomic layer deposition (ALD) method, a pulsed laser deposition (PLD: Pulsed Laser Deposition) method, or the like, or a method of using a supercritical fluid, and is particularly preferably formed by the ALD method.

The thickness of the dielectric film 22 is not to be considered particularly limited, but is preferably 3 nm to 100 nm, more preferably 5 nm to 50 nm.

The conductive film 23 covers the surface of the dielectric film 22 as described above. More specifically, the conductive film 23 covers not only the surface of the dielectric film 22 of the part located on the outermost side of the capacitance forming part 20, but also the surface of the dielectric film 22 of the part located inside the capacitance forming part 20. In addition, the conductive film 23 also covers the surface of the dielectric film 22 covering the surfaces of the support conductors 15.

In addition, the conductive film 23 is located so as to surround the plurality of columnar conductors 18 protruding from the first main surface 10*a* toward the capacitance forming part 20, and thus connected to the plurality of columnar conductors 18. More specifically, in the capacitor 1A according to the present embodiment, the conductive film 23 of the first capacitance forming part 20*a*, the conductive film 23 of the second capacitance forming part 20*b*, and the conductive film 23 of the third capacitance forming part 20*c* will be connected with the columnar conductors 18 interposed therebetween.

The conductive film 23 can be made of various conductive materials, and can be made of a metal material containing, as a main material, any of Ni, Cu, Ru, Al, W, Ti, Ag, Au, Zn, Ta, and Nb, an alloy material containing, as main components, two or more selected from these metal materials, a metal nitride such as TiN, TiAlN, TiSiN, TaN, NbN, and WN, a metal oxynitride such as TiON or TiAlON, a conductive polymer such as poly(3,4-ethylenedioxythiophene) (PEDOT), polypyrrole, and polyaniline, or a conductive oxide film such as $RuO_2$, ZnO, (Zn, Al)O, and NiO. Among these materials, the conductive film 23 is preferably made of TiN or an oxide semiconductor such as TiON, ZnO, and RuO. According to the present embodiment, the conductive film 23 made of TiN is used.

The conductive film 23 can be preferably formed by a CVD method, an ALD method, a PLD method, a plating method, a bias sputtering method, a sol-gel method, a method of using conductive polymer filling, or a method of using a supercritical fluid, and is particularly preferably formed by an ALD method. In addition, the conductive film 23 may be made of a laminated film including a plurality of dielectric layers that differ in material. In that case, after film formation is performed by an ALD method, film formation can be performed by another method.

The thickness of the conductive film 23 is not to be considered particularly limited, but is preferably 3 nm or more, more preferably 10 nm or more.

In this regard, the dielectric film 22 and conductive film 23 described above cover not only the surface of the metal porous body 21 but also a predetermined part of the insulating substrate 10 on the side with the first main surface 10*a*. Furthermore, as illustrated in FIG. 5, the dielectric film 22 and the conductive film 23 also cover the surface of the insulating substrate 10 in sections that define the second through-holes 12 provided in the insulating substrate 10. More specifically, at a boundary part between the second via conductor 14 and the substrate of the insulating substrate 10, the substrate of the insulating substrate 10 is covered with a dielectric film 22 the dielectric film 22 is covered with the conductive film 23, and the conductive film 23 is further covered with the second via conductor 14.

Thus, the conductive film 23 is connected directly to the second via conductor 14, and is connected to the second via conductor 14 with the columnar conductor 18 interposed therebetween. Thus, the above-described second external connection line as a negative electrode is connected to the capacitance forming part 20 with the second via conductor 14 interposed therebetween or with the second via conductor 14 and the columnar conductor 18 interposed therebetween.

As illustrated in FIGS. 1 and 3, the sealing part 30 is provided on the first main surface 10*a* of the insulating substrate 10 to seal together with the insulating substrate 10, the capacitance forming part 20, and define an outer surface 30*a* located on the side opposite to the side with the insulating substrate 10 as viewed from the capacitance forming part 20. More specifically, the sealing part 30 is located so as to cover the upper side, lateral side, and lower side of the capacitance forming part 20 provided so as to face the first main surface 10*a* of the insulating substrate 10, and is further located so as to holes provided inside the capacitance forming part 20.

The sealing part 30 can be made of various insulating materials, and is preferably made of an insulating material that is excellent in weather resistance. The material of the sealing part 30 can be, for example, a resin material such as a polyimide resin, a polybenzoxazole resin, a polyethylene terephthalate resin, a benzocyclobutene resin, or an epoxy resin. In addition, the resin material can contain various additives, and may contain therein an $SiO_2$ filler, an $Al_2O_3$ filler, or the like, for example, for adjusting the thermal expansion coefficient. According to the present embodiment, the sealing part 30 made of an epoxy resin is used.

Further, when it is difficult to secure moisture resistance only with the sealing part 30, a moisture-resistant protective film may be formed between the capacitance forming part 20 and the sealing part 30. For example, before forming the sealing part 30, the moisture-resistant protective film can be formed by providing an inorganic insulator made of SiN, $SiO_2$, $Al_2O_3$, $HfO_2$, $ZrO_2$, or the like by a CVD method, an ALD method, or the like so as to cover the capacitance forming part 20, or by providing an organic insulator with water repellency, such as a fluorine-based resin or a silane coupling agent resin, so as to cover the capacitance forming part 20. In this regard, the moisture-resistant protective film does not necessarily have to be formed inside of the capacitance forming part 20, and it is sufficient for the film to be formed to cover only the outer surface.

The sealing part 30 can be formed by various coating methods, and for example, a method using a vacuum laminator, a method using an air dispenser, a method using a jet dispenser, a screen printing method, a vacuum printing method, an electrostatic coating method, an inkjet method, a photolithography method, or the like can be used.

The thickness and size of the sealing part 30 are not to be considered particularly limited, and the size is appropriately set depending on the size of the insulating substrate 10. In this regard, the thickness of the sealing part 30 is preferably, for example, 5 μm to 50 μm, and the size is preferably, for example, such a size that covers the entire surface of the first main surface 10*a* of the insulating substrate 10.

The thickness of the sealing part 30 described above is measured, for example, by observing a section orthogonal to the extending direction of the first main surface 10*a* of the insulating substrate 10 with the use of an optical microscope.

Specifically, when the longitudinal direction of the capacitor 1A in a plan view of the capacitor 1A, the lateral direction thereof, and the thickness direction (that is, the normal direction of the first main surface 10*a*) of the capacitor 1A are denoted respectively by Lx, Ly, and Lz, first, the capacitor 1A is subjected to a polishing treatment so as to expose a Lx-Lz section of a part of the capacitor 1A located at the center in the Ly direction. The polishing treatment is performed such that the exposed section is located within an error range of +100 μm in the Ly direction with the central position as a reference.

Next, a part in the vicinity of the outer surface 30*a* in the exposed section is observed at a magnification of 1000 times with the use of an optical microscope. The observation range of the section in the Lx direction is a range of ±50 μm with center position of the section in the Lx direction as a reference, and is a range in which neither the support conductor 15 nor the columnar conductor 18 is provided.

Next, in the observation range of the section, the thickness of the sealing part 30 in the Lz direction is measured at ten sites at equal intervals in the Lx direction, and the average value thereof is calculated. The average value calculated in this manner is the thickness of the sealing part 30. In this regard, in FIG. 6, three of the thicknesses of the sealing part 30 in the Lz direction, measured at the ten sites, are illustrated as line segment lengths e1, e2, and e3.

With the foregoing configuration, in the capacitor 1A according to the present embodiment, the capacitance forming part 20 including the metal porous body 21, the dielectric film 22, and the conductive film 23 is sealed by the insulating substrate 10 and the sealing part 30, and an electrical extension from the capacitance forming part 20 is achieved by the pair of external connection lines.

Figure 7:
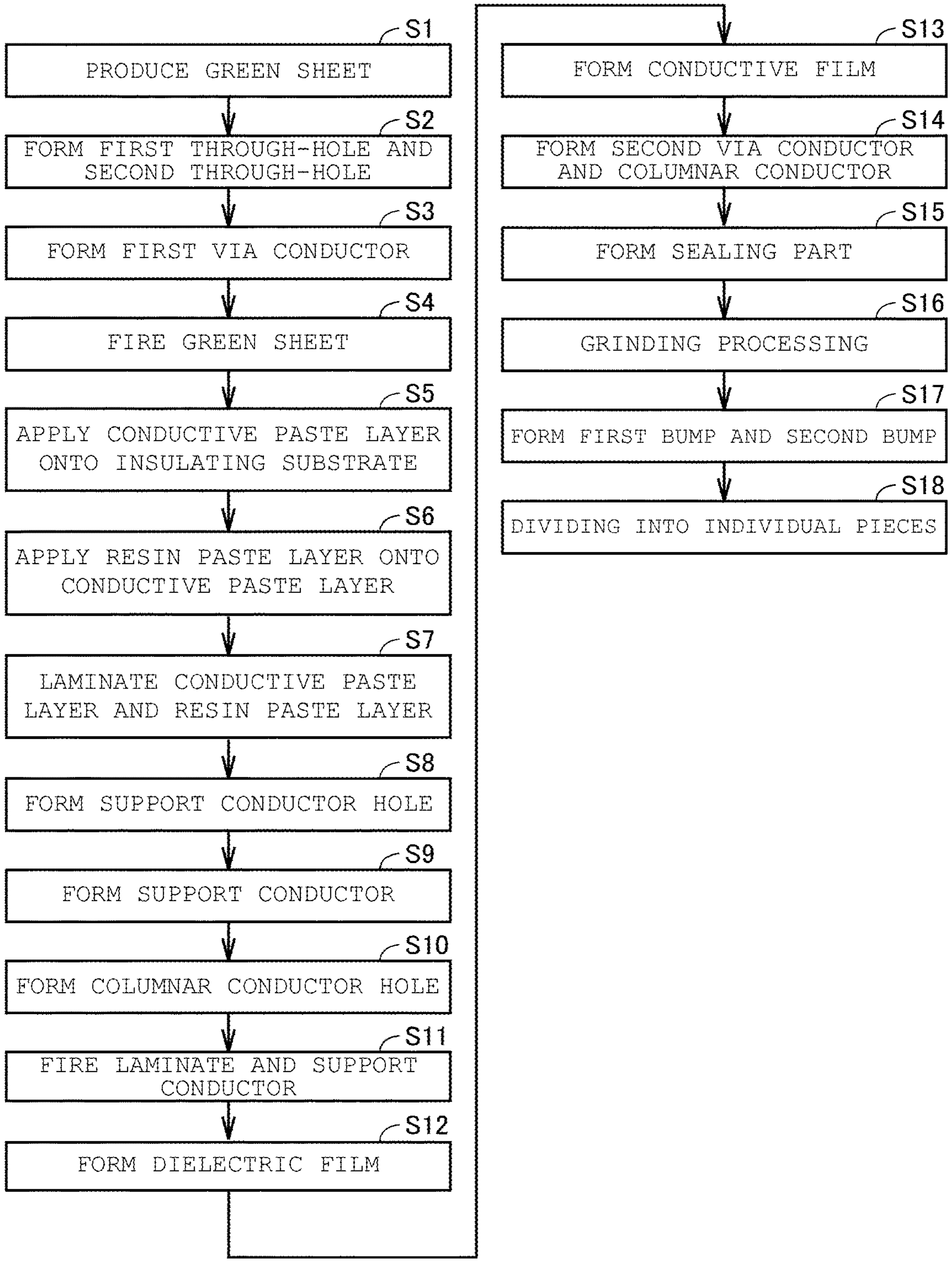
FIG. 7 is a flowchart illustrating a method for manufacturing the capacitor according to the first embodiment.

FIG. 7 is a flowchart illustrating a method for manufacturing the capacitor according to the present embodiment. FIGS. 8 to 21 are schematic sectional views for illustrating respective steps of the manufacturing flow illustrated in FIG. 7. Next, an example of a specific manufacturing method for manufacturing the capacitor 1A according to the present embodiment described above will be described with reference to FIGS. 7 to 21.

The method for manufacturing the capacitor 1A as described below is a method for simultaneously mass-producing a plurality of capacitors 1A by collectively performing treatments for processing up to a middle stage of the manufacturing process to produce an assembly of capacitors in process, thereafter dividing the assembly into individual pieces, and further applying treatments for processing to the individual pieces in process.

First, as illustrated in FIG. 7, in a step S1, a green sheet is produced. Specifically, an $Al_2O_3$ powder and glass powder are weighed, and the $Al_2O_3$ powder and the glass powder, an organic solvent such as toluene or ethanol, and a binder such as polyvinyl butyral are mixed. Thereafter, the mixture is formed into a sheet shape, thereby producing a green sheet as a base for the insulating substrate. It is to be noted that after the production of the green sheet, the green sheet is cut to prepare a plurality of green sheets.

Next, as illustrated in FIG. 7, in a step S2, first through-holes and second through-holes are formed in a part of the plurality of green sheets. Specifically, at predetermined positions of the green sheet, the first through-holes to be filled later with a first via conductor that is a part of a positive electrode is provided, and the second through-holes to be filled later with a second via conductor that is a part of a negative electrode is provided.

In this regard, a method for forming the first through-holes and the second through-holes is not to be considered particularly limited, but for example, the first through-hole and the second through-hole can be formed by irradiating the green sheet with laser light. In addition, the first through-holes and the second through-holes may also be formed by processing with a mechanical puncher used or sandblasting.

Next, as illustrated in FIG. 7, in a step S3, the first via conductor is formed in the green sheet with the first through-holes and second through-holes formed. Specifically, a conductive paste is applied to the green sheet so as to embed the first through-holes. It is to be noted that in that regard, the second through-holes are not filled with the conductive paste.

In this regard, the method for applying the conductive paste is not to be considered particularly limited, but for example, a screen printing method can be used.

Next, as illustrated in FIG. 7, in a step S4, the green sheet is subjected to firing. Specifically, the green sheet without the first through-holes, the second through-holes, or the like provided is stacked on the green sheet with the conductive paste applied thereto in the step S3, and the stacked green sheets are subjected to pressure bonding. Then, the laminate of the green sheets subjected to the pressure bonding is subjected to a degreasing treatment, and then the laminate of the green sheets subjected to the degreasing treatment is subjected to firing.

In this regard, in stacking the green sheets, the green sheet without the first through-holes, the second through-holes, or the like provided is stacked on the other main surface facing the one main surface of the green sheet with the conductive paste applied thereto. In addition, in pressure-bonding the green sheets, for example, a uniaxial pressing machine can be used. Furthermore, the green sheets are subjected to firing, for example, under a temperature condition of 700° C. to 1000° C. in an air atmosphere.

Figure 8:
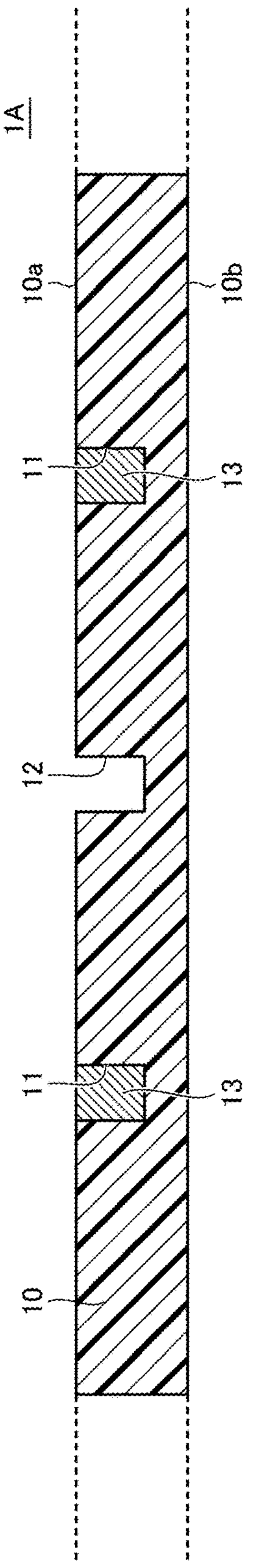
FIG. 8 is a schematic sectional view illustrating a state after completing a step S4 of the manufacturing flow illustrated in FIG. 7.

Through the steps S1 to S4 described above, the insulating substrate as illustrated in FIG. 8 is obtained. In this regard, the insulating substrate is a so-called multiple substrate where insulating substrates to be finally included respectively in a plurality of capacitors are connected in a matrix, but in FIG. 8, attention is focused on only one of insulating substrates 10, and the peripheral part thereof is illustrated to be omitted by broken lines.

In addition, in the foregoing description, a case in which the first through-holes and the second through-holes are formed in the step S2, and then, the first via conductor is provided in the step S3 has been exemplified, but only the first through-hole may be formed first, and the second through-holes may be formed after the formation of the first via conductor.

In addition, in the foregoing description, a case where the green sheets and the conductive paste are simultaneously subjected to firing has been described as an example, but the first via conductor and the second through-holes may be provided after firing the insulating substrate without the through-hole or the like provided. In that case, the first through-holes and the second through-holes may be provided in the fired insulating substrate by, for example, a sandblasting method, a wet etching method, a dry etching method, or the like, and then, the conductive paste may be applied, and subjected to firing. In addition, the first via conductor may be formed by sputtering, vapor deposition, plating, or the like.

Figure 9:
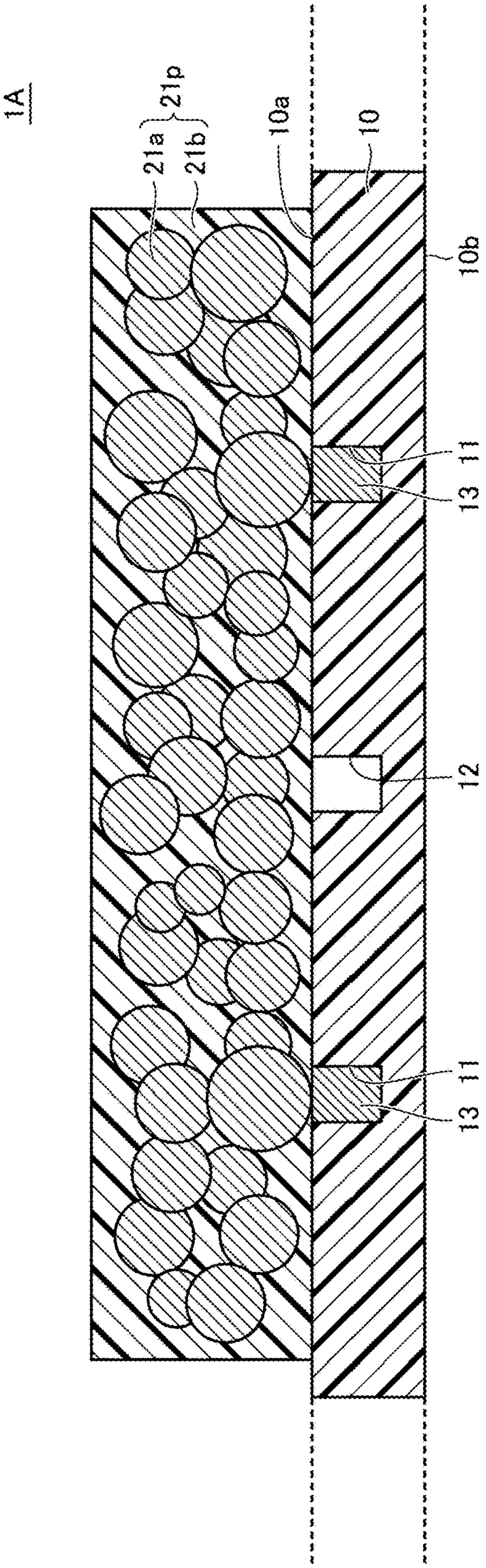
FIG. 9 is a schematic sectional view for illustrating a step S5 of the manufacturing flow illustrated in FIG. 7.

Next, as illustrated in FIG. 7, in a step S5, a conductive paste layer for forming the metal porous body 21 is applied. More specifically, as illustrated in FIG. 9, a conductive paste layer 21*p* for forming the metal porous body 21 described later is applied onto the first main surface 10*a* of the insulating substrate 10.

In this regard, before applying the conductive paste for the formation of the metal porous body 21, the second through-holes 12 provided in the insulating substrate 10 is preferably provided with a blocking part that blocks the second through-holes 12 by applying an epoxy resin or the like (not illustrated). This is for preventing the conductive paste from entering the inside of the second through-holes 12.

Next, conductive metal particles 21*a*, and a binder 21*b* including an organic solvent such as terpineol and a varnish of ethyl cellulose are weighed and mixed, and based on the mixture, the conductive paste is prepared by using a roll machine. The conductive paste thus prepared is applied onto the first main surface 10*a* of the insulating substrate 10 so as to have a rectangular pattern shape in plan view as a whole, and dried. According to the present embodiment, the conductive paste containing the metal particles 21*a* made of Ni is used.

In this case, the conductive paste is overapplied multiple times, and thus, the conductive paste is applied onto the insulating substrate 10 so as to form a layer with a predetermined thickness. The individual conductive pastes applied onto the insulating substrate 10 serve as the metal porous body 21 described above through a firing step, which will be described later. In this regard, in the following description, the layered conductive paste including the metal particles 21*a* and the binder 21*b*, formed in this manner, is referred to as a conductive paste layer 21*p*.

Figure 10:
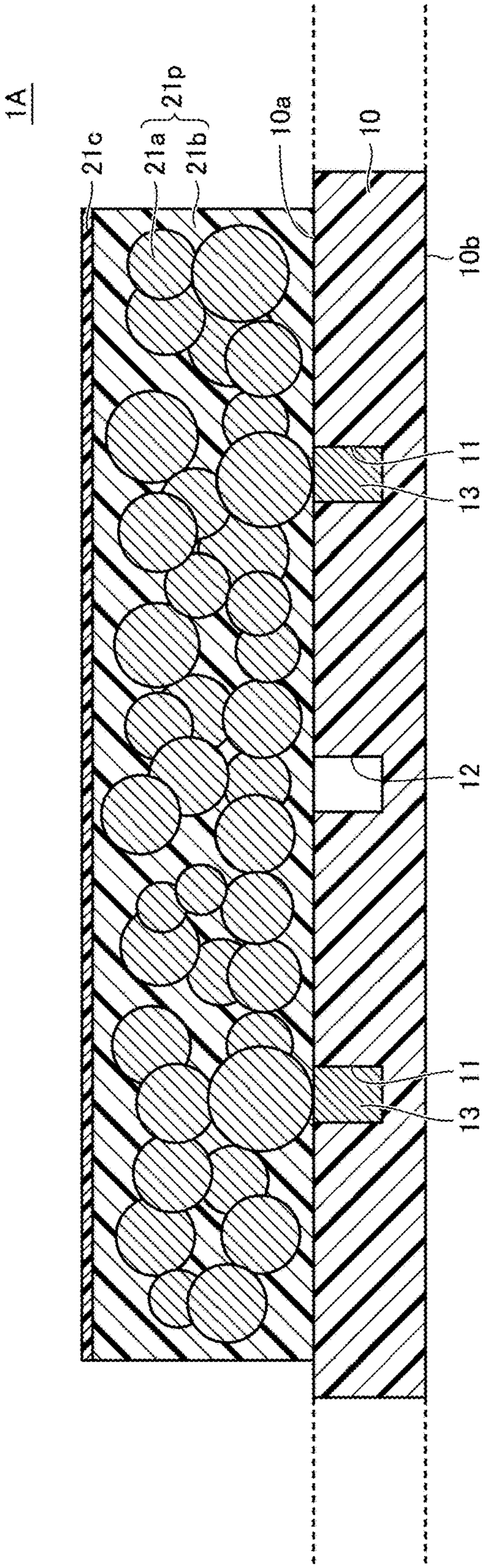
FIG. 10 is a schematic sectional view for illustrating a step S6 of the manufacturing flow illustrated in FIG. 7.

Next, as illustrated in FIG. 7, in a step S6, a resin paste layer is applied. More specifically, as illustrated in FIG. 10, a resin paste layer 21*c* is further applied onto the conductive paste layer 21*p* formed in the sheet shape on the first main surface 10*a* of the insulating substrate 10, so as to have a rectangular shape in plan view as a whole, and dried.

The resin paste layer 21*c* is intended to partition a plurality of conductive paste layers 21*p*, which will be described later, and disappear in the firing step, which will be described later, and is made of, for example, an acrylic resin, polyvinyl butyral (PVB), or the like. According to the present embodiment, the resin paste layer 21*c* made of an acrylic resin is used.

Figure 11:
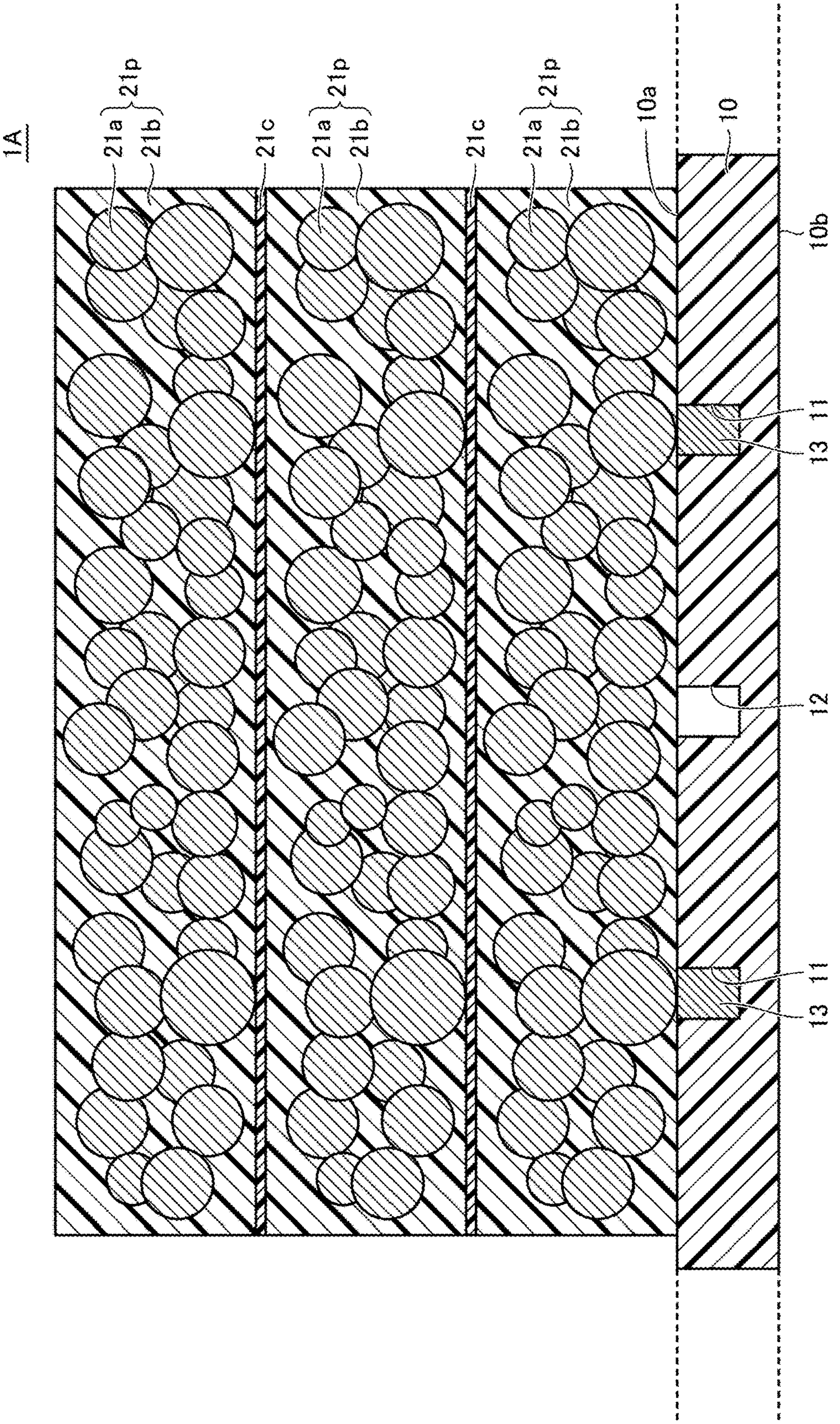
FIG. 11 is a schematic sectional view for illustrating a step S7 of the manufacturing flow illustrated in FIG. 7.

Next, as illustrated in FIG. 7, in a step S7, the conductive paste layer and the resin paste layer are further laminated. More specifically, as illustrated in FIG. 11, on the conductive paste layer 21*p* and resin paste layer 21*c* already applied onto insulating substrate 10, the conductive paste layer 21*p* and the resin paste layer 21*c* are further laminated so as to be alternately disposed in the normal direction of the first main surface 10*a*. Thus, a laminate including the plurality of conductive paste layers 21*p* and a plurality of resin paste layers 21*c* is formed on the insulating substrate 10.

In this regard, according to the present embodiment, the laminate described above includes three conductive paste layers 21*p* in total and two resin paste layers 21*c* in total, but the numbers of conductive paste layers 21*p* and the resin paste layers 21*c* are not to be considered particularly limited, and are appropriately set depending on a desired capacitance.

In addition, according to the present embodiment, the layer located farthest from the first main surface 10*a* of the insulating substrate 10 is formed to serve as the conductive paste layer 21*p*, but the resin paste layer 21*c* may be formed to serve as the layer farthest therefrom.

Figure 12:
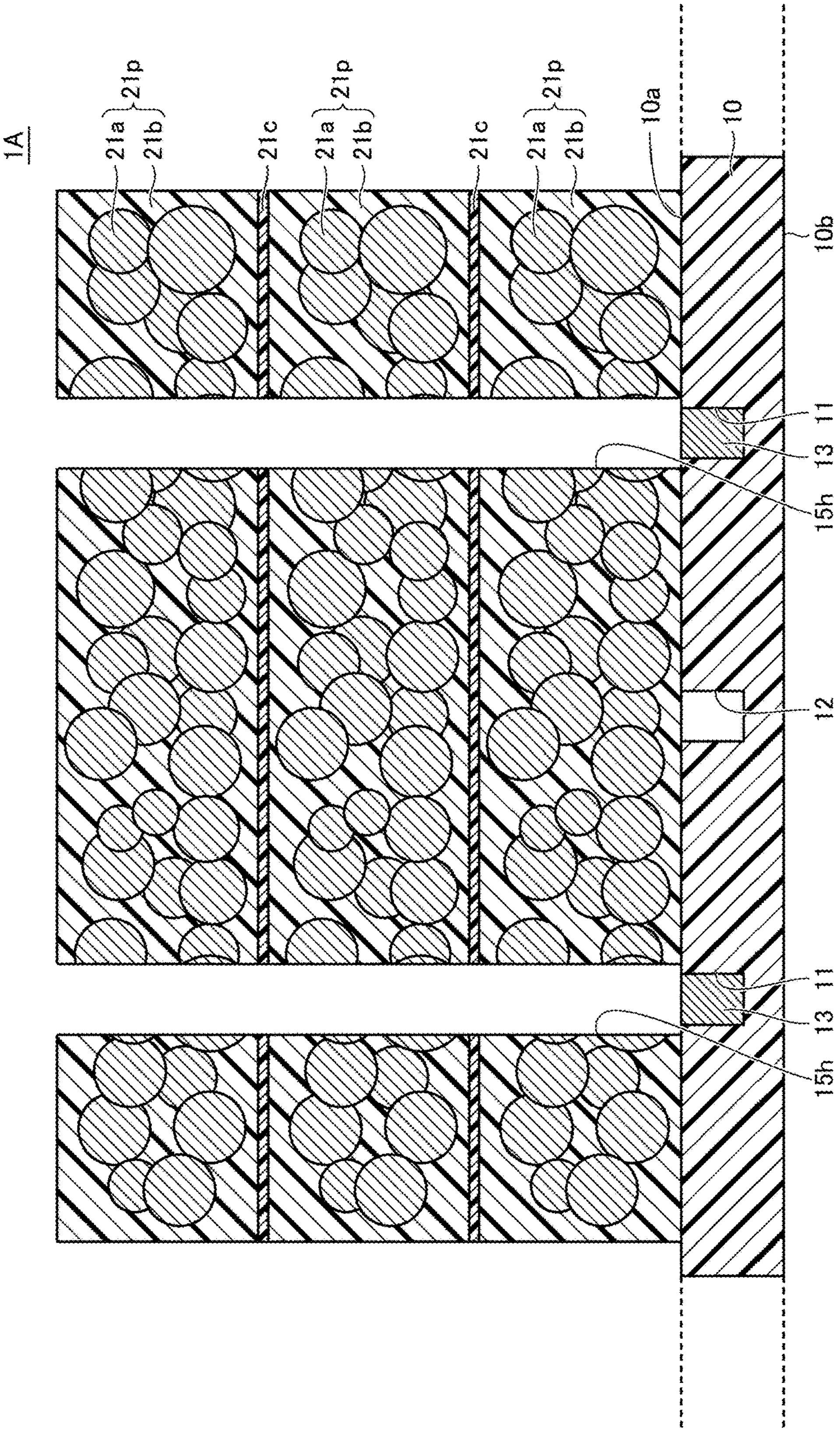
FIG. 12 is a schematic sectional view for illustrating a step S8 of the manufacturing flow illustrated in FIG. 7.

Next, as illustrated in FIG. 7, support conductor holes are formed in a step S8. More specifically, as illustrated in FIG. 12, a plurality of support conductor holes 15*h* that penetrate the laminate are formed in the laminate at sites located to overlap with the first via conductors 13 as viewed in the normal direction of the first main surface 10*a*. The plurality of support conductor holes 15*h* will be filled with support conductors in a step of forming the support conductors, which will be described later. In addition, according to the present embodiment, the section of each of the plurality of support conductor holes 15*h* is configured to be larger than the section of each of the first via conductors 13.

In this regard, the method for forming the support conductor holes 15*h* is not to be considered particularly limited, but for example, the support conductor holes 15*h* can be formed by irradiating the laminate with laser light. In addition, the support conductor holes 15*h* may also be formed by processing with a mechanical puncher used or sandblasting.

Figure 13:
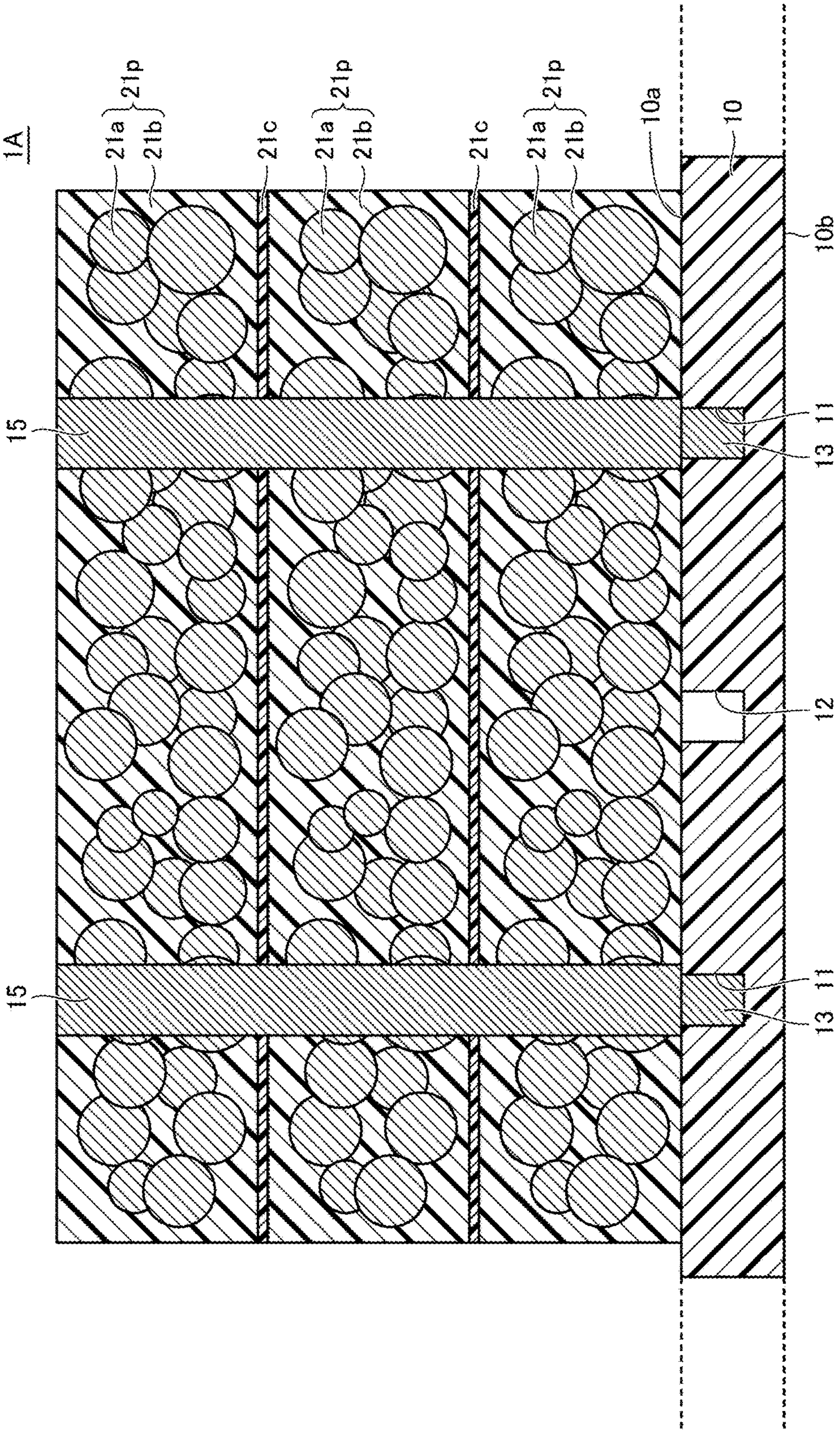
FIG. 13 is a schematic sectional view for illustrating a step S9 of the manufacturing flow illustrated in FIG. 7.

Next, as illustrated in FIG. 7, support conductors are formed in a step S9. More specifically, as illustrated in FIG. 13, the support conductor holes 15*h* are filled with a conductive paste so as to fill the plurality of support conductor holes 15*h*. The plurality of support conductors 15 formed in this manner protrude from the first main surface 10*a* toward the laminate, and is surrounded by the laminate. In addition, each of the plurality of support conductors 15 formed in this manner is connected to each of the plurality of first via conductors 13.

According to the present embodiment, a Ni paste is used as the conductive paste filling the support conductor holes 15*h*. In the case of such a configuration, the support conductors 15 including the same material as the material included in the metal particles 21*a* (that is, the material included in the metal porous body 21) can be formed, and thus, the support conductors 15 and the metal porous body 21 will be firmly metal-bonded through the firing step, which will be described later.

In this regard, the method for applying the conductive paste filling the support conductor holes 15*h* is not to be considered particularly limited, but for example, a screen printing method can be used.

Figure 14:
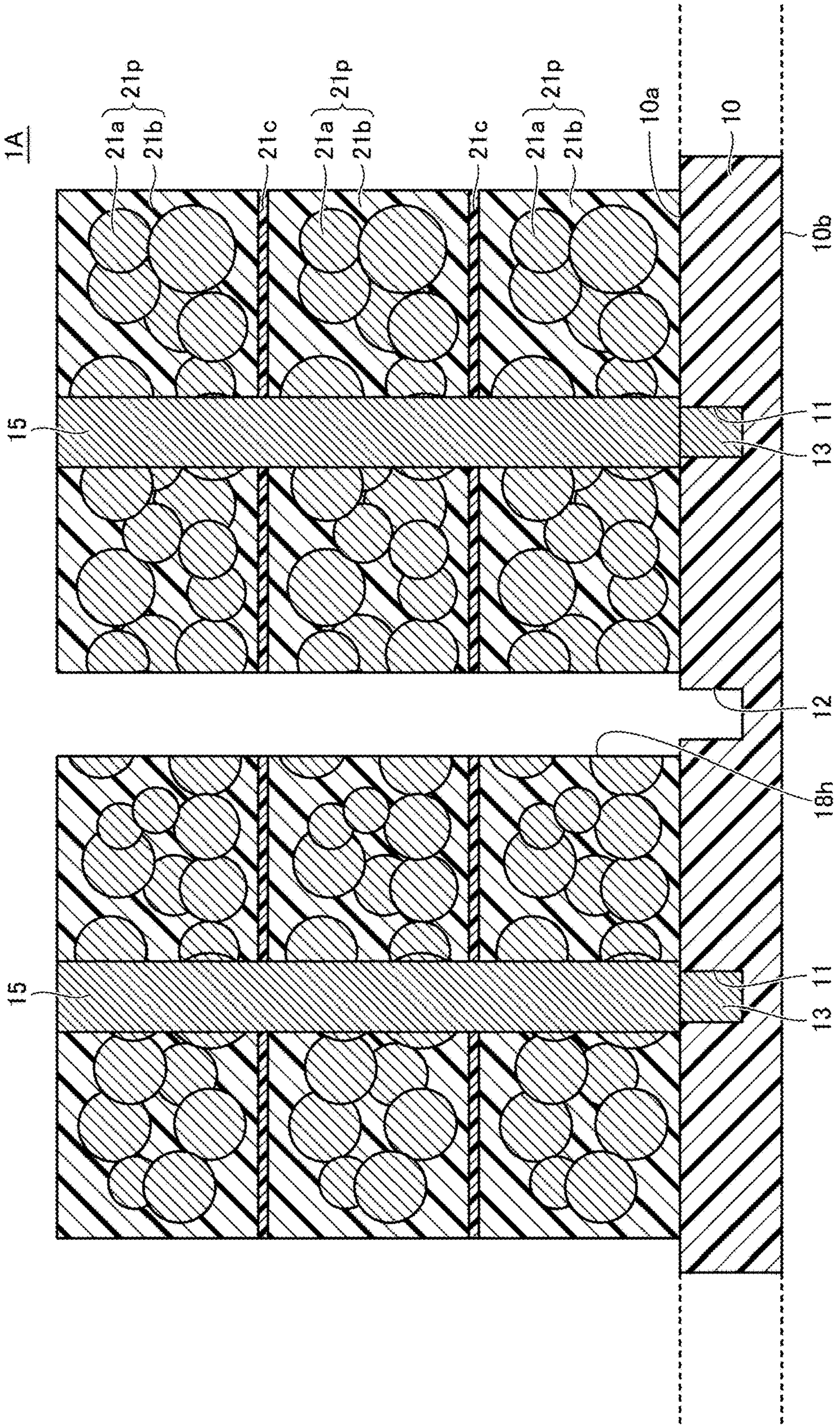
FIG. 14 is a schematic sectional view for illustrating a step S10 of the manufacturing flow illustrated in FIG. 7.

Next, as illustrated in FIG. 7, columnar conductors are formed in a step S10. More specifically, as illustrated in FIG. 14, a plurality of columnar conductor holes 18*h* are formed in the laminate at sites located to overlap with the second through-holes 12 as viewed in the normal direction of the first main surface 10*a*, so as to penetrate the laminate to reach the second through-holes 12. The plurality of columnar conductor holes 18*h* will be filled with columnar conductors in a step of forming the columnar conductors, which will be described later. In addition, according to the present embodiment, the section of each of the plurality of columnar conductor holes 18*h* is configured to be larger than the section of each of the second through-holes 12.

In this regard, the method for forming the columnar conductor holes 18*h* is not to be considered particularly limited, but for example, the columnar conductor holes 18*h* can be formed by irradiating the laminate with laser light. In addition, the columnar conductor holes 18*h* may also be formed by processing with a mechanical puncher used or sandblasting.

Figure 15:
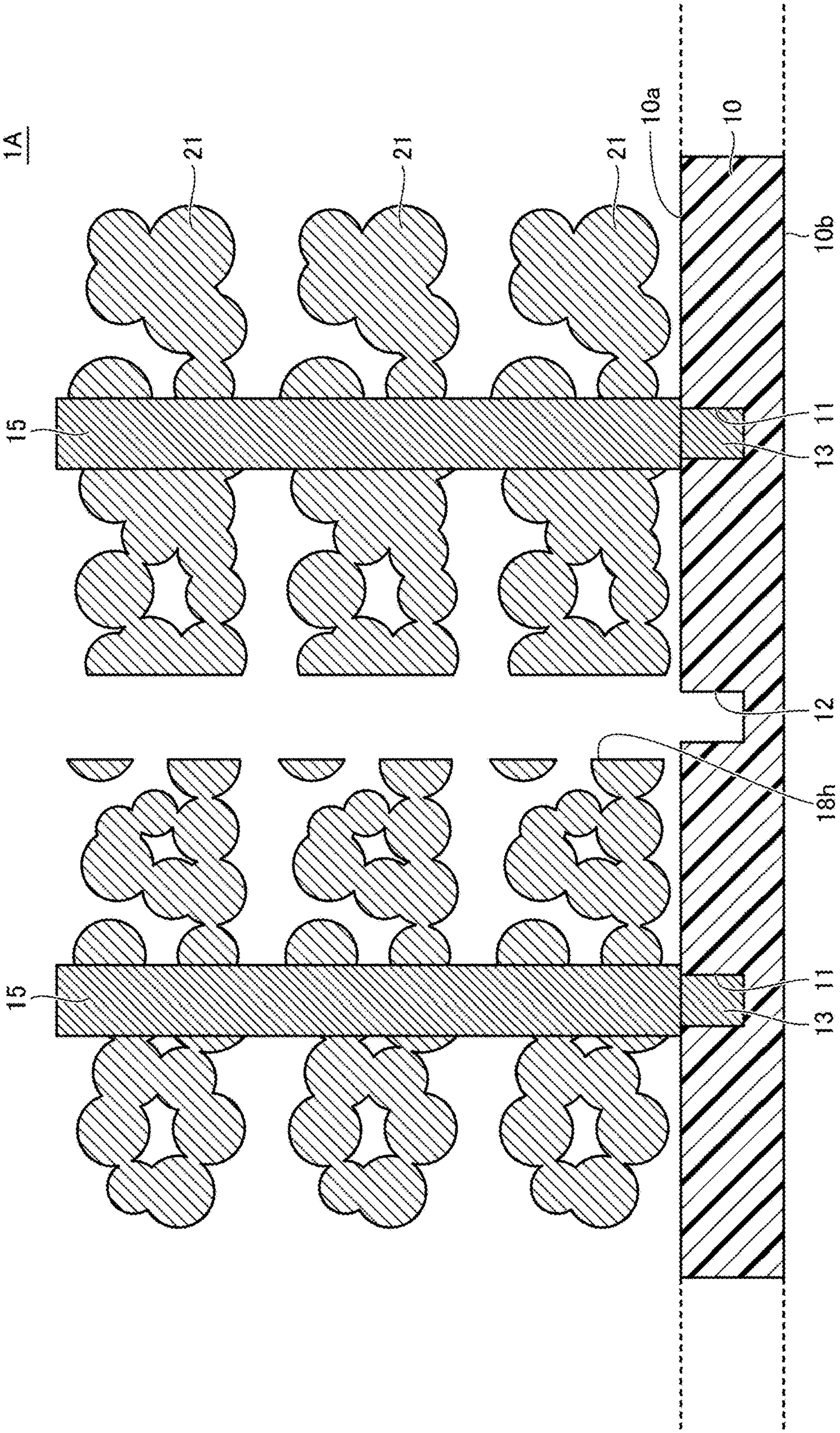
FIG. 15 is a schematic sectional view for illustrating a step S11 of the manufacturing flow illustrated in FIG. 7.

Next, as illustrated in FIG. 7, in a step S11, the laminate and the support conductors are subjected to firing. More specifically, as illustrated in FIG. 15, the laminate and the support conductors 15 are fired, and thus, the adjacent metal particles 21*a* included in the conductive paste layer 21*p* are made sintered and then metal-bonded, and the metal particles 21*a* and the support conductor 15 adjacent to the metal particles 21*a* are joined. In addition, the resin paste layer 21*c* included in the laminate disappears with heat at the time of the firing, thereby forming a plurality of metal porous bodies 21 stacked apart from each other in the normal direction of the first main surface 10*a*.

Further, at the time of the firing described above, the blocking parts blocking the second through-holes 12, made of, for example, an epoxy resin, are also burned out by the heat.

In performing the firing described above, the insulating substrate 10 is subjected to a degreasing treatment prior to the firing, and thereafter, the above-described laminate and support conductors 15 are subjected to the firing, for example, under a temperature condition of 400° C. to 900° C. under a reducing atmosphere in which nitrogen and hydrogen are mixed.

It is to be noted that the atmosphere at the time of the firing is preferably a reducing atmosphere as described above, but can be set to be an atmosphere that is equal to or less than the equilibrium oxygen partial pressure of a metal selected as a main component of the metal particles 21*a*.

In this regard, as described above, the support conductors 15 contains Ni, which is the same material as the material included in the metal particles 21*a* in the conductive paste layers 21*p*. In the case of such a configuration, the metal particles 21*a* and the support conductors 15 are made sintered and then metal-bonded by the firing described above, and thus, the mechanical strength of the joints between the metal particles 21*a* and the support conductors 15 will be improved.

In addition, while the insulating substrate 10 will be warped unacceptably due to the heat load at the time of the firing described above If all or most of the capacitance forming part 20 is directly bonded to the insulating substrate 10, the above-described support conductors 15 are provided for suppressing the warpage according to the present embodiment, and this matter will be described later.

Figure 16:
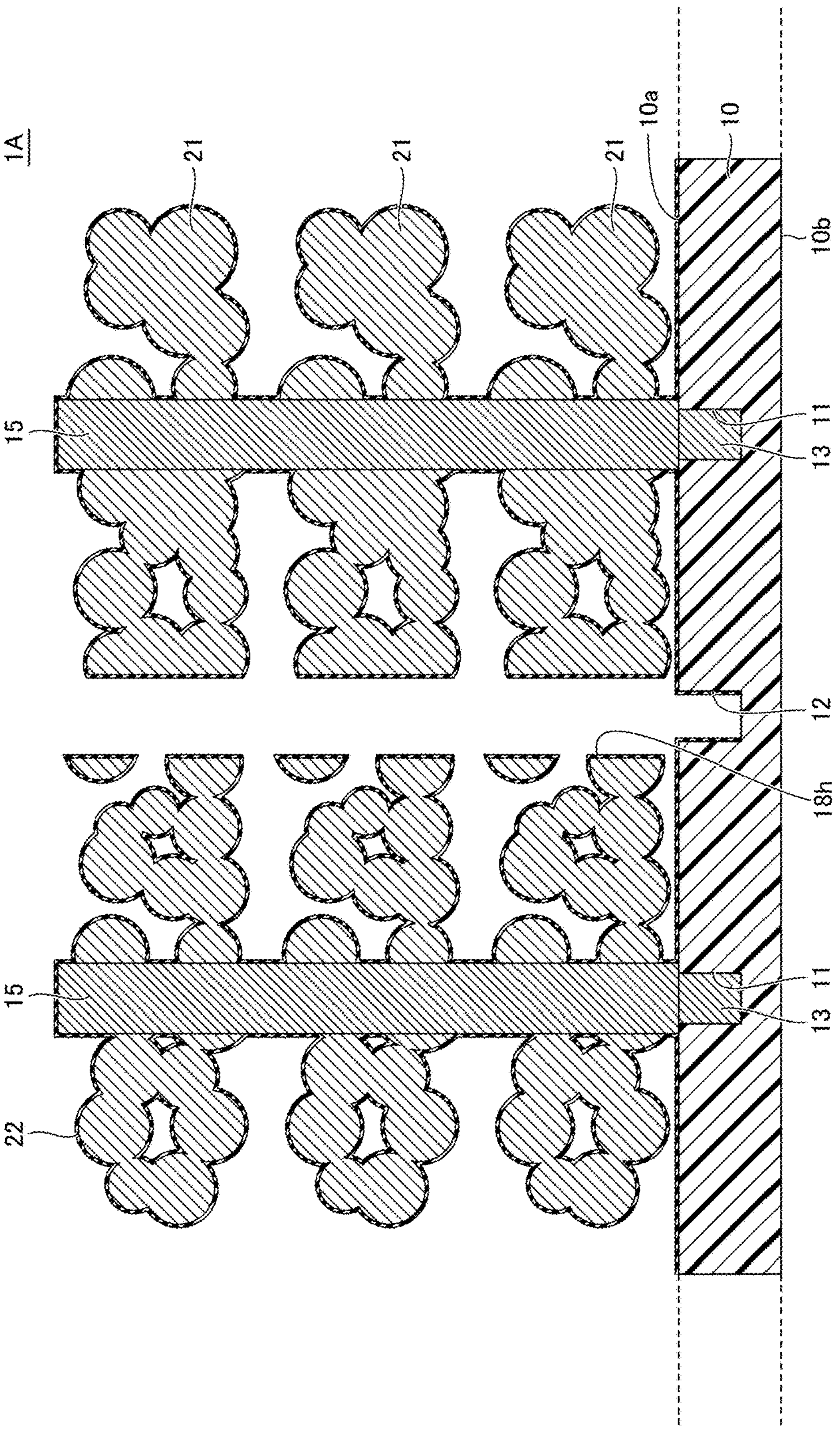
FIG. 16 is a schematic sectional view for illustrating a step S12 of the manufacturing flow illustrated in FIG. 7.

Next, as illustrated in FIG. 7, a dielectric film is formed in a step S12. More specifically, as illustrated in FIG. 16, the dielectric film 22 is formed to cover the surfaces of the first main surface 10*a*, metal porous body 21, and support conductors 15, and cover the surface of the insulating substrate 10 in sections that define the second through-holes 12 provided in the insulating substrate 10.

In this regard, the method for forming the dielectric film 22 is not to be considered particularly limited as described above, but an ALD method is preferably used. The use of the ALD method allows a raw material for the dielectric film 22 to be supplied as a gas, thus allowing the selection of the material and the adjustment of the film thickness at an atomic layer level. For that reason, also when the fine pores provided inside the metal porous body 21 are extremely small, a homogeneous and dense dielectric film 22 can be formed. In addition, the use of the ALD method allows the surface of the insulating substrate 10 in the sections that define the second through-holes 12 provided in the insulating substrate 10 to also be easily covered with the dielectric film 22.

In the case of forming the dielectric film 22 by using the ALD method, it is preferable to use, as a raw material gas, a raw material gas that is high in vapor pressure, easily turned into a gas, additionally, high in thermal stability, and high in reactivity such that the raw material gas will spread into the fine pores provided inside the metal porous body 21 and into the second through-holes 12 provided in the insulating substrate 10. From this viewpoint, for example, in the case of forming an $AlO_x$ film, trimethylaluminum (TMA) is preferably used as a raw material, and in the case of forming an $SiO_x$ film, trisdimethylaminosilane (TDMAS) is preferably used as the raw material. According to the present embodiment, the dielectric film 22 is formed with the use of the ALD method.

In addition, the dielectric film 22 is formed, for example, under a temperature condition of 150° C. or higher and 400° C. or lower although the conduction differs depending on the film forming method and the film forming material. While the insulating substrate 10 will be warped unacceptably due to the heat load in forming the dielectric film 22 If all or most of the capacitance forming part 20 is directly bonded to the insulating substrate 10, the above-described support conductors 15 are provided for suppressing the warpage according to the present embodiment, and this matter will be described later.

Figure 17:
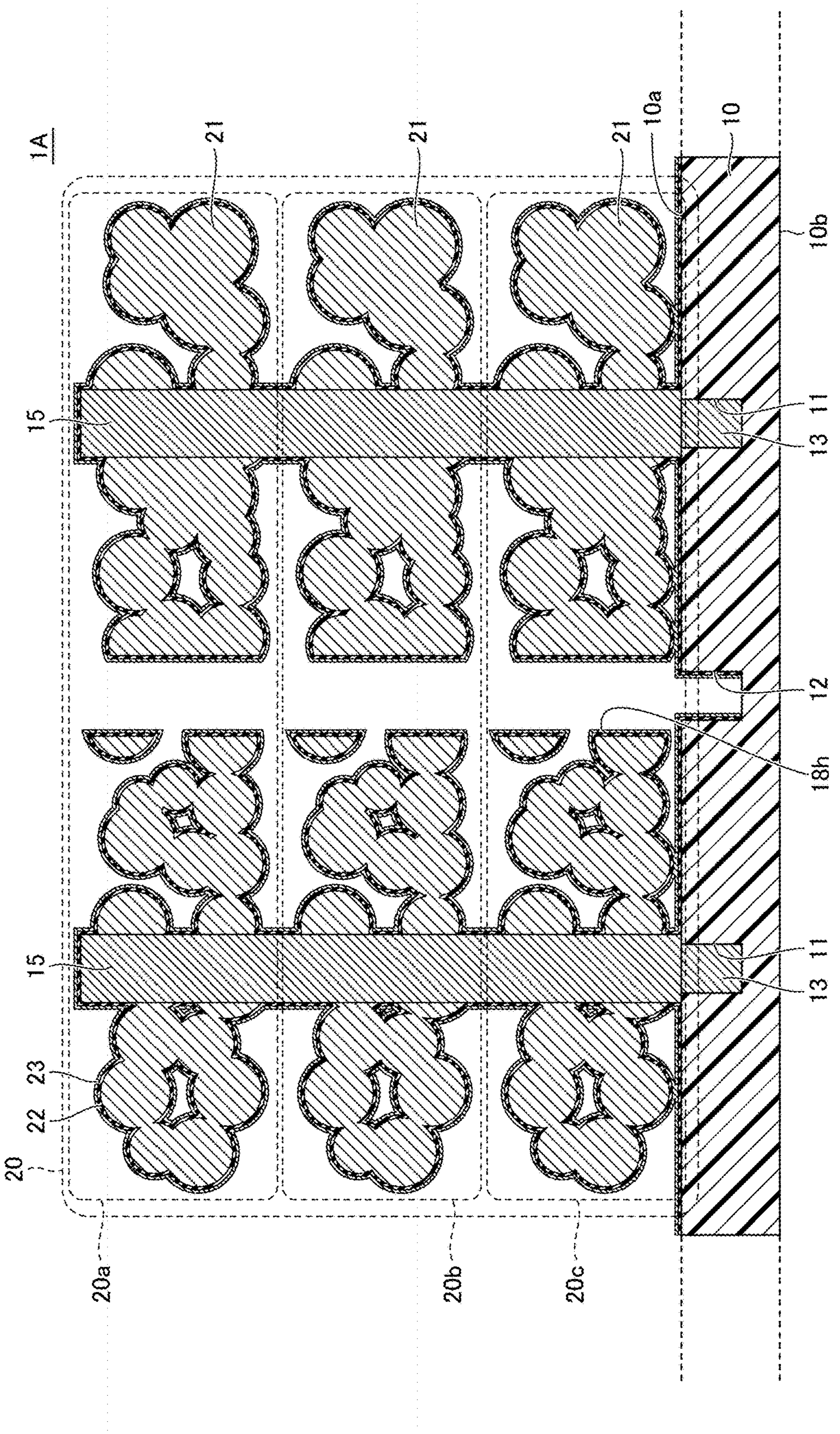
FIG. 17 is a schematic sectional view for illustrating a step S13 of the manufacturing flow illustrated in FIG. 7.

Next, as illustrated in FIG. 7, as conductive film is formed in a step S13. More specifically, as illustrated in FIG. 17, the conductive film 23 is formed to cover the dielectric film 22 formed in the step S12.

In this regard, the method for forming the conductive film 23 is not to be considered particularly limited as described above, but an ALD method is preferably used. The use of the ALD method allows a raw material for the conductive film 23 to be supplied as a gas, thus allowing the selection of the material and the adjustment of the film thickness at an atomic layer level. For that reason, also when the fine pores provided inside the metal porous body 21 are extremely small, a homogeneous and dense conductive film 23 can be formed. In addition, the use of the ALD method allows the dielectric film 22 provided inside the second through-holes 12 of the insulating substrate 10 to also be easily covered with the conductive film 23.

In addition, the conductive film 23 is formed, for example, under a temperature condition of 200° C. or higher and 600 or lower although the conduction differs depending on the film forming method and the film forming material. While the insulating substrate 10 will be warped unacceptably due to the heat load in forming the conductive film 23 If all or most of the capacitance forming part 20 is directly bonded to the insulating substrate 10, the above-described support conductors 15 are provided for suppressing the warpage according to the present embodiment, and this matter will be described later.

Through the steps S5 to S13 described above, as illustrated in FIG. 17, the capacitance forming part 20 including the metal porous body 21, the dielectric film 22, and the conductive film 23 is provided so as to face the first main surface 10*a* of the insulating substrate 10, and furthermore, the configuration of the capacitance forming part 20 includes a plurality of capacitance forming parts stacked apart from each other in the normal direction of the first main surface 10*a*.

Figure 18:
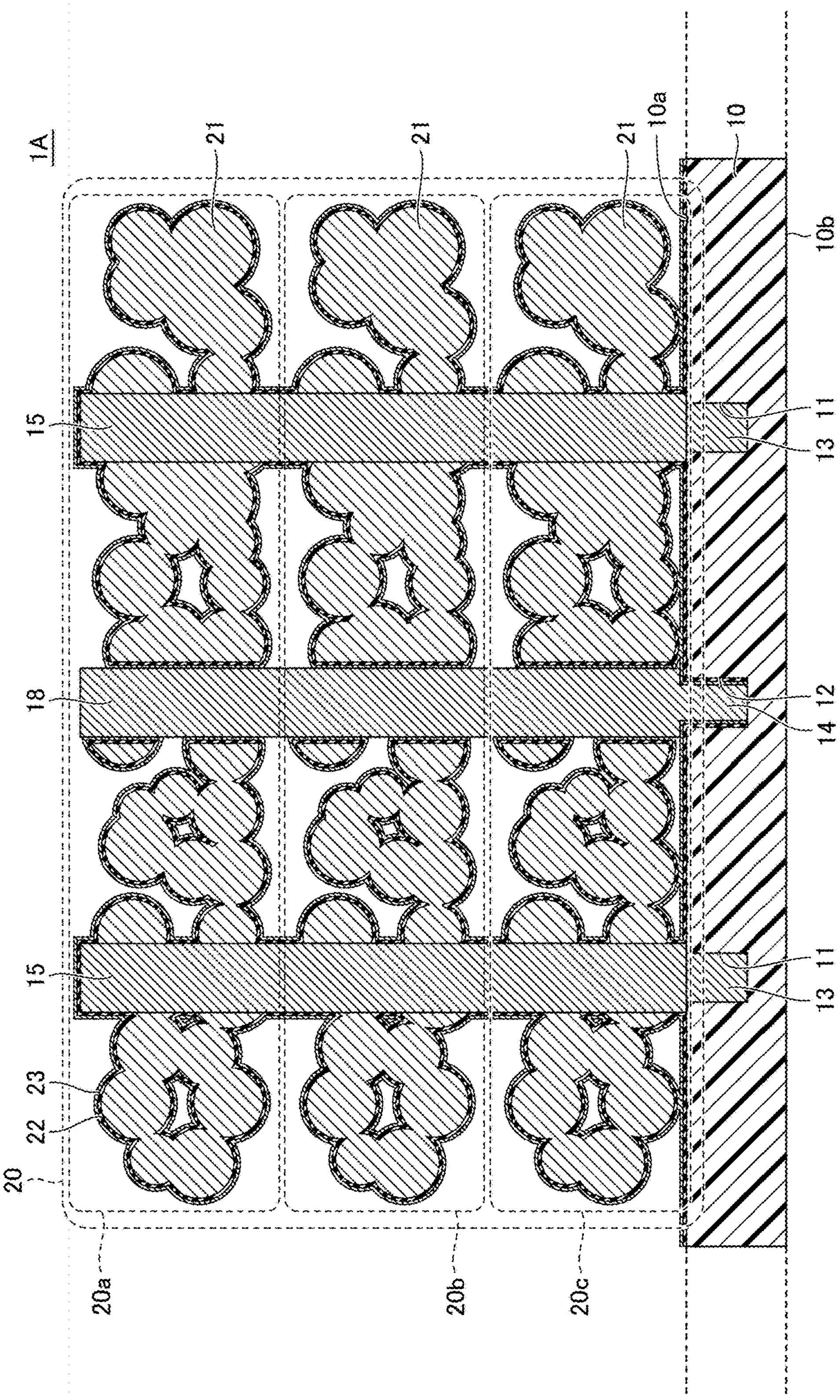
FIG. 18 is a schematic sectional view for illustrating a step S14 of the manufacturing flow illustrated in FIG. 7.

Next, as illustrated in FIG. 7, second via conductors and columnar conductors are formed on the insulating substrate in a step S14. More specifically, as illustrated in FIG. 18, the plurality of second via conductors 14 and the plurality of columnar conductors 18 are formed so as to fill the plurality of second through-holes 12 and the plurality of columnar conductor holes 18*h* provided in the insulating substrate 10.

In this regard, as described above, the second via conductors 14 and the columnar conductors 18 may be formed by a thick film forming method such as electrolytic plating or a screen printing method. According to the present embodiment, the second via conductors 14 and columnar conductor 18 made of Ni are both formed by electrolytic plating.

The second via conductors 14 thus formed are connected to the conductive film 23 covering the side surfaces of the second via conductors 14. In addition, the plurality of columnar conductors 18 formed in this manner protrude from the first main surface 10*a* toward the capacitance forming part 20, and are surrounded by the conductive film 23 of the capacitance forming part 20 to be connected to the conductive film 23. Thus, the plurality of columnar conductors 18 are connected to the capacitance forming part 20 with the conductive film 23 interposed therebetween.

The second via conductor 14 formed as described above is joined to the columnar conductor 18 at the end surface of the second via conductor 14 on the side with the capacitance forming part 20. Thus, the second via conductor 14 is not only connected to the capacitance forming part 20 with the conductive film 23 covering the second via conductor 14 interposed therebetween, but also connected to the capacitance forming part 20 with the columnar conductor 18 interposed therebetween.

Figure 19:
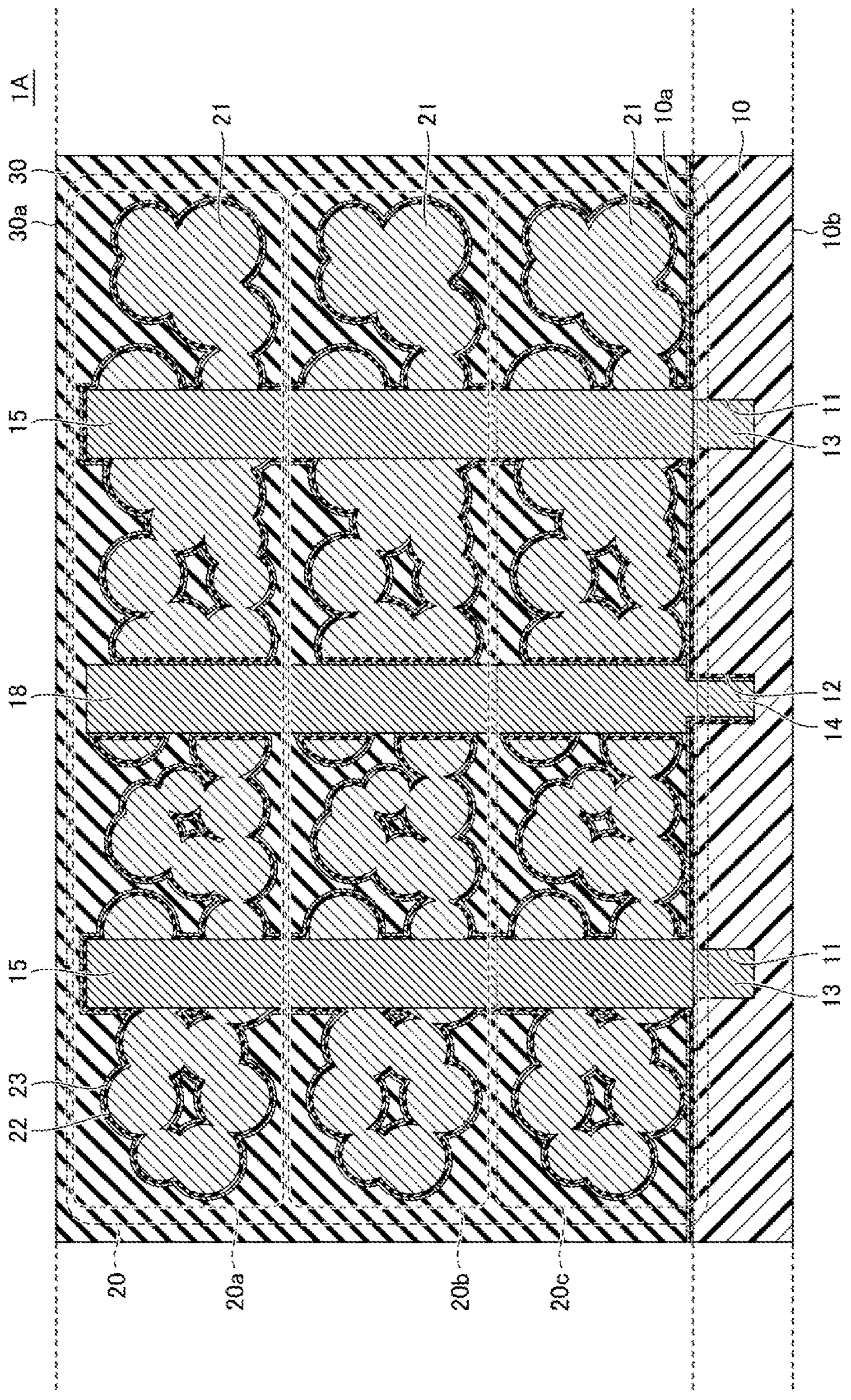
FIG. 19 is a schematic sectional view for illustrating a step S15 of the manufacturing flow illustrated in FIG. 7.

Next, as illustrated in FIG. 7, a sealing part is formed in a step S15. More specifically, as illustrated in FIG. 19, the sealing part 30 is provided on the first main surface 10*a* of the insulating substrate 10 provided with the capacitance forming part 20 so as to cover the capacitance forming part 20.

The sealing part 30 is formed by, for example, so-called compression molding. More specifically, a resin sheet is put on the first main surface 10*a* of the insulating substrate 10, and in this state, evacuation is performed with the use of a vacuum laminator to bring the resin sheet into close contact with the first main surface 10*a* of the insulating substrate 10. Then, in this state, the resin sheet is heated to 50° C. to 100° C. to laminate the capacitance forming part 20, and thereafter, heated to 100° C. to 200° C. to perform main curing, thereby forming the sealing part 30. It is to be noted that the method for forming the sealing part 30 is not limited to the compression molding described above, and may be performed by so-called transfer molding.

Thus, the capacitance forming part 20 is sealed by the insulating substrate 10 and the sealing part 30, and moisture can be prevented from entering the capacitance forming part 20 from the outside, thereby allowing moisture resistance to be secured. In addition, the capacitance forming part 20 is covered with the sealing part 30, and the capacitance forming part 20 is also physically protected by the sealing part 30. It is to be noted that the curing condition mentioned above is merely an example, and various changes can be made to the condition.

Figure 20:
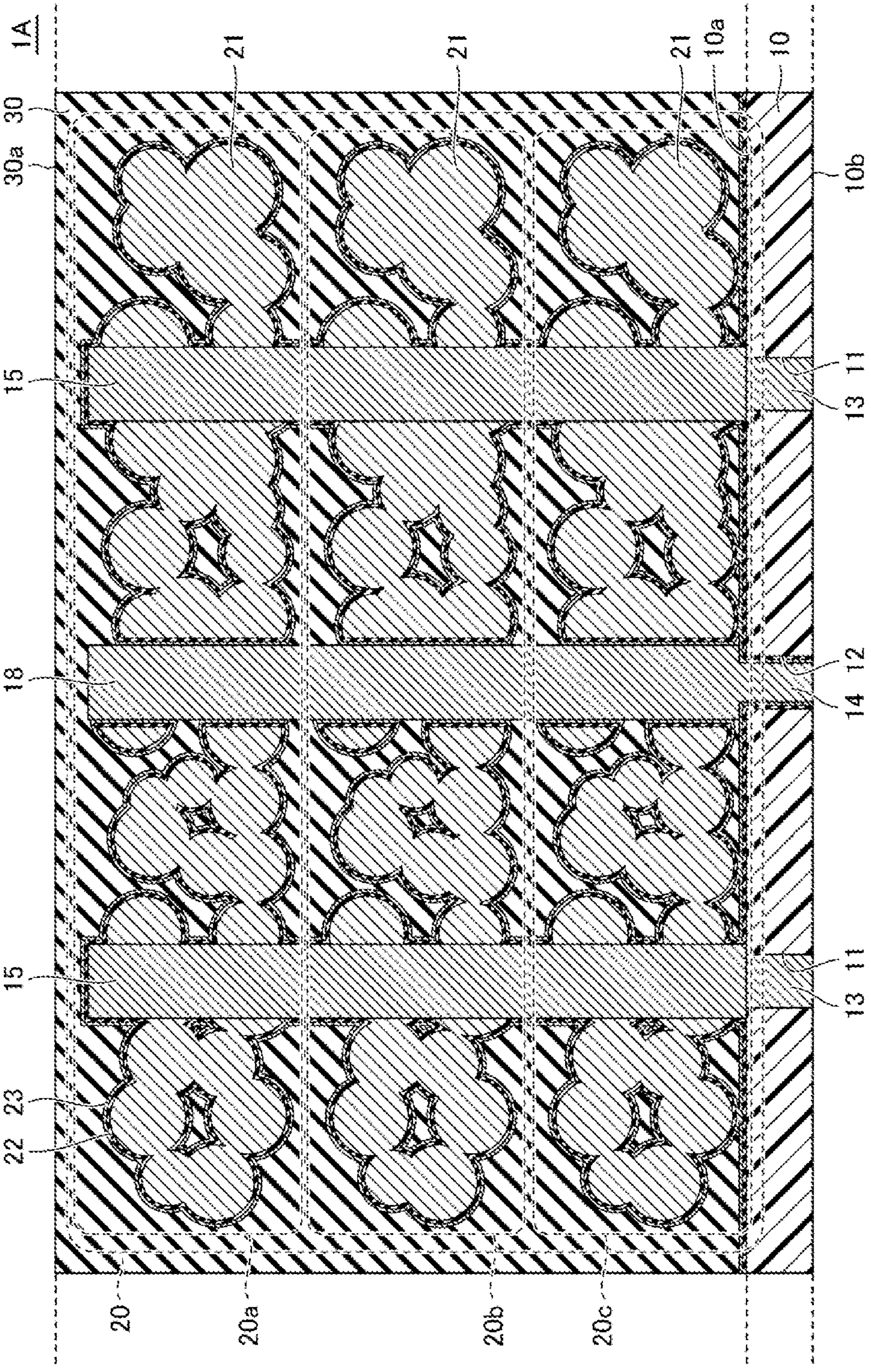
FIG. 20 is a schematic sectional view for illustrating a step S16 of the manufacturing flow illustrated in FIG. 7.

Next, as illustrated in FIG. 7, in a step S16, the insulating substrate is subjected to grinding processing. More specifically, as illustrated in FIG. 20, the second main surface 10*b* of the insulating substrate 10 located on the side to opposite to the side provided with the capacitance forming part 20 is subjected to plane cutting.

In this regard, for performing the grinding processing, with a grinding tape (not illustrated) attached to the side with the capacitance forming part 20, the insulating substrate 10 is removed by plane cutting at each of sites blocking the first via conductors 13 and the second through-holes 12. Thus, the ends of the first via conductors 13 and the ends of the second via conductors 14 are exposed on the side with the second main surface 10*b*.

Figure 21:
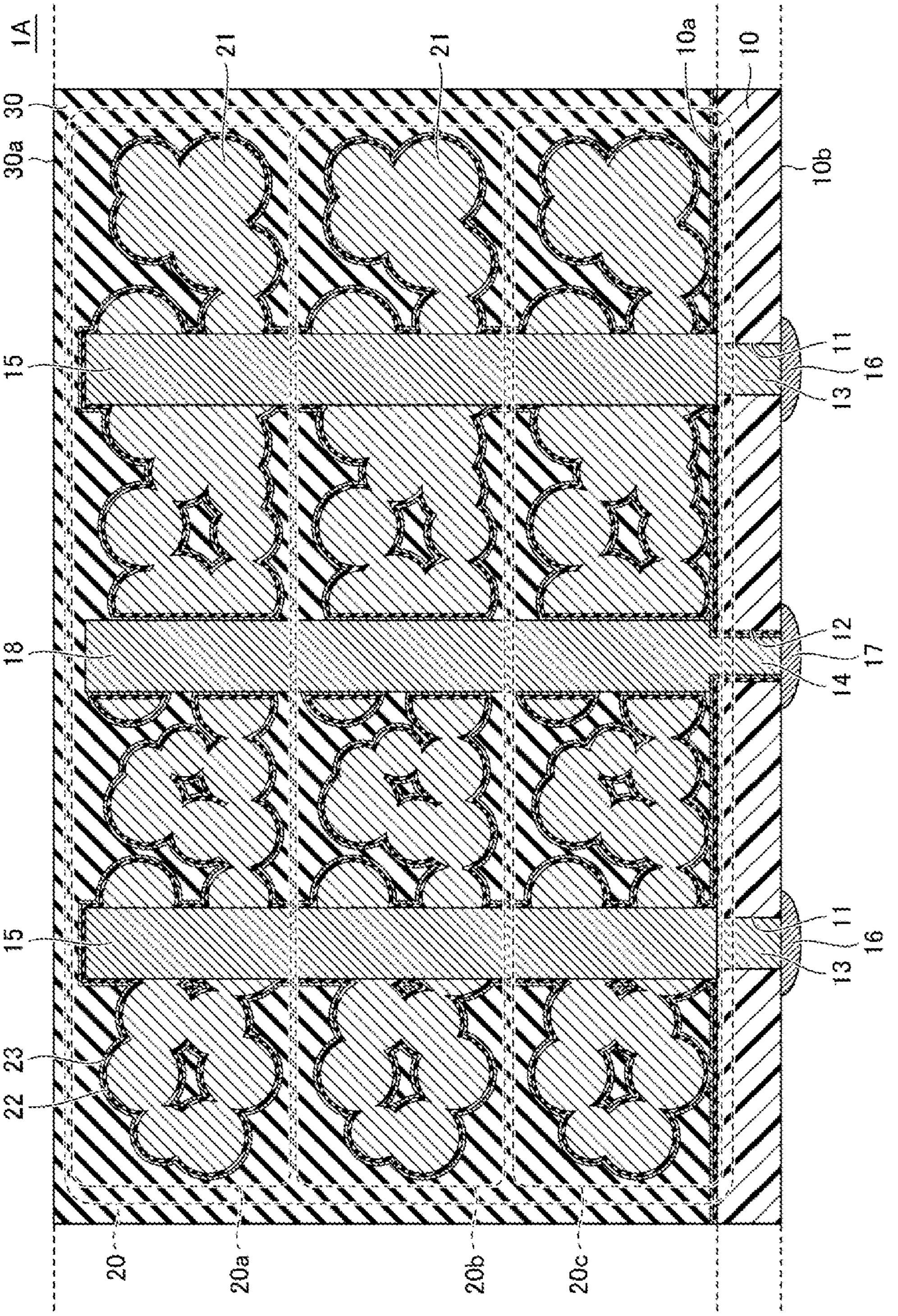
FIG. 21 is a schematic sectional view for illustrating a step S17 of the manufacturing flow illustrated in FIG. 7.

Next, as illustrated in FIG. 7, in a step S17, first bumps and second bumps are formed on the insulating substrate. More specifically, as illustrated in FIG. 21, the first bumps 16 and the second bumps 17 are formed on the second main surface 10*b* of the insulating substrate 10 so as to cover the first via conductors 13 and second via conductors 14 provided in the insulating substrate 10.

The first bumps 16 and the second bumps 17 can be simultaneously formed by, for example, electrolytic plating. In that case, a part excluding the vicinities of the sites where the first via conductors 13 and the second via conductors 14 are exposed is covered with an ultraviolet curable resin film as a mask (not illustrated), and the electrolytic plating is performed in this state, thereby allowing the first bumps 16 and the second bumps 17 to be formed to protrude from the second main surface 10*b*, and further, after the electrolytic plating is completed, the ultraviolet curable resin film as the mask is removed.

It is to be noted that the method for forming the second via conductors 14, first bumps 16, and second bumps 17 described above is not limited to the method of using the electrolytic plating described above, and a combination of a screen printing method, inkjet method, dispenser method, or the like of using a conductive paste with firing can also be used. In that case, the conductive paste preferably contains a metal or a sintering aid that can be fired at a low temperature such that firing can be performed under a temperature condition that has no influence on the resin constituting the sealing part 30.

Next, as illustrated in FIG. 7, in a step S18, the insulating substrate is divided into individual pieces. More specifically, the insulating substrate 10 is divided to divide the plurality of capacitors 1A connected to each other, into individual capacitors.

In this regard, for dividing into the individual capacitors, a groove is formed in at least one of the insulating substrate 10 and sealing part 30, and a force is applied to the insulating substrate 10 and the sealing part 30 so as to bend the insulating substrate 10 and the sealing part 30 from the groove as a starting point, thereby breaking the insulating substrate 10 and the sealing part 30. It is to be noted that diamond scribing, laser scribing, cutting with a dicing machine, or the like can be used as a method for forming the groove. In addition, dividing into the individual capacitors may be performed by directly cutting the insulating substrate 10 and the sealing part 30 by scribing or cutting with a dicing machine.

The capacitor 1A according to the first embodiment described above is manufactured through the steps S1 to S18 described above.

It is to be noted that, in the method for manufacturing the capacitor 1A according to the present embodiment described above, the sealing part may be formed after performing the grinding processing, while a case where the grinding processing is performed after the sealing part is formed has been exemplified. In addition, dividing into the individual capacitors may be performed immediately after performing the grinding processing, or the grinding processing may be performed immediately after dividing into the individual capacitors.

In this regard, in the capacitor 1A according to the present embodiment, the capacitance forming part 20 is joined to each of the plurality of support conductors 15, and at the same time, as described above, is not substantially directly joined to the insulating substrate 10, or if directly joined thereto, is only slightly joined thereto.

In the case of such a configuration, stress can be reduced, which is generated due to the difference in thermal expansion coefficient between the insulating substrate 10 and the capacitance forming part 20 in the manufacturing process (that is, the firing step, the step of forming the dielectric film 22, and the step of forming the conductive film 23) involving the heat treatment of the capacitor 1A. Thus, the insulating substrate 10 can be effectively kept from being warped due to the stress, and the dielectric film 22 and the conductive film 23 can also be effectively kept from being peeled from the insulating substrate 10 due to warpage of the insulating substrate 10.

In addition, in the capacitor 1A according to the present embodiment, as described above, the plurality of support conductors 15 protrude from the first main surface 10*a* toward the capacitance forming part 20, and are surrounded by the capacitance forming part 20. Thus, each of the plurality of support conductors 15 is joined to the capacitance forming part 20.

In the case of such a configuration, a so-called anchor effect will be achieved by the plurality of support conductors 15, and the above-described warpage in the insulating substrate 10 can be further suppressed.

In addition, if all or most of the capacitance forming part is directly joined to the insulating substrate, stress may be generated due to the difference in thermal expansion coefficient between the insulating substrate and the capacitance forming part by the influence of heat applied from the outside or heat generated inside after mounting, thereby causing the capacitor 1A to be warped and then causing damage to the joint between the insulating substrate and the metal porous body, but the capacitor 1A according to the present embodiment can effectively keep such a problem from being caused.

Accordingly, the capacitor 1A according to the present embodiment will improve the mounting stability and the reliability after mounting in the capacitor including the capacitance forming part 20 including the metal porous body 21, the dielectric film 22, and the conductive film 23.

In addition, the capacitor 1A configured as described above allows the effect of reducing so-called equivalent series resistance (ESR) to be achieved as a secondary effect.

In general, an extended line is provided in a capacitor for electrically connecting a capacitance forming part formed inside the capacitor to a circuit located outside the capacitor, and for reducing the ESR of the capacitor, it is important to increase the area of contact between the capacitance forming part and the extended line, and increase the sectional area of the extended line orthogonal to the energization direction of the extended line.

In this regard, in the capacitor 1A according to the present embodiment, as described above, the first external connection line as an extended line includes the first via conductors 13 and support conductors 15 provided in the insulating substrate 10, and the metal porous body 21 of the capacitance forming part 20 is connected to the first via conductors 13 with the support conductors 15 interposed therebetween.

In this regard, the support conductor 15 is provided to protrude from the first main surface 10*a* toward the capacitance forming part 20, and the area of contact at the interface formed by the thus provided support conductor 15 and the metal porous body 21 is larger than the area of contact at the interface formed by the first via conductor 13 and the metal porous body 21 when the metal porous body 21 is directly connected to the first via conductor 13. Accordingly, with such a configuration, the area of contact can be increased at the interface formed by the metal porous body 21 and the support conductor 15.

Furthermore, as described above, the diameter of the support conductor 15 is about several tens μm at the smallest. Accordingly, the metal porous body 21 is connected to the first via conductor 13 with the support conductor 15 interposed therebetween, thereby allowing the sectional area of the first external connection line orthogonal to the energization direction of the first external connection line to be increased as compared with the case where the metal porous body 21 is directly connected to the first via conductor 13.

In addition, in the capacitor 1A according to the present embodiment, as described above, the second external connection line as an extended line includes the second via conductors 14 and columnar conductors 18 provided in the insulating substrate 10, and the conductive film 23 of the capacitance forming part 20 is connected to the second via conductors 14 with the columnar conductors 18 interposed therebetween.

In this regard, the columnar conductor 18 is provided to protrude from the first main surface 10*a* toward the capacitance forming part 20, and the area of contact at the interface formed by the thus provided columnar conductor 18 and the conductive film 23 is larger than the area of contact at the interface formed by the second via conductor 14 and the conductive film 23 when the conductive film 23 is directly connected to the second via conductor 14. Accordingly, with such a configuration, the area of contact can be increased at the interface formed by the conductive film 23 and the columnar conductor 18.

Furthermore, as described above, the thickness of the conductive film 23 is about several hundred nm at the largest, whereas the diameter of the columnar conductor 18 is about several tens μm at the smallest. More specifically, the columnar conductor 18 is configured to be larger in sectional area than the conductive film 23, thereby allowing the sectional area of the second external connection line to be increased.

Accordingly, the capacitor 1A according to the present embodiment will reduce the ESR in the capacitor including the capacitance forming part 20 including the metal porous body 21, the dielectric film 22, and the conductive film 23.

In addition, in the capacitor 1A according to the present embodiment, as described above, as viewed in the normal direction of the first main surface 10*a* of the insulating substrate 10, the first via conductors 13 and the second via conductors 14 are both provided in the region where the capacitance forming part 20 is disposed (that is, the region indicated by the broken line in FIG. 2).

In the case of such a configuration, neither the first external connection line nor the second external connection line will be arranged at a position on the side of the capacitance forming part 20, thus making it possible to minimize the sealing part 30 for the part located on the side of the capacitance forming part 20. Thus, not only the capacitor 1A can be configured to be smaller than conventional capacitors, but also the occupied volume of the part excluding the capacitance forming part 20 in the capacitor 1A is reduced to increase the capacitance.

In addition, in the case of such a configuration described above, the first via conductors 13 and the second via conductors 14 are located to penetrate the insulating substrate 10 in the thickness direction thereof, and thus, the via conductors that differ in polarity are arranged close to each other, with the current paths thereof respectively in opposite directions. Thus, the magnetic fields generated on the via conductors by flowing currents act so as to cancel each other, thus allowing the so-called equivalent series inductance (ESL) to be reduced.

Furthermore, in the capacitor 1A according to the present embodiment, as described above, the first via conductors 13 and the second via conductors 14 are arranged in an array, and one of the via conductors and the via conductor adjacent thereto at the shortest distance differ in polarity from each other. With such a configuration, the above-described effect of reducing the ESL can be maximized.

In addition, in the capacitor 1A according to the present embodiment, as described above, each of the pair of external connection lines that electrically extend the capacitance forming part 20 is configured to include a plurality of via conductors. With such a configuration, the sectional area of the current path can be increased as compared with a case where each of the pair of external connection lines is composed of a single via conductor, thus reducing the ESR.

In addition, in the capacitor 1A according to the present embodiment, as described above, at the boundary part between the second via conductor 14 and the substrate of the insulating substrate 10, the substrate of the insulating substrate 10 is covered with the dielectric film 22, the dielectric film 22 is covered with the conductive film 23, and the conductive film 23 is further covered with the second via conductor 14.

With such a configuration, the close contact between the substrate of the insulating substrate 10 and the second via conductor 14 is improved as compared with a case where the substrate of the insulating substrate 10 and the second via conductor 14 are directly joined, thus keeping moisture from entering through the part. Accordingly, a capacitor with excellent moisture resistance can be obtained.

In addition, in the capacitor 1A according to the present embodiment, as described above, the metal porous body 21 is made of the sintered body of metal grains. In the case of such a configuration, metal joining between the metal grains increases the mechanical strength of the capacitance forming part 20, and also increases the joint area between the metal grains, thus allowing the ESR to be reduced. Furthermore, the effect of being capable of relatively easily forming the metal porous body with open pores is also achieved.

Figure 22:
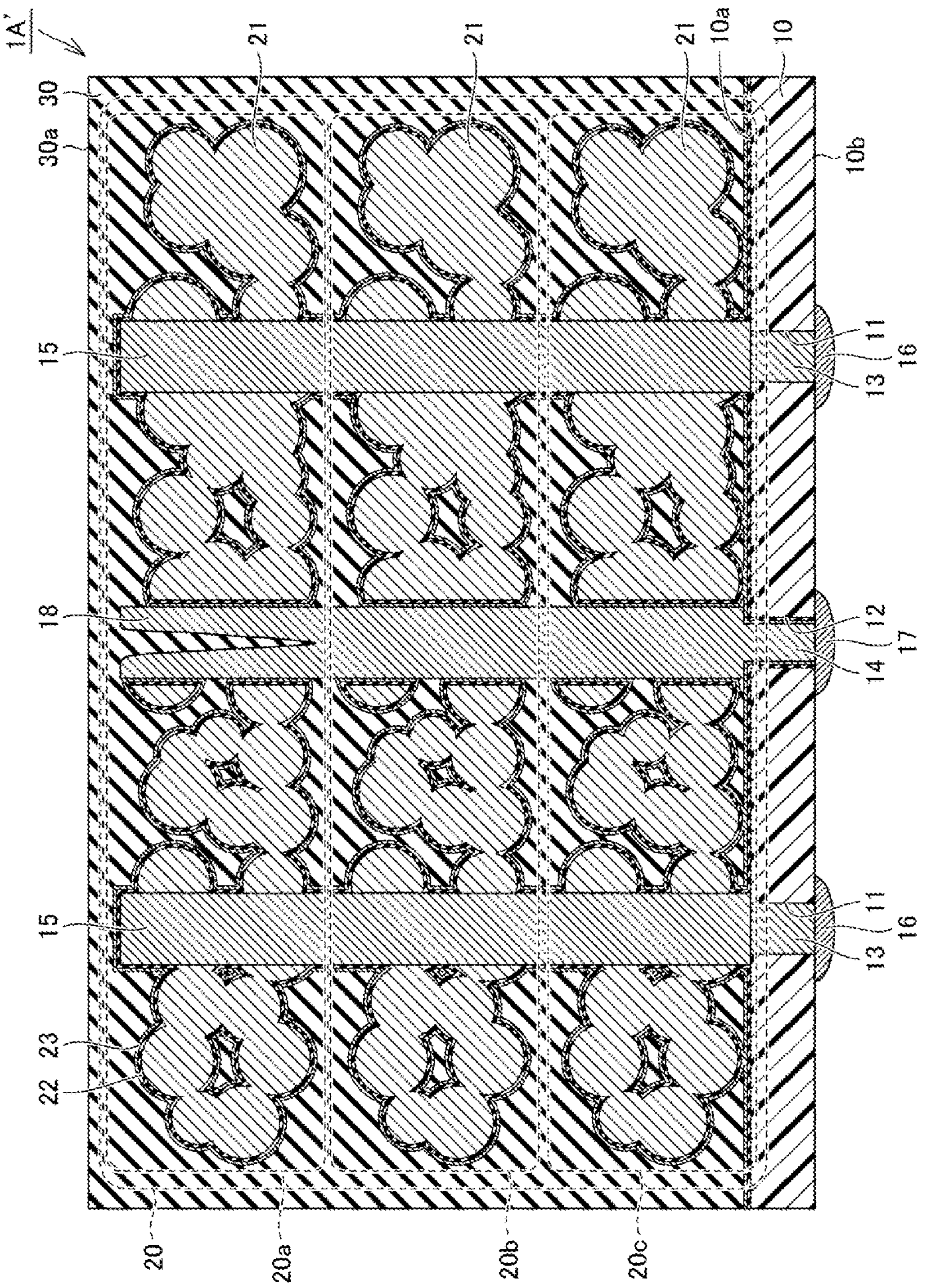
FIG. 22 is a schematic sectional view illustrating one form of a columnar conductor in the capacitor illustrated in FIG. 3.

FIG. 22 is a schematic sectional view illustrating one form of a columnar conductor in the capacitor illustrated in FIG. 3. In a capacitor 1A' according to the present mode, for example, as illustrated in FIG. 22, there is a case where the columnar conductor 18 is formed such that one of the pair of ends of the columnar conductor 18, located on the side opposite to the side with insulating substrate 10 as viewed from the capacitance forming part 20, is formed in a hollow shape, with the sealing part 30 filling the hollow part. The capacitor 1A' including the thus formed columnar conductor 18 can also achieve the effect described above.

First Modification Example

Figure 23:
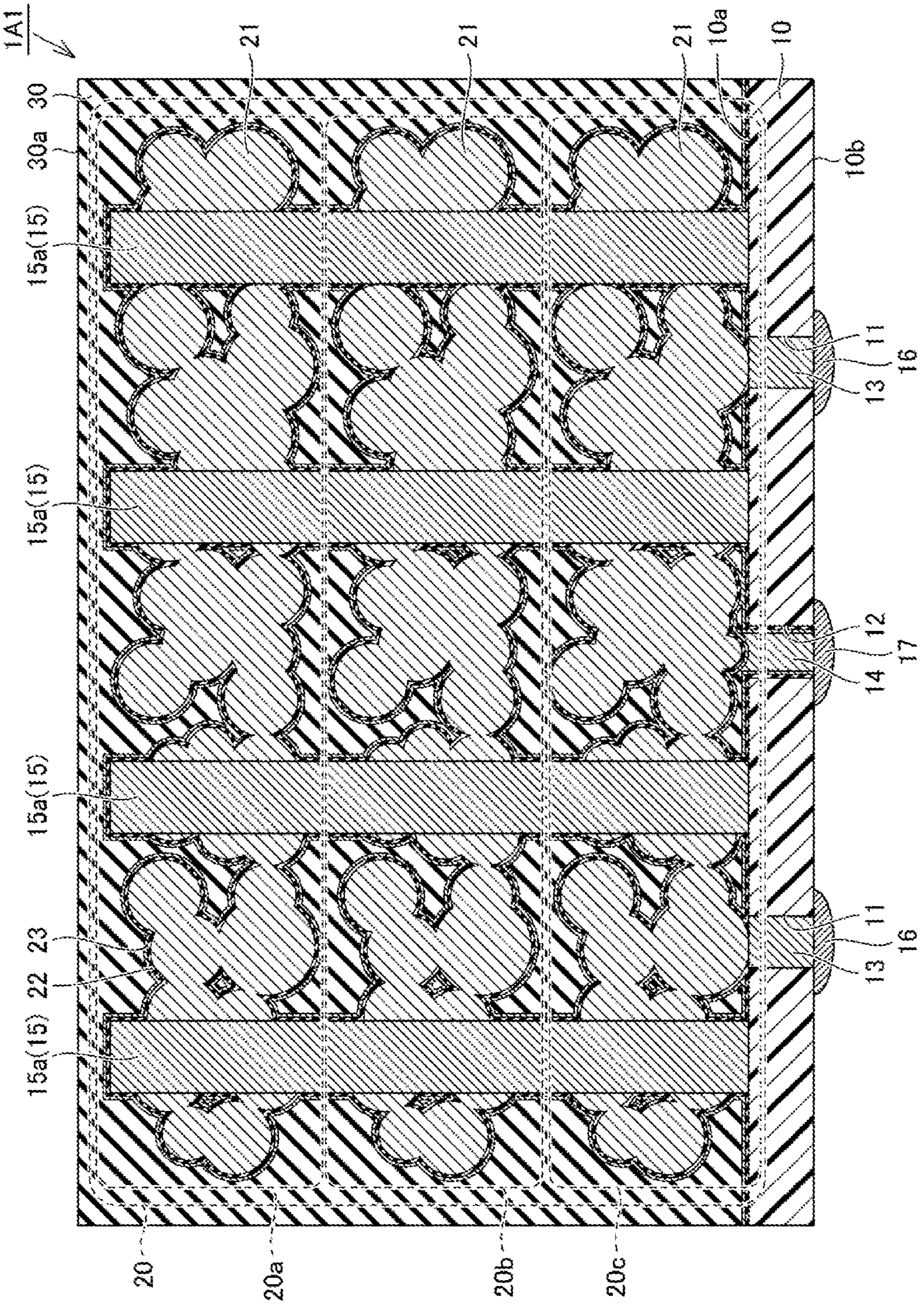
FIG. 23 is a schematic sectional view of a capacitor according to a first modification example.

FIG. 23 is a schematic sectional view of a capacitor according to a first modification example. Hereinafter, a capacitor 1A1 according to the first modification example based on the first embodiment described above will be described with reference to FIG. 23.

As illustrated in FIG. 23, the capacitor 1A1 according to the first modification example is different from the capacitor 1A according to the above-described first embodiment in the position at which the support conductor 15 is formed and the configuration of the second external connection line.

Specifically, in the capacitor 1A1 according to the first modification example, as viewed in the normal direction of the first main surface 10*a* of the insulating substrate 10, each of a plurality of support conductors 15*a* is formed at a position that is not overlapped with either the first via conductors 13 or the second via conductors 14. In this regard, for convenience of description, the support conductor formed at a position that is not overlapped with either the first via conductors 13 or the second via conductors 14 is denoted by reference numeral 15*a* to be distinguished from the support conductor 15 formed at the position overlapped with the first via conductor 13. It is to be noted that the number of the support conductors 15*a* is not to be considered particularly limited, and is appropriately set depending on the size of the insulating substrate 10 or a desired capacitance.

In addition, in the capacitor 1A1, no columnar conductor 18 is formed, and the second external connection line is composed of only the second via conductors 14 and the second bumps 17.

In the capacitor 1A1 configured as described above, the support conductor 15*a* is not directly joined to the first via conductor 13. Accordingly, the first via conductor 13 is joined to the metal porous body 21 of the third capacitance forming part 20*c* at least at a part of the end surface of the first via conductor 13 on the side with the capacitance forming part 20 to be electrically connected to the metal porous body 21. In addition, the metal porous bodies 21 of the plurality of capacitance forming parts stacked are connected to each other with the support conductor 15*a* joined to all of the metal porous bodies 21 interposed therebetween.

In addition, in the capacitor 1A1, the dielectric film 22 and the conductive film 23 cover the surface of the insulating substrate 10 in sections that define the second through-holes 12 provided in the insulating substrate 10. More specifically, at a boundary part between the second via conductor 14 and the substrate of the insulating substrate 10, the substrate of the insulating substrate 10 is covered with a dielectric film 22 the dielectric film 22 is covered with the conductive film 23, and the conductive film 23 is further covered with the second via conductor 14. In addition, the end of the second via conductor 14 on the side with the first main surface 10*a* is covered with the capacitance forming part 20.

Thus, the conductive film 23 is connected to the second via conductor 14, and the above-described second external connection line as a negative electrode is connected to the capacitance forming part 20 with the second via conductor 14 interposed therebetween.

Also in the case of such a configuration, the capacitance forming part 20 is supported by the plurality of support conductors 15*a*, and thus, the capacitance forming part 20 is not substantially directly joined to the insulating substrate 10, or if directly joined thereto, is only slightly joined thereto. Thus, an effect that is similar to the effect described in the first embodiment described above will be achieved, and the mounting stability and the reliability after mounting will be improved in the capacitor including the capacitance forming part 20 including the metal porous body 21, the dielectric film 22, and the conductive film 23.

It is to be noted that the method for manufacturing the capacitor 1A1 according to the present modification example is different from the method for manufacturing the capacitor 1A in that the step S10 (that is, forming the columnar conductor holes) illustrated in FIG. 7 and the formation of the columnar conductors in the step S14 are not performed, and that the formation of the second via conductors in the step S14 is performed after the step S16 (that is, grinding processing). As described above, the formation of the second via conductors in the step S14 following the step S16 allows the second via conductors 14 to be formed from the side with the second main surface 10*b* of the insulating substrate 10.

Second Modification Example

Figure 24:
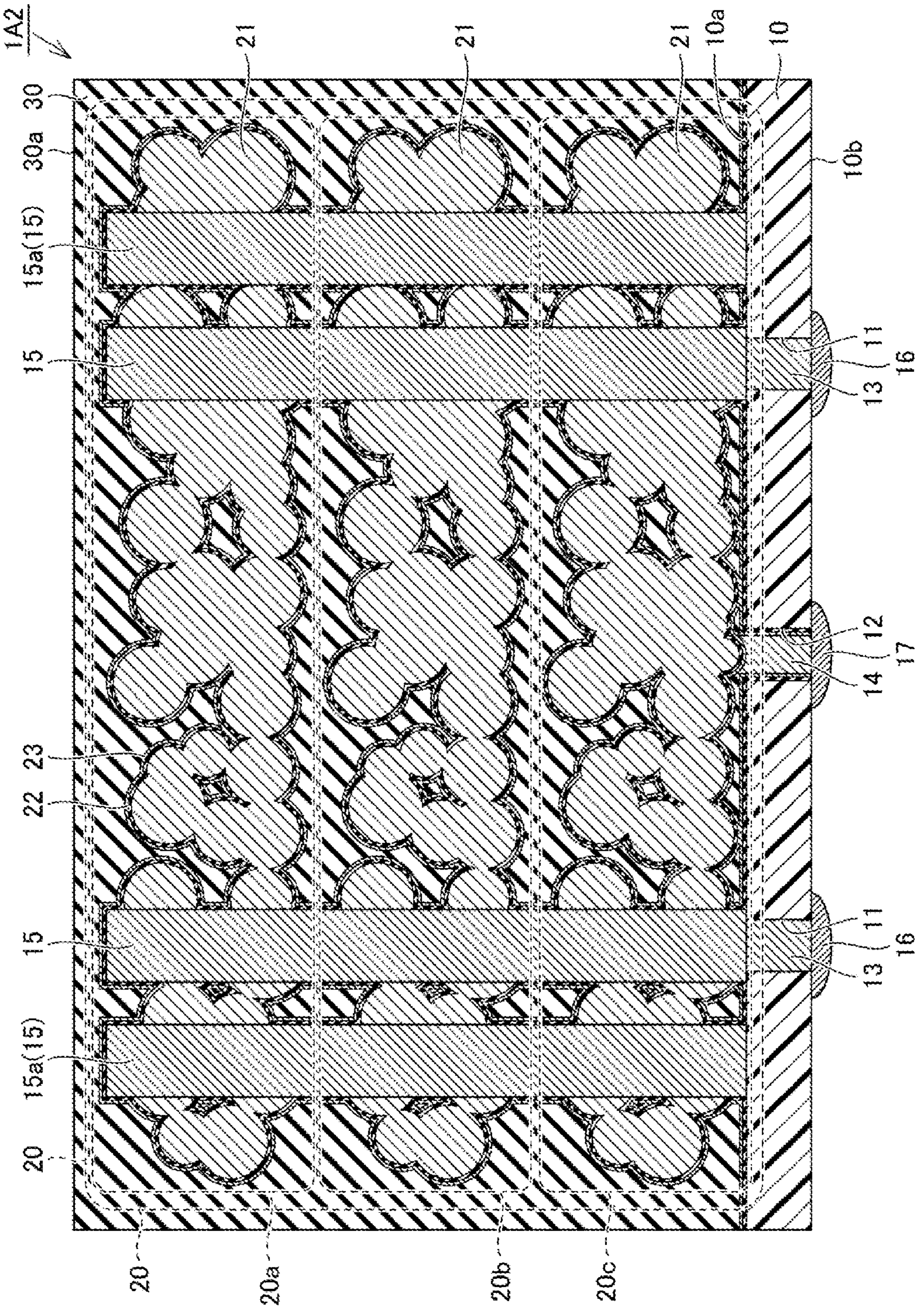
FIG. 24 is a schematic sectional view of a capacitor according to a second modification example.

FIG. 24 is a schematic sectional view of a capacitor according to a second modification example. Hereinafter, a capacitor 1A2 according to the second modification example based on the first embodiment described above will be described with reference to FIG. 24.

As illustrated in FIG. 24, the capacitor 1A2 according to the second modification example is different from the capacitor 1A according to the above-described first embodiment only in the configuration of the support conductors 15 and second external connection line.

Specifically, in the capacitor 1A2 according to the second modification example, as viewed in the normal direction of the first main surface 10*a* of the insulating substrate 10, a plurality of support conductors include the support conductors 15 formed at positions that are overlapped with the first via conductors 13, and the support conductors 15*a* formed at positions that are not overlapped with either the first via conductors 13 or the second via conductors 14. It is to be noted that the number of the support conductors 15*a* is not to be considered particularly limited, and is appropriately set depending on the size of the insulating substrate 10 or a desired capacitance.

In addition, in the capacitor 1A2, no columnar conductor 18 is formed, and the second external connection line is composed of only the second via conductors 14 and the second bumps 17. The configuration in the vicinity of the second via conductor 14 in this case is similar to that of the capacitor 1A1 according to the first modification example described above.

Also in the case of such a configuration, the capacitance forming part 20 is supported by the plurality of support conductors 15 and 15*a*, and thus, the capacitance forming part 20 is not substantially directly joined to the insulating substrate 10, or if directly joined thereto, is only slightly joined thereto. Thus, an effect that is similar to the effect described in the first embodiment described above will be achieved, and the mounting stability and the reliability after mounting will be further improved in the capacitor including the capacitance forming part 20 including the metal porous body 21, the dielectric film 22, and the conductive film 23.

It is to be noted that the method for manufacturing the capacitor 1A2 according to the present modification example is different from the method for manufacturing the capacitor 1A in that the step S10 (that is, forming the columnar conductor holes) illustrated in FIG. 7 and the formation of the columnar conductors in the step S14 are not performed, and that the formation of the second via conductors in the step S14 is performed after the step S16 (that is, grinding processing). As described above, the formation of the second via conductors in the step S14 following the step S16 allows the second via conductors 14 to be formed from the side with the second main surface 10*b* of the insulating substrate 10.

Third Modification Example

Figure 25:
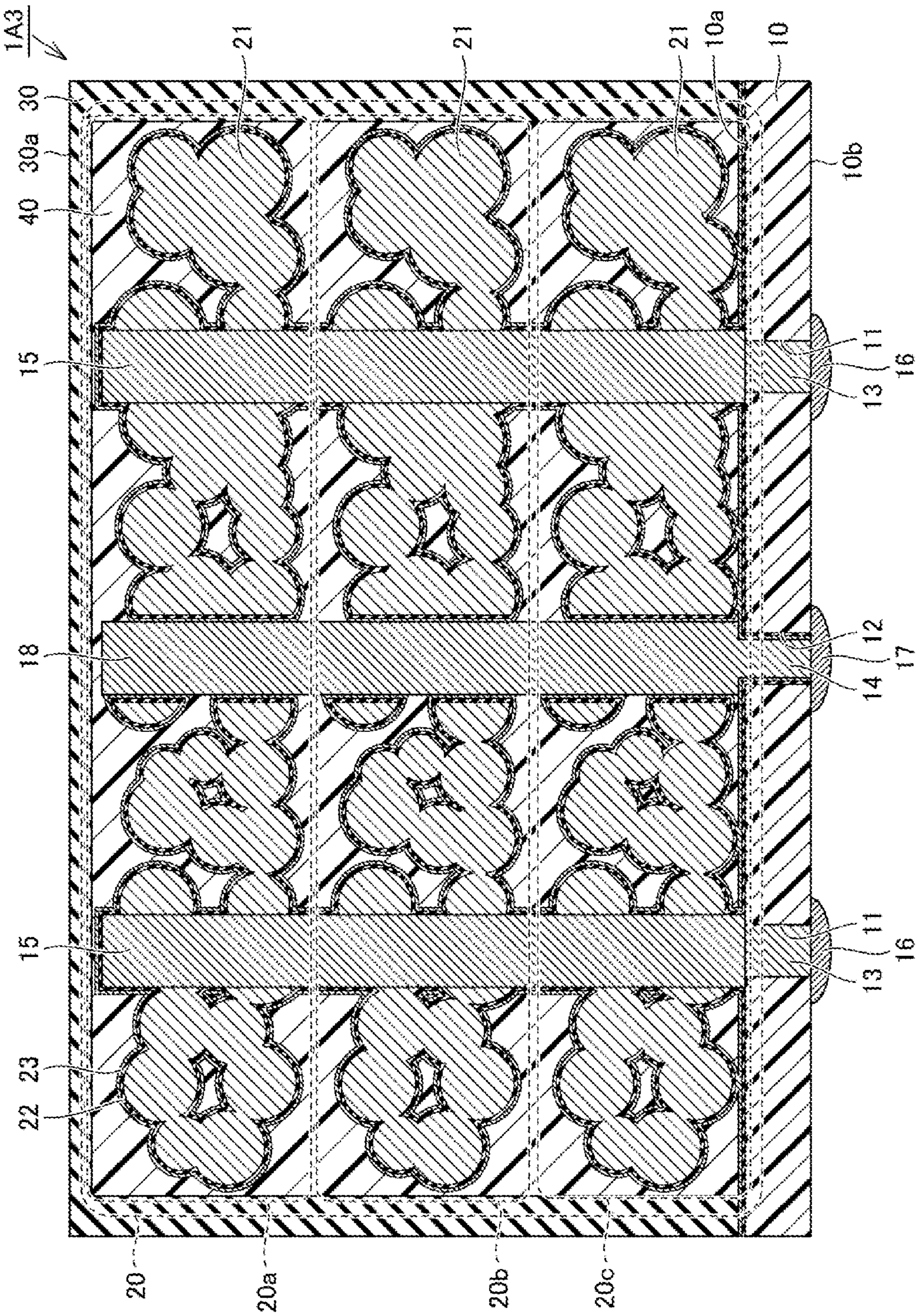
FIG. 25 is a schematic sectional view of a capacitor according to a third modification example.

FIG. 25 is a schematic sectional view of a capacitor according to a third modification example. Hereinafter, a capacitor 1A3 according to the third modification example based on the first embodiment described above will be described with reference to FIG. 25.

As illustrated in FIG. 25, the capacitor 1A3 according to the third modification example is different from the capacitor 1A according to the above-described first embodiment only in that a moisture-resistant protective film 40 is further formed on the first main surface 10*a* of the insulating substrate 10 at a position between the capacitance forming part 20 and the sealing part 30.

For example, before forming the sealing part 30, the moisture-resistant protective film 40 can be formed by providing an inorganic insulator made of SiN, SiO2, Al2O3, HfO2, ZrO2, or the like by a CVD method, an ALD method, or the like so as to cover the capacitance forming part 20, or by providing an organic insulator with water repellency, such as a fluorine-based resin or a silane coupling agent resin, so as to cover the capacitance forming part 20. In this regard, the moisture-resistant protective film does not necessarily have to be formed inside of the capacitance forming part 20, and it is sufficient for the film to be formed to cover only the outer surface.

In the case of such a configuration, not only the effect described in the first embodiment described above is achieved, but also the moisture-resistant protective film 40 in addition to the sealing part 30 can prevent moisture from entering the capacitance forming part 20 from the outside, thus allowing the moisture resistance to be further improved.

Fourth Modification Example

Figure 26:
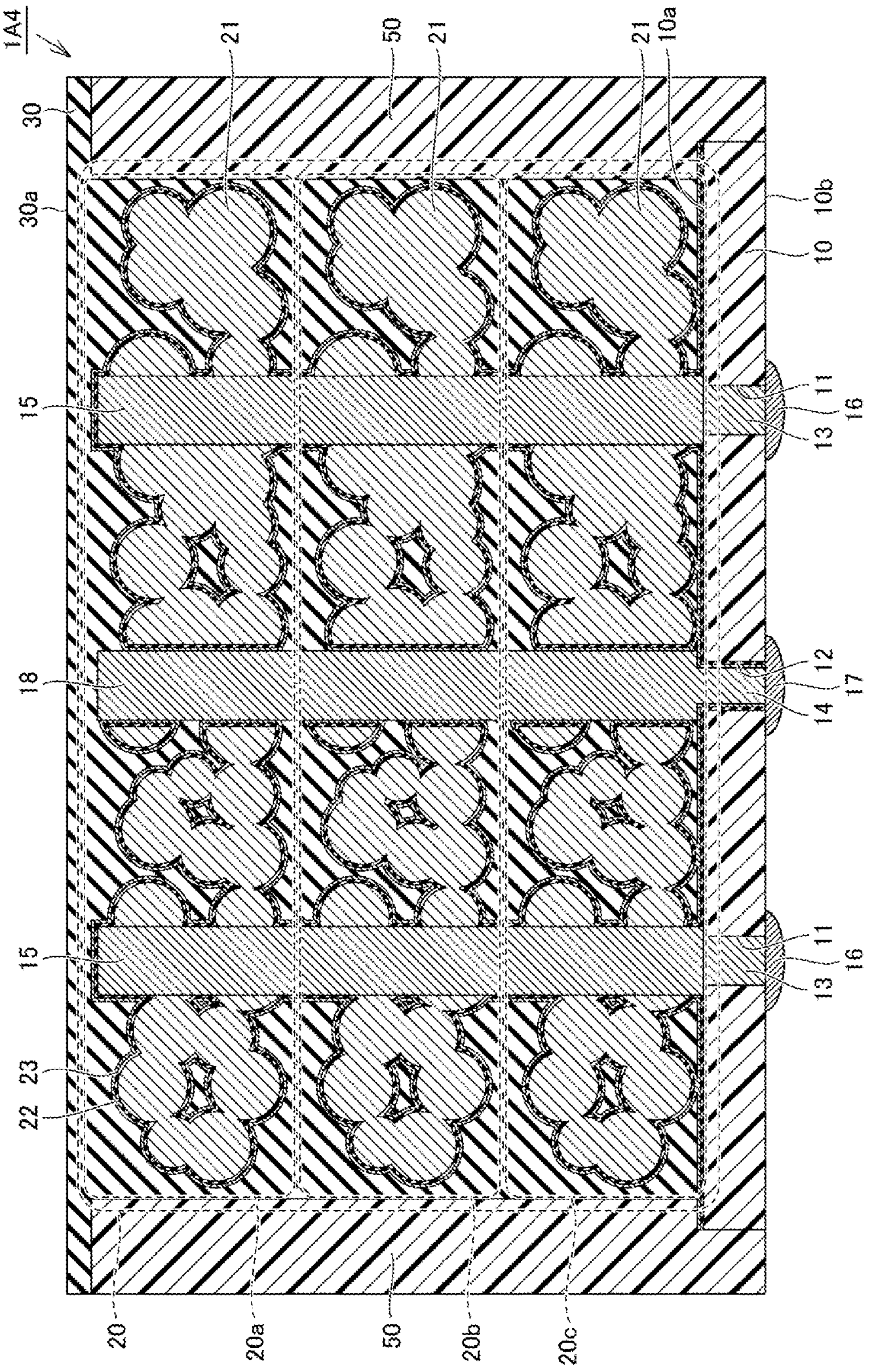
FIG. 26 is a schematic sectional view of a capacitor according to a fourth modification example.

FIG. 26 is a schematic sectional view of a capacitor according to a fourth modification example. Hereinafter, a capacitor 1A4 according to the fourth modification example based on the first embodiment described above will be described with reference to FIG. 26.

As illustrated in FIG. 26, the configuration of the capacitor 1A4 according to the fourth modification is different from that of the capacitor 1A according to the above-described first embodiment only in that a side sealing part 50 located so as to surround the sides of the insulating substrate 10 and capacitance forming part 20 is further formed.

The side sealing part 50 can be formed by, for example, providing a sealing member containing any of Si, $Al_2O_3$, $ZrO_2$, BN, $Si_3N_4$, AlN, MgO, $Mg_2SiO_4$, $BaTiO_3$, $SrTiO_3$, and $CaTiO_3$ as a main material or made of an inorganic material such as glass by an inkjet method or the like so as to cover the sides of the insulating substrate 10 and capacitance forming part 20.

The method for manufacturing the capacitor 1A4 with such a side sealing part 50 formed is different from the method for manufacturing the capacitor 1A in that the step S18 (that is, dividing into the individual capacitors) is performed after the step S4 (that is, firing the green sheet) illustrated in FIG. 7, then the side sealing part 50 is formed, and then the step S5 (that is, applying the conductive paste layer onto the insulating substrate) is performed.

In the case of such a configuration, in forming the capacitance forming part 20 on the first main surface 10*a* of the insulating substrate 10 in the step S5 to step S13 illustrated in FIG. 7, the capacitance forming part 20 is formed within the range surrounded by the side sealing part 50 as viewed in the normal direction of the first main surface 10*a*. Thus, not only the effect described in the first embodiment described above is achieved, but also positional deviations (that is, deviations in the vertical direction or the horizontal direction in FIG. 2) of the capacitance forming part 20 as viewed in the normal direction can be effectively prevented, and as a result, a capacitor with stable quality can be manufactured.

In addition, the side surface is surrounded by the side sealing part 50, thereby not only enhancing the impact resistance, but also enhancing the resistance to stress generated in processing the capacitor 1A4. Thus, in the capacitor 1A4, the dielectric film 22 and the conductive film 23 in the vicinity of the side sealing part 50 are effectively prevented from being damaged, thereby allowing the withstand voltage of the capacitor 1A4 to be kept from being decreased.

Second Embodiment

Figure 27:
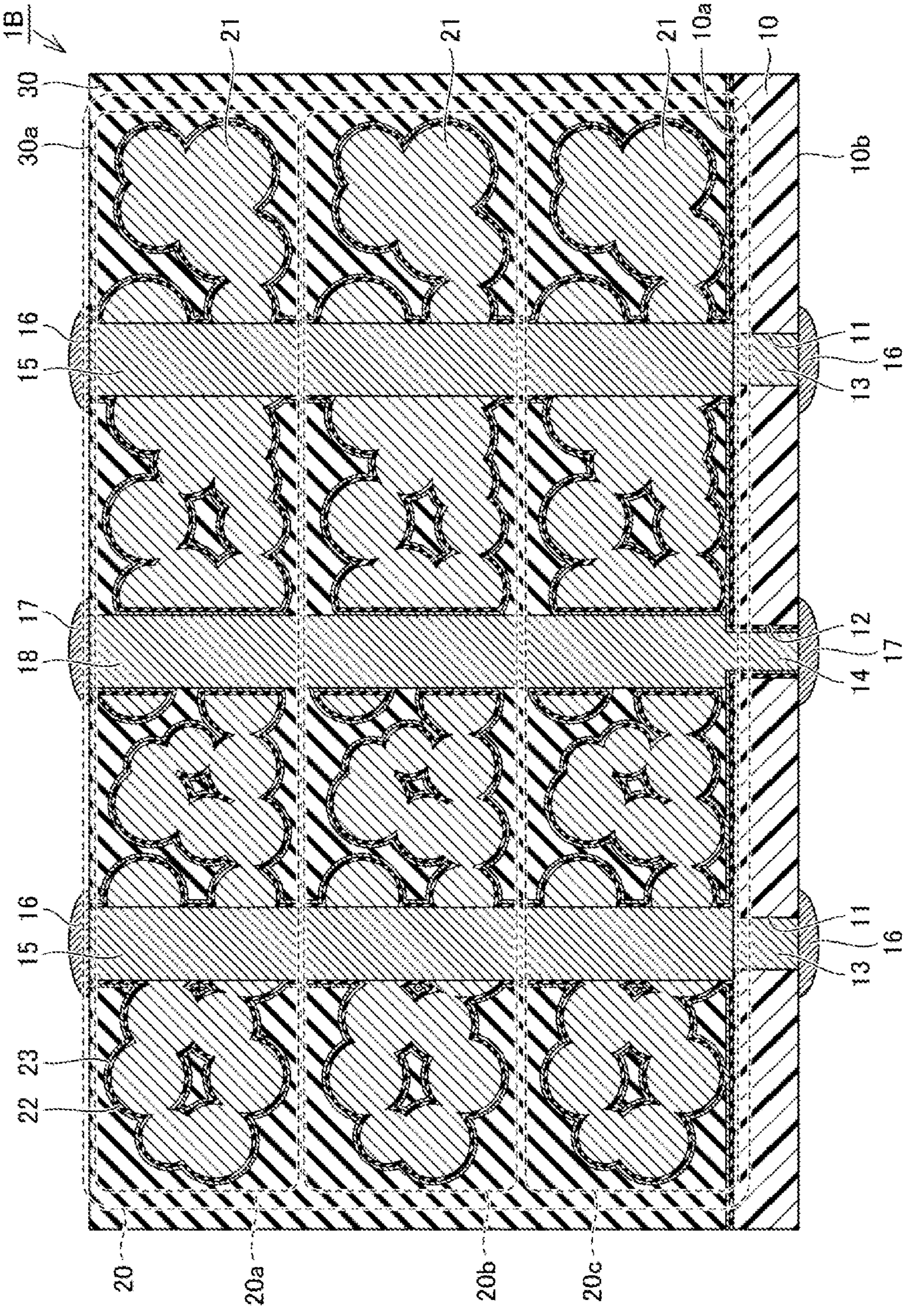
FIG. 27 is a schematic sectional view of a capacitor according to a second embodiment.

FIG. 27 is a schematic sectional view of a capacitor according to a second embodiment. Hereinafter, a capacitor 1B according to the present embodiment will be described with reference to FIG. 27.

The capacitor 1B according to the present embodiment is different from the capacitor 1A according to the first embodiment described above in that both the front surface and the back surface are configured as mounting surfaces for a wiring board or the like.

Specifically, in the capacitor 1B according to the present embodiment, the plurality of support conductors 15 constituting a part of the first external connection line and the plurality of columnar conductors 18 constituting a part of the second external connection line are both formed through the capacitance forming part 20 and the sealing part 30. Thus, the plurality of support conductors 15 and the plurality of columnar conductors 18 are configured to be exposed at an outer surface 30*a* of the sealing part 30, located on the side opposite to the side with the insulating substrate 10 as viewed from the capacitance forming part 20.

Furthermore, on the outer surface 30*a*, a plurality of first bumps 16 constituting a part of the first external connection line are provided so as to cover the end surfaces of the plurality of support conductors 15 exposed at the outer surface 30*a*. Similarly, on the outer surface 30*a*, a plurality of second bumps 17 constituting a part of the second external connection line are provided so as to cover the end surfaces of the plurality of columnar conductors 18 exposed at the outer surface 30*a*.

Figure 28:
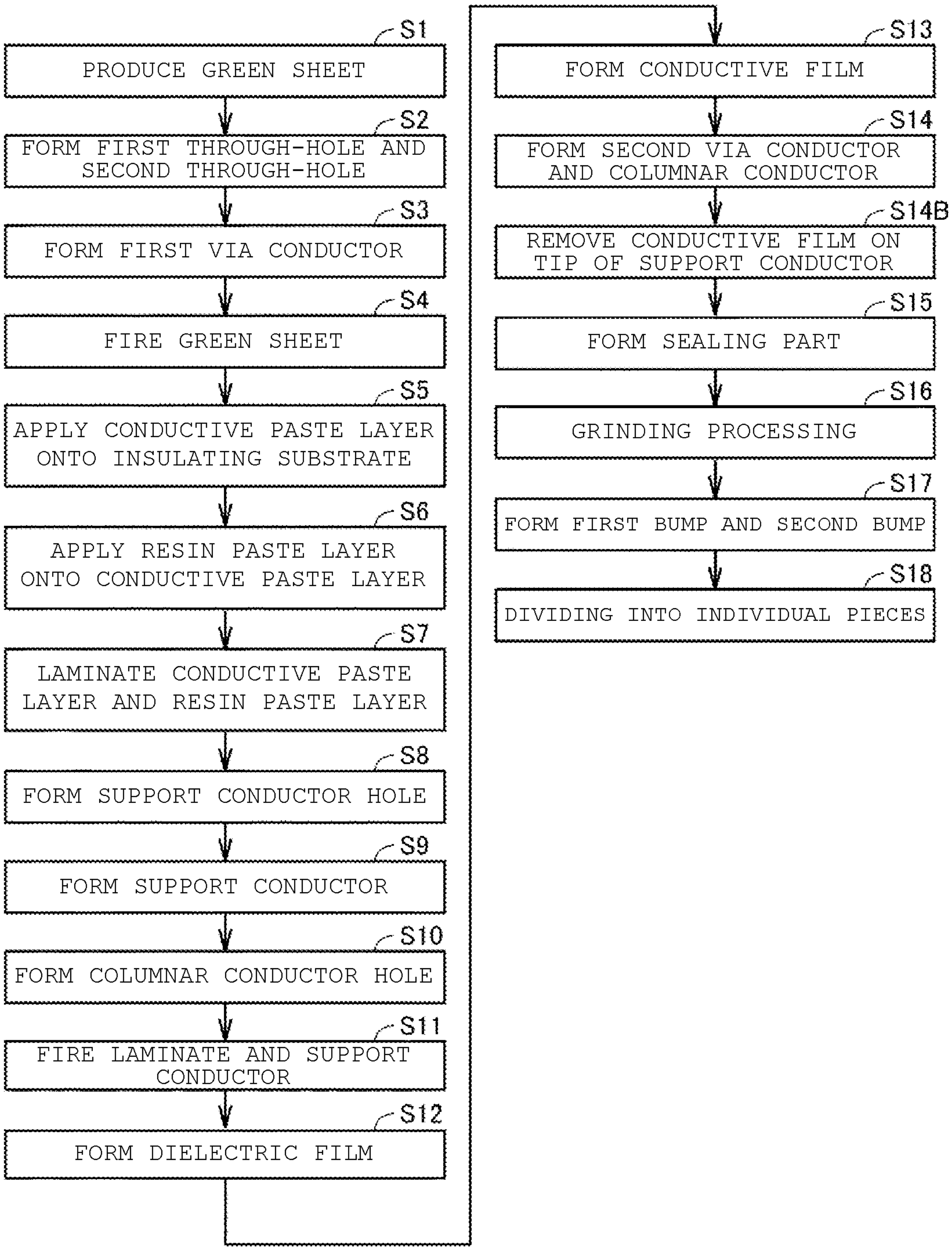
FIG. 28 is a flowchart illustrating a method for manufacturing the capacitor according to the second embodiment.

FIG. 28 is a flowchart illustrating a method for manufacturing a capacitor according to the present embodiment, and FIGS. 29 to 33 are schematic sectional views for illustrating each step of the manufacturing flow illustrated in FIG. 28. Next, an example of a specific manufacturing method for manufacturing the capacitor 1B according to the present embodiment described above will be described with reference to FIGS. 28 to 33.

As illustrated in FIG. 28, the method for manufacturing the capacitor 1B mostly conforms to the method for manufacturing the capacitor 1A. Accordingly, in the following description, in the method for manufacturing the capacitor 1B, the description of steps that have contents in common to the method for manufacturing the capacitor 1A will be omitted, and only steps that have different contents from the method for manufacturing the capacitor 1A will be described.

Figure 29:
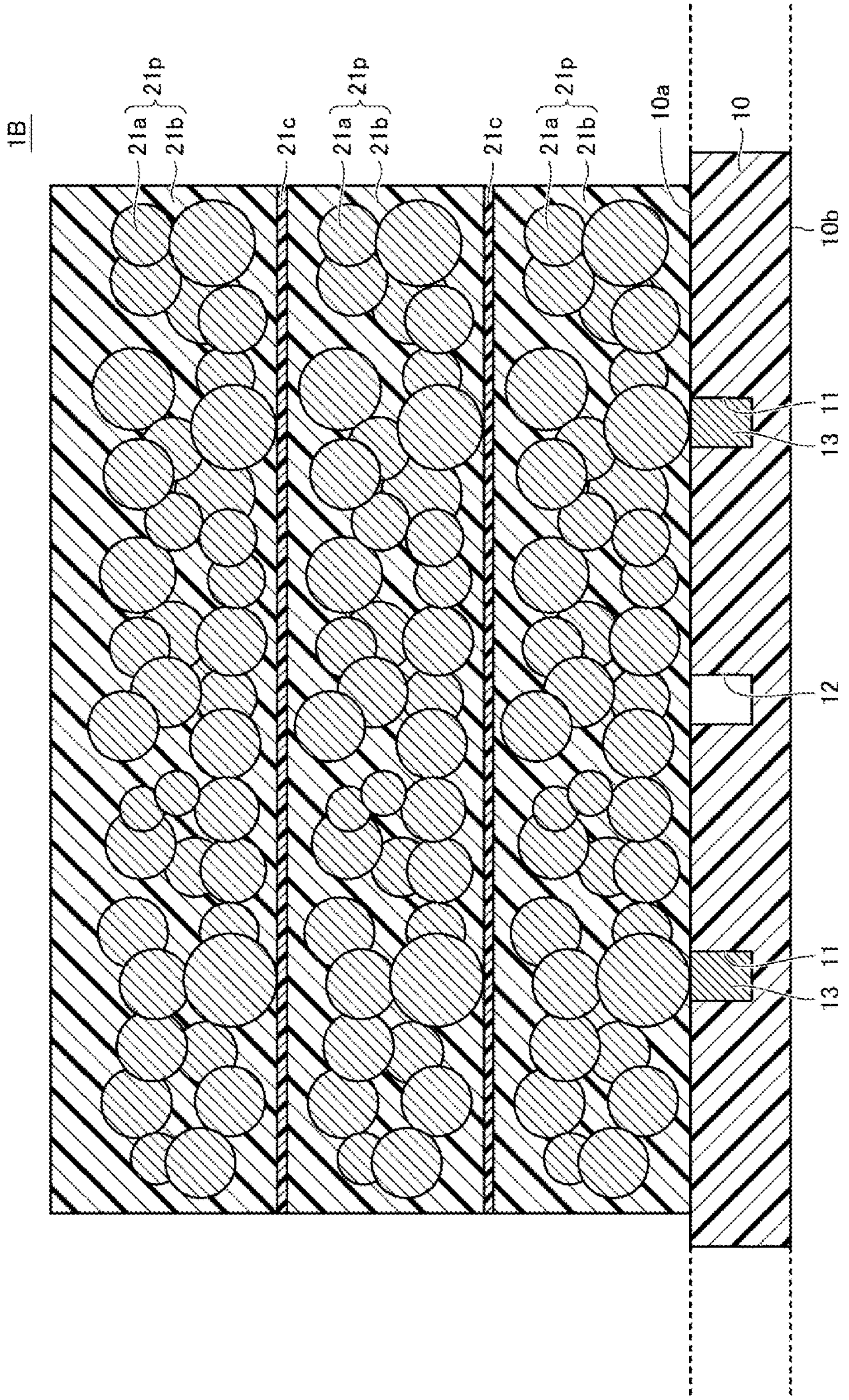
FIG. 29 is a schematic sectional view for illustrating a step S7 of the manufacturing flow illustrated in FIG. 28.

As shown in FIG. 28, in a step S7, the conductive paste layer 21*p* and the resin paste layer 21*c* are laminated on the insulating substrate, and at that time, as shown in FIG. 29, a part of the laminated conductive paste layer 21*p* corresponding to a supernatant part of the binder 21*b* included in the layer located farthest from the first main surface 10*a* is intentionally formed to be thicker.

Figure 30:
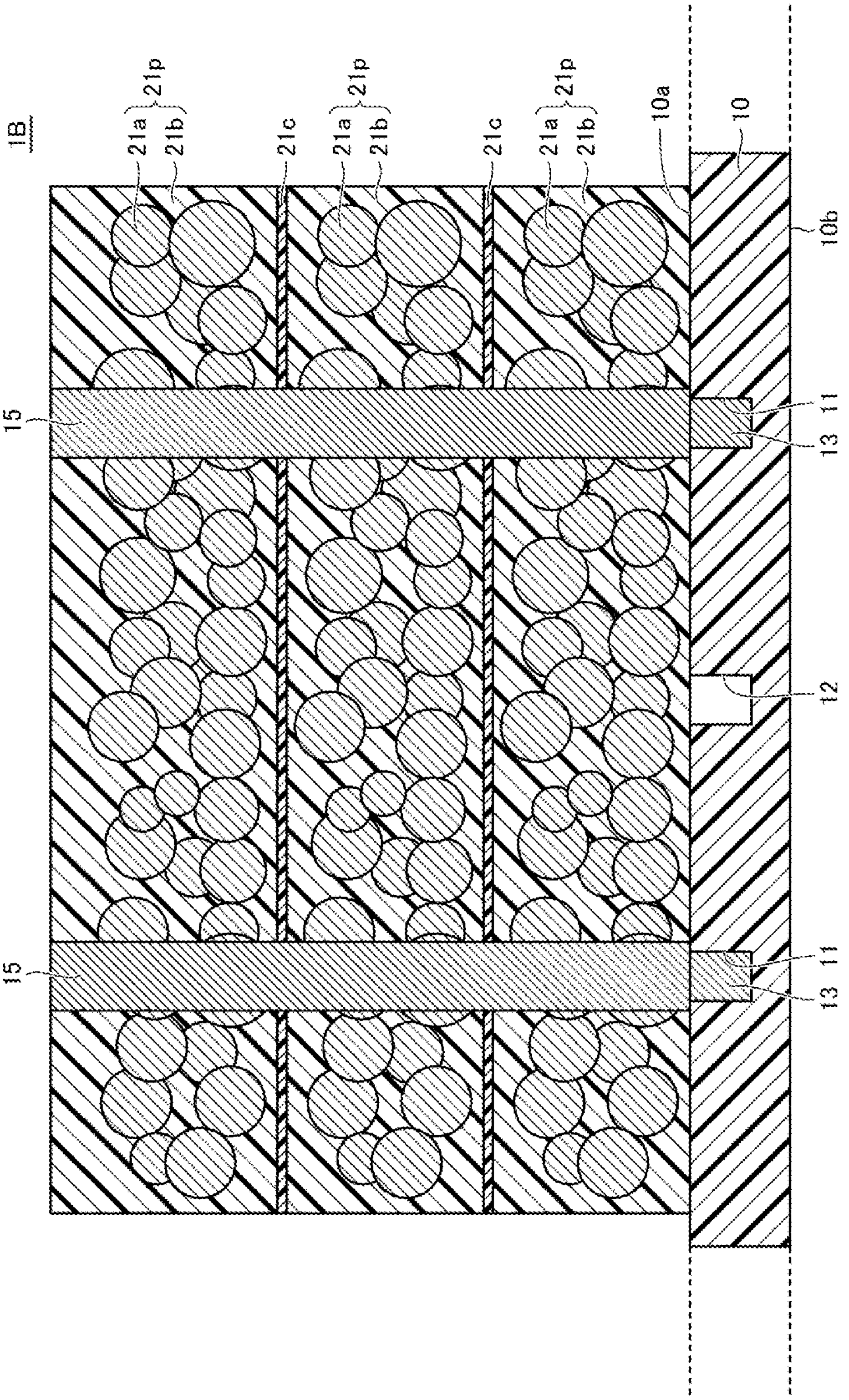
FIG. 30 is a schematic sectional view for illustrating a step S9 of the manufacturing flow illustrated in FIG. 28.

In addition, as illustrated in FIG. 28, support conductors are formed in a step S9. As illustrated in FIG. 30, the support conductors 15 formed herein are intentionally formed to be longer in the axial direction by the amount corresponding to the supernatant part intentionally formed to be thicker in the step S7.

Figure 31:
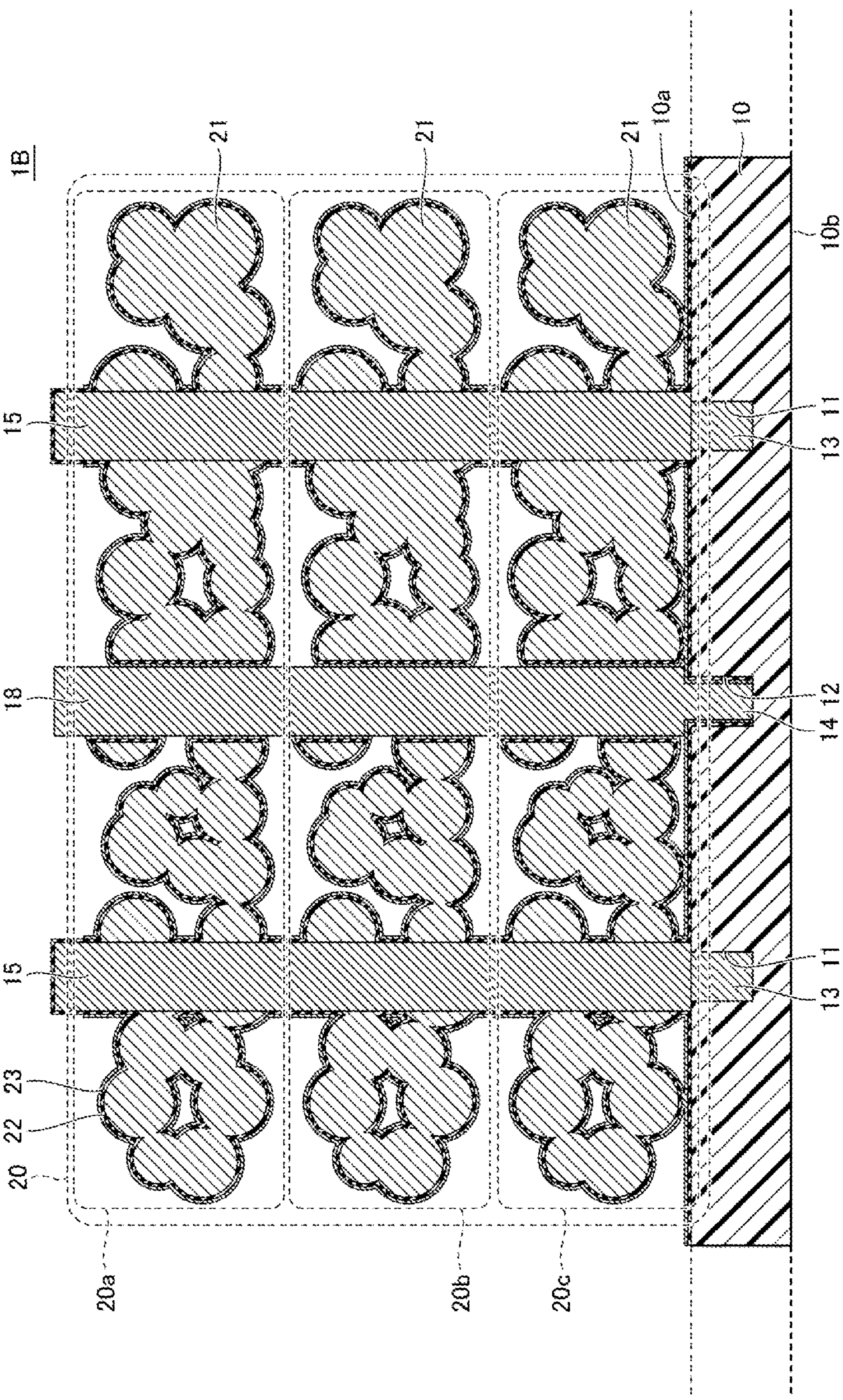
FIG. 31 is a schematic sectional view for illustrating a step S14B of the manufacturing flow illustrated in FIG. 28.

In addition, as illustrated in FIG. 28, the conductive film covering the tips of the support conductors formed in the step S13 is removed in a step S14B. More specifically, as illustrated in FIG. 31, the conductive film 23 covering the end located on the side opposite to the side with the insulating substrate 10 as viewed from the capacitance forming part 20, of the pair of ends of each of the plurality of support conductors 15, is selectively removed.

Such removal of the conductive film 23 is performed by, for example, a so-called dipping method or the like in which only the conductive film 23 at sites covering the tips of the support conductors 15 is immersed in an etching solution to remove only the conductive film 23 at the sites.

Removing the conductive film 23 covering the tips of the support conductors 15 in this manner causes, at the time of grinding processing for the tips of the support conductors 15, which will be described later, a part of the conductive film 23 to be unintentionally joined to the support conductors 15 when the conductive film 23 is subjected to the grinding processing together, thereby allowing short circuits between the support conductors 15 and the conductive film 23 to be effectively prevented.

Figure 32:
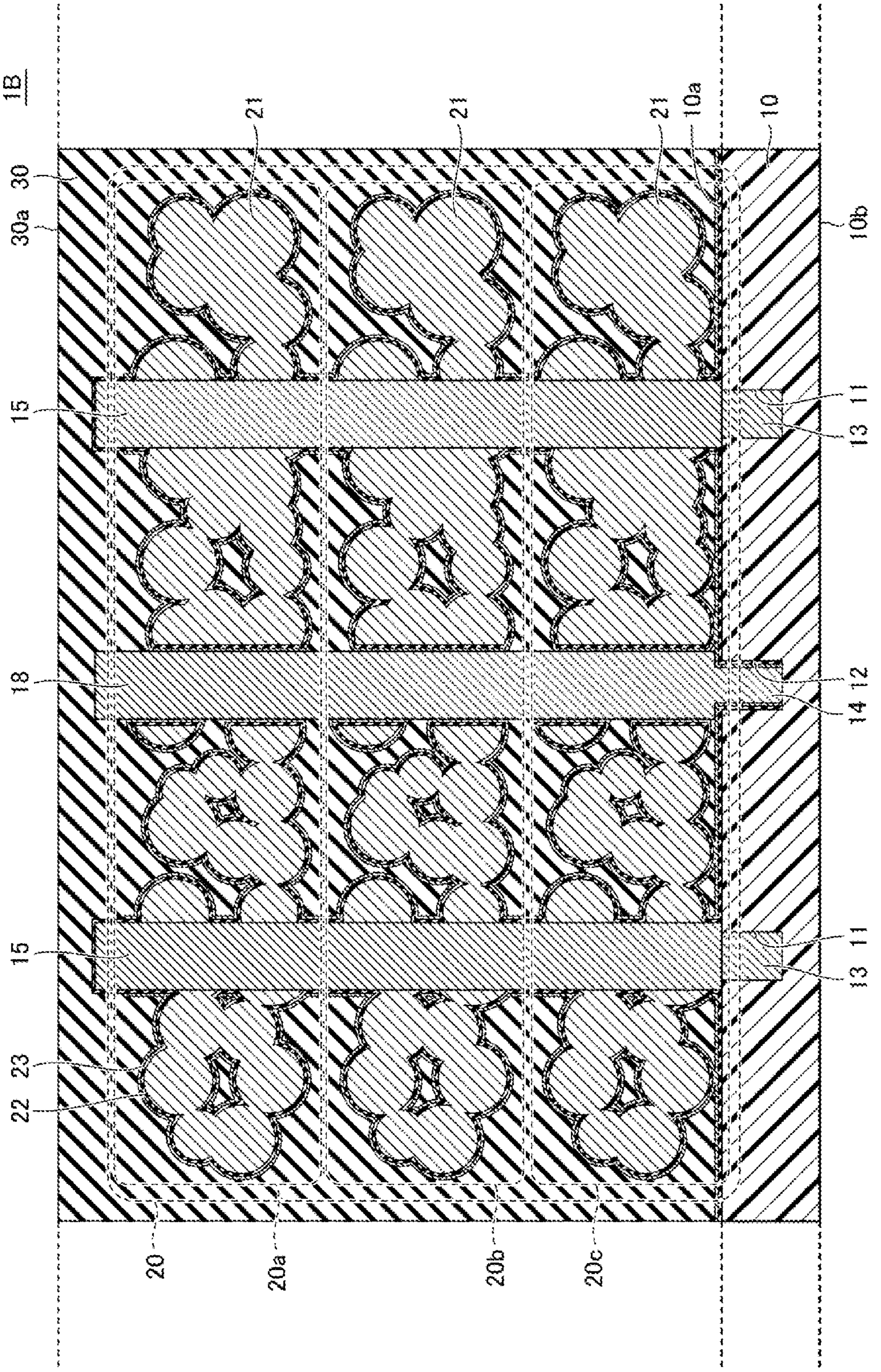
FIG. 32 is a schematic sectional view for illustrating a step S15 of the manufacturing flow illustrated in FIG. 28.

As illustrated in FIG. 28, a sealing part is formed in a step S15. As illustrated in FIG. 32, the sealing part 30 formed herein is formed so as to cover the tips of the support conductors 15 intentionally formed to be longer in the step S9.

Figure 33:
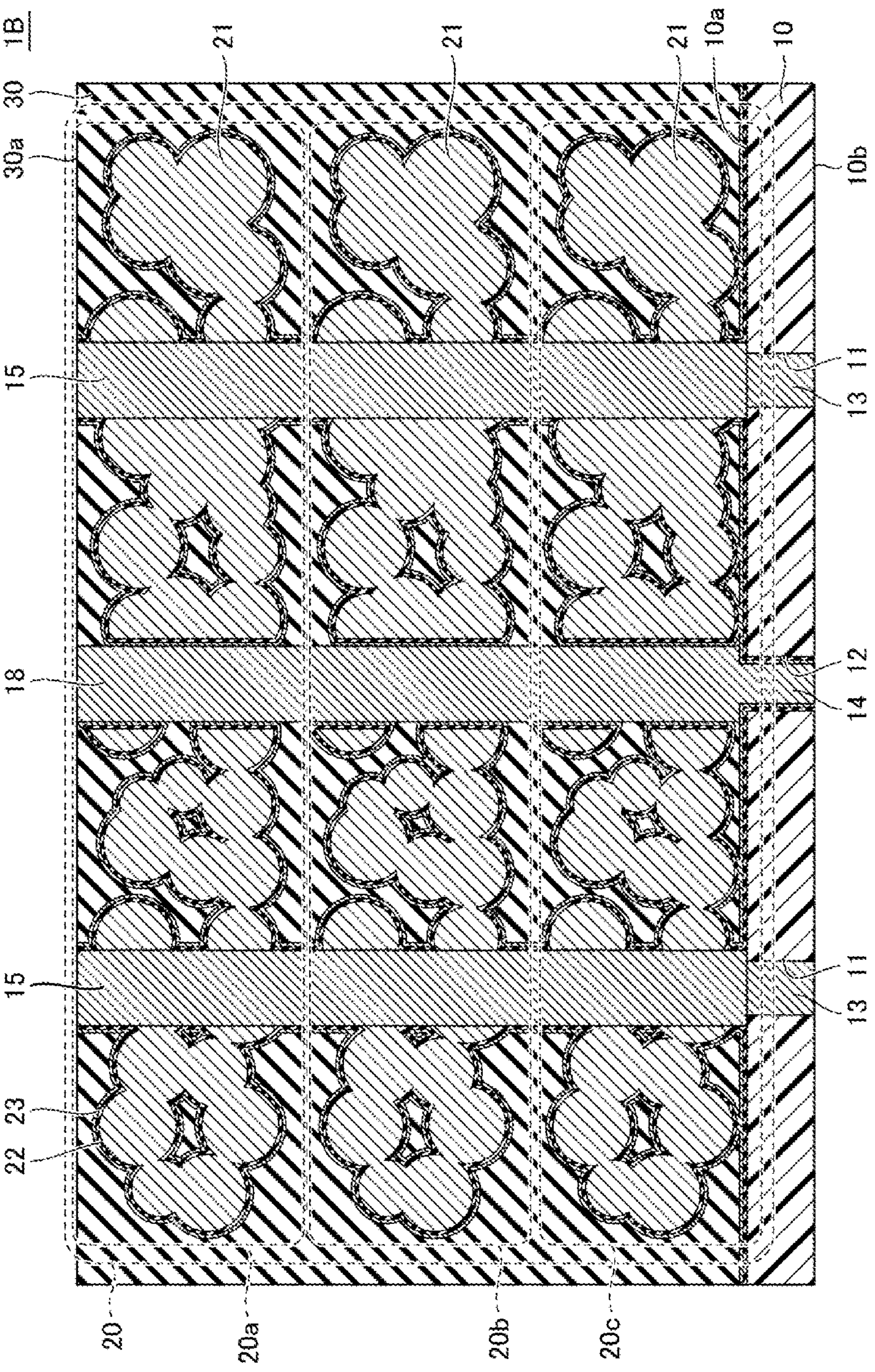
FIG. 33 is a schematic sectional view for illustrating a step S16 of the manufacturing flow illustrated in FIG. 28.

In addition, as shown in FIG. 28, in a step S16, the grinding processing is performed. The grinding processing performed herein is performed not only for the insulating substrate 10, but also for the sealing part, the support conductors, and the columnar conductors. More specifically, as illustrated in FIG. 33, not only the side with the second main surface 10*b* of the insulating substrate 10, located on the side opposite to the side with the capacitance forming part 20 provided, but also the side with the outer surface 30*a* of the sealing part 30, the ends of the support conductors 15 on the side with outer surface 30*a*, and the ends of the columnar conductors 18 on the aide with the outer surface 30*a* are each removed by plane cutting. Thus, the end surfaces of the support conductors 15 and columnar conductors 18 are each configured to be exposed at the outer surface 30*a*.

In a step S17 illustrated in FIG. 28, the first bumps 16 and the second bumps 17 are formed on the outer surface 30*a* so as to cover the end surfaces of the support conductors 15 and the end surfaces of the columnar conductors 18, exposed at the outer surface 30*a* in this manner. The capacitor 1B according to the second embodiment described above is manufactured through all of the steps S1 to S18 and S14B including the respective steps individually described above.

The capacitor 1B according to the present embodiment, configured as described above not only achieves the effect described in the first embodiment described above, but also is capable of an electrical extension from the capacitance forming part 20 on any of the front surface (that is, the outer surface 30*a*) and the back surface (that is, the second main surface 10*b* of the insulating substrate 10), thereby allowing a capacitor to be configured to be mountable on either the front surface or the back surface.

Third Embodiment

Figure 34:
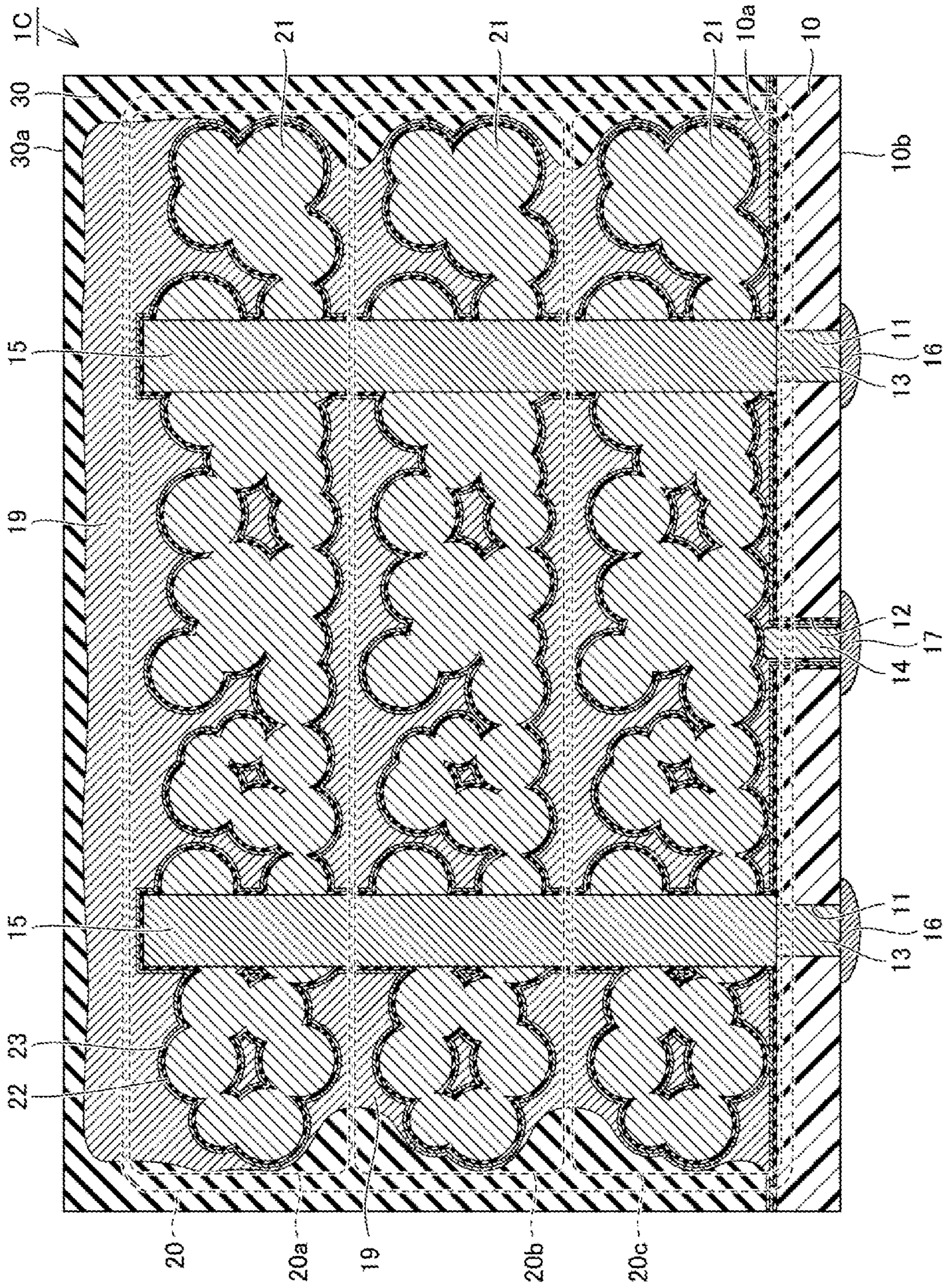
FIG. 34 is a schematic sectional view of a capacitor according to a third embodiment.
Figure 35:
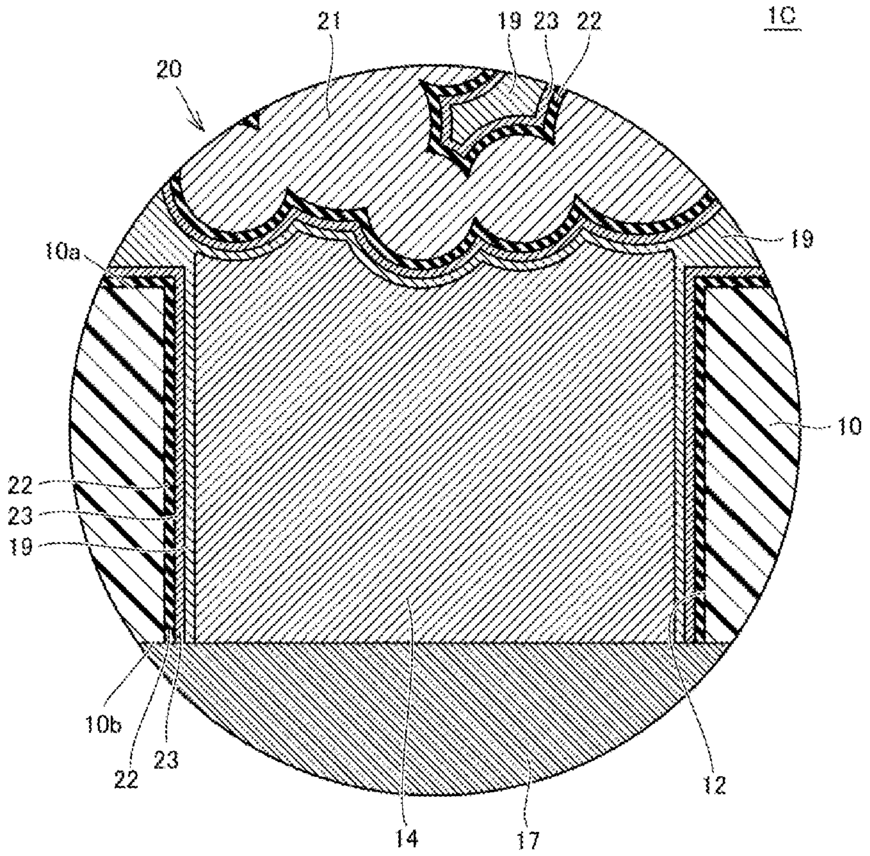
FIG. 35 is an enlarged schematic sectional view of the vicinity of a second via conductor illustrated in FIG. 34.
Figure 36:
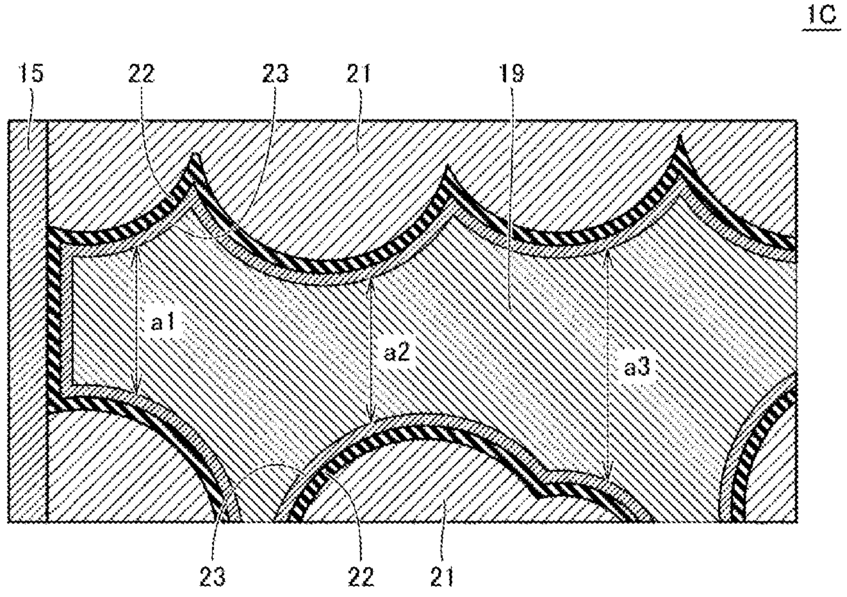
FIG. 36 is an enlarged schematic sectional view of a part of an internal conductor illustrated in FIG. 34.

FIG. 34 is a schematic sectional view of a capacitor according to a third embodiment, and FIG. 35 is an enlarged schematic sectional view of the vicinity of a second via conductor illustrated in FIG. 34. In addition, FIG. 36 is an enlarged schematic sectional view of a part of an internal conductor illustrated in FIG. 34. Hereinafter, a capacitor 1C according to the present embodiment will be described with reference to FIGS. 34 to 36.

The capacitor 1C according to the present embodiment is different from the capacitor 1A according to the above-described first embodiment only in the configuration of the second external connection line.

Specifically, in the capacitor 1C according to the present embodiment, an internal conductor 19 is formed while no columnar conductor 18 is formed, and the second external connection line is composed of the second via conductors 14, the second bumps 17, and the internal conductor 19.

The internal conductor 19 covers the surface of the conductive film 23. More specifically, the internal conductor 19 covers the conductive film 23 that defines the internal space so as to fill the internal space of the capacitance forming part 20, and also covers the conductive film 23 that covers the outer surface of the capacitance forming part 20 and the tips of the support conductors 15 protruding from the capacitance forming part 20.

In this regard, the internal conductor 19 is continuously formed so as to cover the conductive film 23 constituting the capacitance forming part 20, and is formed so as to fill the space provided between the layers a plurality of capacitance forming parts stacked apart from each other in the normal direction of the first main surface 10*a*. Thus, in the capacitor 1C according to the present embodiment, the conductive film 23 of the first capacitance forming part 20*a* and the conductive film 23 of the second capacitance forming part 20*b* are connected by the internal conductor 19, and the conductive film 23 of the second capacitance forming part 20*b* and the conductive film 23 of the third capacitance forming part 20 *c* are connected by the internal conductor 19.

In this regard, the thickness of the internal conductor 19 of the part located between the first capacitance forming part 20*a* and the second capacitance forming part 20*b* is preferably made larger than the thickness of the conductive film 23, more preferably, the thickness of the internal conductor 19 is preferably made two times or more as large as the thickness of the conductive film 23, still more preferably, three times or more as large as the thickness, still more preferably ten times or more as large as the thickness, still more preferably hundred times or more as large as the thickness. Further, this configuration is also the same for the thickness of the internal conductor 19 of the part located between the second capacitance forming part 20*b* and the third capacitance forming part 20*c*.

The thickness of the internal conductor 19 is not to be considered particularly limited as long as the internal conductor is thicker than the conductive film 23, but is considered preferably 30 μm or more, more preferably 200 μm or more. It is to be noted that, for convenience of drawing, in FIGS. 34 and 35, the internal conductor 19 is drawn so as to include a section that is extremely different in thickness, and thus, the thickness of a part of the internal conductor 19 (for example, the vicinity of the second via conductor 14 or the like) is about the same as the thickness of the conductive film 23, but actually, the conductive film 23 and the internal conductor 19 have thicknesses with a considerable difference therebetween as described above.

As the internal conductor 19, for example, at least any of metal materials such as Ag and conductive polymers can be employed as a main material. In addition, the internal conductor 19 may be made of an alloy material containing, as main components, two or more selected from these metal materials. According to the present embodiment, the internal conductor 19 made of Ag is used.

In this regard, the internal conductor 19 also covers the conductive film 23 that covers a part of the insulating substrate 10 on the side with the first main surface 10*a*. Furthermore, as illustrated in FIG. 35, the internal conductor 19 also covers the conductive film 23 that covers the surface of the insulating substrate 10 in sections that define the plurality of second through-holes 12 provided in the insulating substrate 10. More specifically, at a boundary part between the second via conductor 14 and the substrate of the insulating substrate 10, the substrate of the insulating substrate 10 is covered with a dielectric film 22 the dielectric film 22 is covered with the conductive film 23, and the conductive film 23 is further covered with the internal conductor 19, and the internal conductor 19 is further covered with the second via conductor 14.

Thus, the internal conductor 19 is directly connected to the second via conductor 14. Accordingly, the above-described second external connection line as a negative electrode is connected to the capacitance forming part 20 with the second via conductor 14 and the internal conductor 19 interposed therebetween.

Further, the thickness of the internal conductor 19 is measured by, for example, observing a section orthogonal to the extending direction of the first main surface 10*a* of the insulating substrate 10 with the use of a scanning electron microscope.

Specifically, when the longitudinal direction of the capacitor 1A in a plan view of the capacitor 1A, the lateral direction thereof, and the thickness direction (that is, the normal direction of the first main surface 10*a*) of the capacitor 1A are denoted respectively by Lx, Ly, and Lz, first, the capacitor 1A is subjected to a polishing treatment so as to expose a Lx-Lz section of a part of the capacitor 1A located at the center in the Ly direction. The polishing treatment is performed such that the exposed section is located within an error range of +100 μm in the Ly direction with the central position as a reference.

Next, the exposed section is observed. The observation range of the section in the Lx direction is a range of +50 μm with the center position of the section in the Lx direction as a reference, and the observation range of the section in the Lz direction is a range between the layer located closest to the first main surface 10*a* and the layer adjacent thereto among the plurality of capacitance forming parts stacked apart from each other in the Lz direction.

In measuring the thickness of the internal conductor 19, first, the element of a material that defines the internal conductor 19 is subjected to mapping by energy dispersive X-ray spectroscopy in a sectional image at a magnification of 100,000 times, obtained with a scanning electron microscope, and then subjected to imaging. Next, the mapping image is subjected to binarization processing. Next, in the binarized image, the thickness of the internal conductor 19 in the Lz direction is measured at hundred sites at a pitch of 10 nm in the Lx direction, and the average value thereof is calculated. The average value calculated in this manner is the thickness of the internal conductor 19. In this regard, in FIG. 36, three of the thicknesses of the internal conductor 19 in the Lz direction, measured at the hundred sites, are illustrated as line segment lengths a1, a2, and a3. It is to be noted that FIG. 36 is an enlarged schematic view of a part of the internal conductor 19 for describing the measurement of the thickness of the internal conductor 19, and is not intended to illustrate the above-described mapping image or binarized image.

Figure 37:
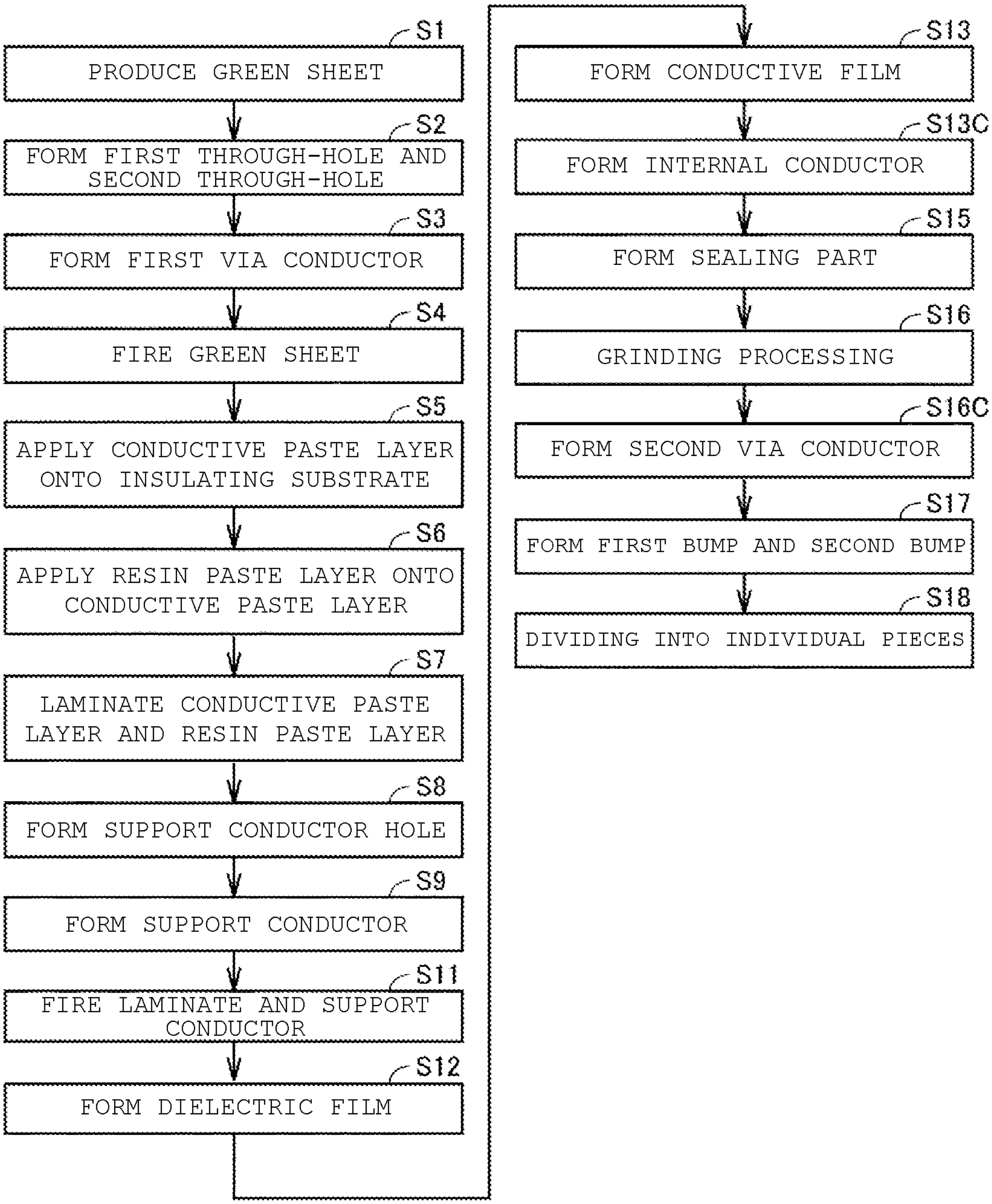
FIG. 37 is a flowchart illustrating a method for manufacturing the capacitor according to the third embodiment.

FIG. 37 is a flowchart illustrating a method for manufacturing the capacitor according to the present embodiment. As illustrated in FIG. 37, the method for manufacturing the capacitor 1C mostly conforms to the method for manufacturing the capacitor 1A. Accordingly, in the following description, in the method for manufacturing the capacitor 1C, the description of steps that have contents in common to the method for manufacturing the capacitor 1A will be omitted, and only steps that have different contents from the method for manufacturing the capacitor 1A will be described.

As illustrated in FIG. 37, the internal conductor 19 constituting the second external connection line is formed in a step S13C.

The internal conductor 19 can be formed by the CVD method, the ALD method, the PLD method, a plating method, a bias sputtering method, a sol-gel method, a method using conductive polymer filling, or a method using a supercritical fluid.

In addition, as illustrated in FIG. 37, after the step S16 (that is, grinding processing) is performed, second via conductors are formed in step S16C. Thus, the second via conductors 14 can be formed from the side with the second main surface 10*b* of the insulating substrate 10.

The capacitor 1C according to the present embodiment, configured as described above, not only achieves the effect described in the first embodiment described above, but also has an ESR reduced.

In this regard, for reducing the ESR, as described above, it is important to increase the area of contact between the capacitance forming part and the extended line, and increase the sectional area of the extended line orthogonal to the energization direction of the extended line and also enhance the continuity of the extended line.

In this regard, in the capacitor 1C according to the present embodiment, as described above, the second external connection line as the extended line includes the second via conductor 14 provided in the insulating substrate 10 and the internal conductor 19 sealed by the insulating substrate 10 and the sealing part 30, and the conductive film 23 of the capacitance forming part 20 is connected to the second via conductor 14 with the internal conductor 19 interposed therebetween.

In this regard, the internal conductor 19 covers not only the conductive film 23 at sites that define the outer surface of the capacitance forming part 20, but also the conductive film 23 at sites exposed inside the capacitance forming part 20. Thus, the internal conductor 19 is connected to most of the conductive film 23, thereby allowing the area of contact between the conductive film 23 and the internal conductor 19 to be increased. Accordingly, with such a configuration, the area of contact can be increased at the interface formed by the conductive film 23 and the internal conductor 19.

In addition, in the capacitor 1C according to the present embodiment, as described above, the thickness of the conductive film 23 is about several hundred nm at the largest, whereas the thickness of the internal conductor 19 is at least two times or more as large as the thickness of the conductive film 23, and the diameters of the plurality of columnar conductors 18 are each about several tens μm at the smallest. Accordingly, with such a configuration, the sectional area of the internal conductor 19 and the sectional area of the columnar conductor 18 are larger than the sectional area of the conductive film 23, and the continuity thereof can be secured.

Accordingly, such a configuration as described above not only allows the area of contact between the conductive film 23 and the second external connection line to be increased, but also allows the sectional area of the second external connection line orthogonal to the energization direction of the second external connection line to be increased and the continuity thereof to be enhanced, thereby allowing, as a result, the ESR to be reduced.

In addition, in the capacitor 1C according to the present embodiment, the second via conductor 14 is connected to the conductive film 23 of the capacitance forming part 20 with the internal conductor 19 interposed therebetween.

In this regard, as described above, the thickness of the conductive film 23 is about several hundred nm at the largest, whereas the thickness of the internal conductor 19 is about 30 μm at the smallest. More specifically, the internal conductor 19 is configured be larger in sectional area than the conductive film 23, and with such a configuration, the sectional area of the current path of the second external connection line can be increased.

Accordingly, such a configuration as described above allows the area of contact between the conductive film 23 and the second external connection line to be increased, and the sectional area of the current path of the second external connection line to be increased, thereby reducing the ESR.

In addition, in the capacitor 1C according to the present embodiment, as described above, the internal conductor 19 is formed so as to fill the space provided between the layers of a plurality of capacitance forming parts stacked apart from each other in the normal direction of the first main surface 10*a*.

In the case of such a configuration, each layer of the capacitance forming parts is held by the internal conductor 19 buried between the layers, thereby allowing the mechanical strength of the capacitance forming parts to be improved.

Fourth Embodiment

Figure 38:
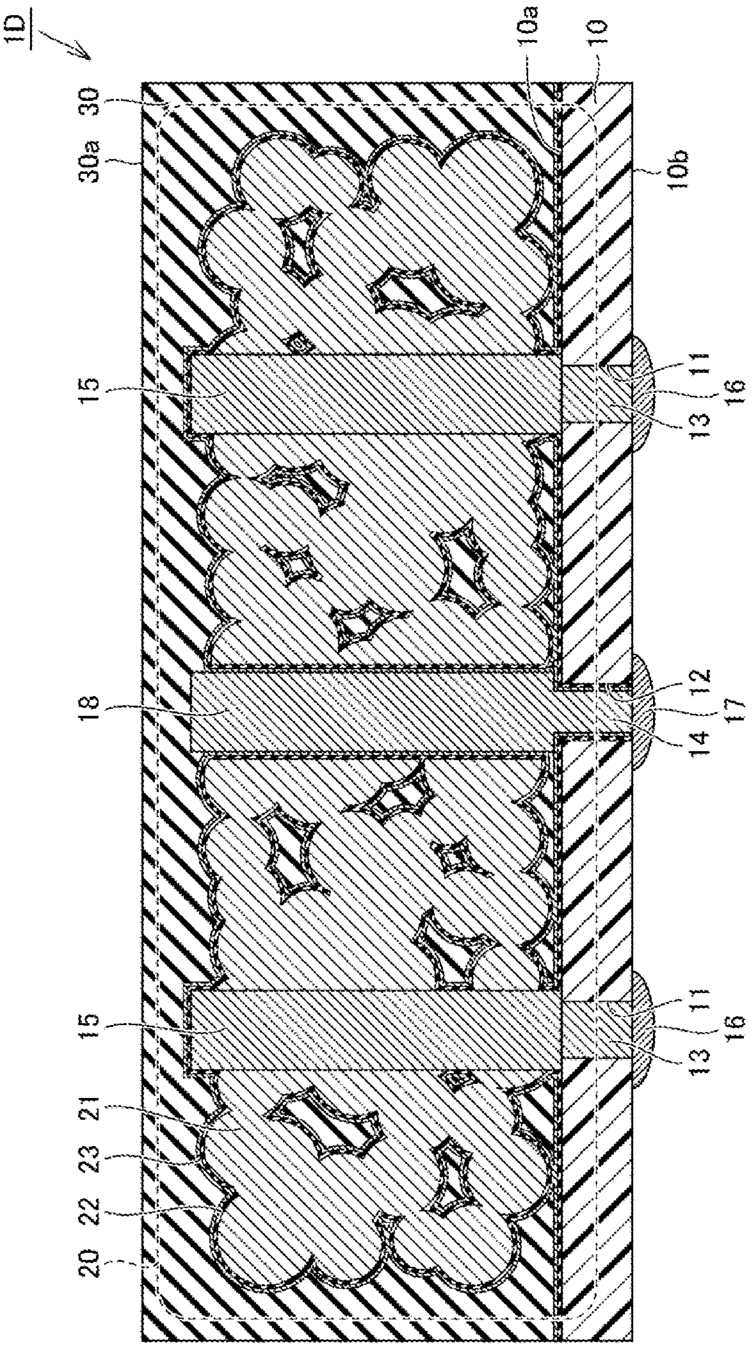
FIG. 38 is a schematic sectional view of a capacitor according to a fourth embodiment.
Figure 39:
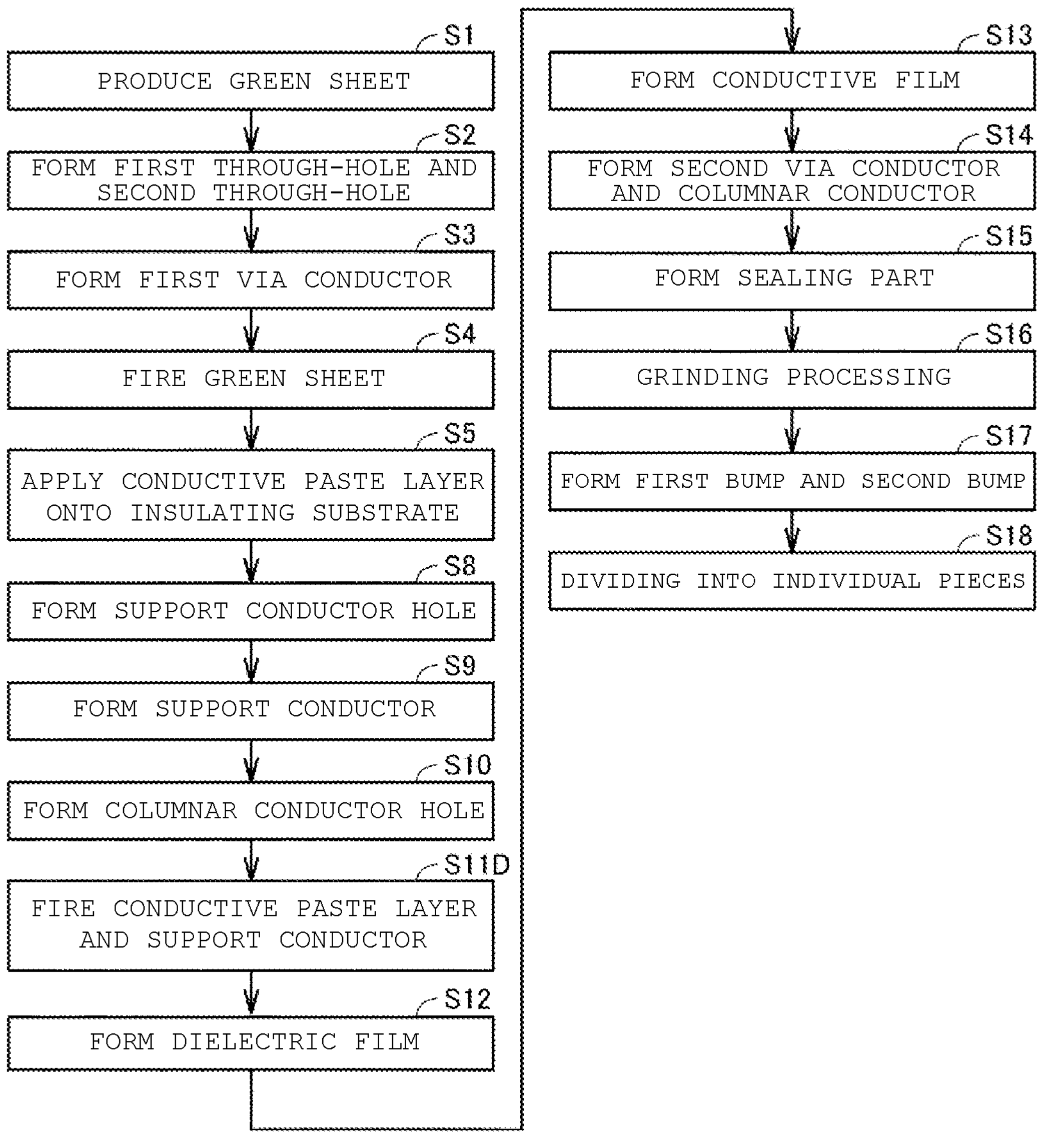
FIG. 39 is a flowchart illustrating a method for manufacturing the capacitor according to the fourth embodiment.

FIG. 38 is a schematic sectional view of a capacitor according to a fourth embodiment, and FIG. 39 is a flowchart illustrating a method for manufacturing a capacitor according to the present embodiment. Hereinafter, a capacitor 1D according to the present embodiment will be described with reference to FIGS. 38 and 39.

As illustrated in FIG. 38, the capacitor 1D according to the present embodiment is different from the capacitor 1A according to the above-described first embodiment only in that the capacitance forming part is composed of a single layer.

As illustrated in FIG. 39, the method for manufacturing the capacitor 1D configured as described above is different from the method for manufacturing the capacitor 1A only in that the step of laminating the conductive paste layer 21*p* and the resin paste layer 21*c* is not required. Accordingly, in the method for manufacturing the capacitor 1C, as illustrated in FIG. 39, the steps S6 and S7 (that is, applying the resin paste layer onto the conductive paste layer and laminating the conductive paste layer and the resin paste layer) illustrated in FIG. 7 are not performed, and in a step S11D illustrated in FIG. 39, the conductive paste layer and the support conductors are subjected to firing, unlike the step S11 (that is, firing the laminate and the support conductors) illustrated in FIG. 7.

Also in the case of such a configuration, an effect that is similar to the effect described in the first embodiment described above will be achieved, and the mounting stability and the reliability after mounting will be improved in the capacitor including the capacitance forming part 20 including the metal porous body 21, the dielectric film 22, and the conductive film 23.

Other Modes, Etc

The shape, configuration, size, number, material, and the like of each of the parts described in the above-described embodiments of the present invention and the modification examples thereof can be variously changed without departing from the scope of the present invention.

In addition, the characteristic configurations described in the above-mentioned embodiments of the present invention and the modification examples thereof can be naturally combined with each other within an allowable range in light of the scope of the present invention.

As described above, the above-mentioned embodiments and modification examples thereof, disclosed herein, are to be considered illustrative in all respects, and not restrictive. The technical scope of the present invention is defined by the claims, and considered including all modifications within the meaning and scope equivalent to the description of the claims.

DESCRIPTION OF REFERENCE SYMBOLS 1A to 1D, 1A1 to 1A4, 1A': Capacitor
10: Insulating substrate
10*a*: First main surface
10*b*: Second main surface
11: First through-hole
12: Second through-hole
13: First via conductor
14: Second via conductor
15, 15*a*: Support conductor
15*h*: Support conductor hole
16: First bump
17: Second bump
18: Columnar conductor
18*h*: Columnar conductor hole
19: Internal conductor
20: Capacitance forming part
20*a*: First capacitance forming part
20*b*: Second capacitance forming part
20*c*: Third capacitance forming part
21: Metal porous body
21*a*: Metal particle
21*b*: Binder
21*c*: Resin paste layer
21*p*: Conductive paste layer
22: Dielectric film
23: Conductive film
30: Sealing part
30*a*: Outer surface
40: Moisture-resistant protective film
50: Side sealing part

The invention claimed is:

1. A capacitor comprising:

an insulating substrate having a first main surface and a second main surface opposite to the first main surface;

a capacitance forming part facing the first main surface, the capacitance forming part comprising a conductive metal porous body, a dielectric film covering a surface of the metal porous body, and a conductive film covering the dielectric film;

a first external connection line connected to the conductive metal porous body;

a second external connection line connected to the conductive film; and a support part in the insulating substrate, the support part supporting the capacitance forming part and protruding from the first main surface toward the capacitance forming part, and surrounded by and joined to the capacitance forming part.

2. The capacitor according to claim 1, wherein the support part is a support conductor that forms part of the first external connection line, and the support conductor is connected to the metal porous body.

3. The capacitor according to claim 2, wherein the first external connection line comprises a first via conductor penetrating the insulating substrate from the first main surface so as to reach the second main surface, the support conductor extends in a normal direction of the first main surface, and as viewed in the normal direction of the first main surface, the support conductor is overlapped with at least a part of the first via conductor.

4. The capacitor according to claim 3, wherein the capacitance forming part comprises a first capacitance forming part and a second capacitance forming part stacked apart from each other in the normal direction of the first main surface, and the metal porous body of the first capacitance forming part and the metal porous body of the second capacitance forming part are connected by the support conductor.

5. The capacitor according to claim 3, wherein the second external connection line comprises a columnar conductor protruding from the first main surface toward the capacitance forming part and surrounded by the capacitance forming part, and a second via conductor penetrating the insulating substrate from the first main surface so as to reach the second main surface, the conductive film and the second via conductor are connected with at least the columnar conductor interposed therebetween, the columnar conductor extends in the normal direction of the first main surface, and as viewed in the normal direction of the first main surface, the columnar conductor is overlapped with a part of the second via conductor.

6. The capacitor according to claim 5, wherein the capacitance forming part comprises a first capacitance forming part and a second capacitance forming part stacked apart from each other in the normal direction of the first main surface, the metal porous body of the first capacitance forming part and the metal porous body of the second capacitance forming part are connected by the support conductor, and the conductive film of the first capacitance forming part and the conductive film of the second capacitance forming part are connected with at least the columnar conductor interposed therebetween.

7. The capacitor according to claim 6, further comprising a sealing part on the first main surface, sealing the capacitance forming part, and defining an outer surface opposite to the insulating substrate as viewed from the capacitance forming part, wherein the support conductor is exposed at the outer surface, and the columnar conductor is exposed at the outer surface.

8. The capacitor according to claim 5, further comprising a sealing part on the first main surface, sealing the capacitance forming part, and defining an outer surface opposite to the insulating substrate as viewed from the capacitance forming part, wherein the support conductor is exposed at the outer surface, and the columnar conductor is exposed at the outer surface.

9. The capacitor according to claim 5, wherein the first via conductor and the second via conductor are both in a region where the capacitance forming part is disposed as viewed in the normal direction of the first main surface.

10. The capacitor according to claim 9, wherein the capacitor includes:

pluralities of the first via conductors and the support conductors, and pluralities of the second via conductors and the columnar conductors.

11. The capacitor according to claim 10, wherein the pluralities of the first via conductors and the pluralities of the second via conductors are arranged in an array as viewed in the normal direction of the first main surface, and at least one set of adjacent via conductors among the pluralities of the first via conductors and the pluralities of the second via conductors that are a shortest distance from each other differ in polarity from each other.

12. The capacitor according to claim 2, wherein the first external connection line comprises a first via conductor penetrating the insulating substrate from the first main surface so as to reach the second main surface, the support conductor extends in a normal direction of the first main surface, and as viewed in the normal direction of the first main surface, the support conductor is not overlapped with the first via conductor.

13. The capacitor according to claim 12, wherein the capacitance forming part comprises a first capacitance forming part and a second capacitance forming part stacked apart from each other in the normal direction of the first main surface, and the metal porous body of the first capacitance forming part and the metal porous body of the second capacitance forming part are connected by the support conductor.

14. The capacitor according to claim 2, wherein the support conductor comprises a same material as at least a part of a material included in the metal porous body.

15. The capacitor according to claim 1, wherein the first external connection line comprises a first via conductor penetrating the insulating substrate from the first main surface so as to reach the second main surface, the support part includes a first support conductor and a second support conductor, the first support conductor forms part of the first external connection line, the first support conductor and the second support conductor are connected to the metal porous body, the first support conductor and the second support conductor extend in a normal direction of the first main surface, and as viewed in the normal direction of the first main surface, the first support conductor is overlapped with at least a part of the first via conductor, and the second support conductor is not overlapped with the first via conductor.

16. The capacitor according to claim 1, further comprising:

a sealing part on the first main surface, sealing the capacitance forming part, and defining an outer surface opposite to the insulating substrate as viewed from the capacitance forming part; and a moisture-resistant protective film on the first main surface of the insulating substrate at a position between the capacitance forming part and the sealing part.

* * * * *